US012794364B2

United States Patent

(12) United States Patent
Perreault et al.
(10) Patent No.: US 12,794,364 B2
(45) Date of Patent: Nov. 10, 2026

(54) DIFFERENTIAL HYBRID SUPPLY GENERATOR AND SUPPLY MODULATOR

(71) Applicant: Murata Manufacturing Co., Ltd., Kyoto (JP)

(72) Inventors: David J. Perreault, Cambridge, MA (US); John R. Hoversten, Arlington, MA (US); Yevgeniy A. Tkachenko, Belmont, MA (US)

(73) Assignee: Murata Manufacturing Co., Ltd., Kyoto (JP)

(*) Notice: Subject to any disclaimer, the term of this patent is extended or adjusted under 35 U.S.C. 154(b) by 213 days.

(21) Appl. No.: 18/753,487

(22) Filed: Jun. 25, 2024

(65) Prior Publication Data

US 2024/0429818 A1 Dec. 26, 2024

Related U.S. Application Data

(60) Provisional application No. 63/510,165, filed on Jun. 26, 2023.

(51) Int. Cl.
*H02M 3/07* (2006.01)
*H02M 1/00* (2006.01)
(Continued)

(52) U.S. Cl.
CPC ....... *H02M 3/1566* (2021.05); *H02M 1/0045* (2021.05); *H02M 3/1584* (2013.01)

(58) Field of Classification Search
CPC ............................................... H02M 3/07–078
See application file for complete search history.

(56) References Cited

U.S. PATENT DOCUMENTS 7,746,041 B2 6/2010 Xu et al.
7,777,459 B2 8/2010 Williams
(Continued)

FOREIGN PATENT DOCUMENTS

CN 1051438 A 5/1991
CN 1084683 A 3/1994
(Continued)

OTHER PUBLICATIONS

U.S. Appl. No. 18/409,310, filed Jan. 10, 2024, Perreault et al.
(Continued)

*Primary Examiner* — Sisay G Tiku
(74) *Attorney, Agent, or Firm* — DALY, CROWLEY, MOFFORD & DURKEE, LLP

(57) ABSTRACT

In some embodiments, a system includes: a differential multilevel converter comprising a differential input to receive two different voltages; a plurality of switches coupled between the input terminals; and a capacitor having a first terminal coupled to a first terminal of a first one of the plurality of switches and a second terminal coupled to a first terminal of a second, different one of the plurality of switches; and an output terminal coupled to a first terminal of a third, different one of the plurality of switches. The differential multilevel converter can be part of a hybrid supply generator/modulator. The system can further include a controller configured to control selected ones of the plurality of switches to switch, at points in time, between a plurality of switch states with each switch state producing an output voltage corresponding to one of three discrete voltage levels.

22 Claims, 19 Drawing Sheets

(51) Int. Cl.
*H02M 3/156* (2006.01)
*H02M 3/158* (2006.01)

(56) References Cited

U.S. PATENT DOCUMENTS

| | | | | |
|---|---|---|---|---|
| 7,782,027 | B2 | 8/2010 | Williams | |
| 7,786,712 | B2 | 8/2010 | Williams | |
| 7,812,579 | B2 | 10/2010 | Williams | |
| 7,977,927 | B2 | 7/2011 | Williams | |
| 8,212,541 | B2 | 7/2012 | Perreault et al. | |
| 8,824,978 | B2 | 9/2014 | Briffa et al. | |
| 8,829,993 | B2 | 9/2014 | Briffa et al. | |
| 8,830,709 | B2 | 9/2014 | Perreault et al. | |
| 8,830,710 | B2 | 9/2014 | Perreault et al. | |
| 8,860,396 | B2 | 10/2014 | Giuliano | |
| 8,957,727 | B2 | 2/2015 | Dawson et al. | |
| 9,020,453 | B2 | 4/2015 | Briffa et al. | |
| 9,160,287 | B2 | 10/2015 | Briffa et al. | |
| 9,166,536 | B2 | 10/2015 | Briffa et al. | |
| 9,172,336 | B2 | 10/2015 | Briffa et al. | |
| 9,209,758 | B2 | 12/2015 | Briffa et al. | |
| 9,490,752 | B2 | 11/2016 | Briffa et al. | |
| 9,531,291 | B2 | 12/2016 | Perreault | |
| 9,537,456 | B2 | 1/2017 | Briffa et al. | |
| 9,634,577 | B2 | 4/2017 | Perreault | |
| 9,667,139 | B2 * | 5/2017 | Giuliano | H02M 3/158 |
| 9,755,672 | B2 | 9/2017 | Perreault et al. | |
| 9,768,731 | B2 | 9/2017 | Perreault et al. | |
| 9,768,732 | B2 | 9/2017 | Briffa et al. | |
| 9,917,517 | B1 | 3/2018 | Jiang et al. | |
| 9,979,421 | B2 | 5/2018 | Astrom et al. | |
| 10,164,577 | B2 | 12/2018 | Briffa et al. | |
| 10,193,441 | B2 | 1/2019 | Giuliano | |
| 10,389,235 | B2 | 8/2019 | Giuliano | |
| 10,658,981 | B2 | 5/2020 | Briffa et al. | |
| 10,840,805 | B2 * | 11/2020 | Perreault | H03F 3/2178 |
| 10,992,265 | B2 | 4/2021 | Hoversten et al. | |
| 11,043,918 | B2 | 6/2021 | Tanaka et al. | |
| 11,191,028 | B2 | 11/2021 | Hoversten et al. | |
| 11,245,367 | B2 | 2/2022 | Garrett et al. | |
| 11,558,014 | B2 | 1/2023 | Tanaka et al. | |
| 11,637,531 | B1 * | 4/2023 | Perreault | H03F 1/0227<br>330/297 |
| 11,664,727 | B2 | 5/2023 | Giuliano et al. | |
| 11,757,411 | B2 | 9/2023 | Tanaka et al. | |
| 11,909,358 | B1 | 2/2024 | Perreault et al. | |
| 12,160,208 | B2 | 12/2024 | Garrett et al. | |
| 12,176,866 | B2 | 12/2024 | Garrett et al. | |
| 12,176,867 | B2 | 12/2024 | Garrett et al. | |
| 2004/0201414 | A1 | 10/2004 | Pasotti et al. | |
| 2008/0159044 | A1 | 7/2008 | Moon et al. | |
| 2010/0038972 | A1 * | 2/2010 | Buter | H03F 3/217<br>307/110 |
| 2012/0226929 | A1 | 9/2012 | Lee | |
| 2014/0201414 | A1 | 7/2014 | Keegan et al. | |
| 2015/0084701 | A1 | 3/2015 | Perreault et al. | |
| 2015/0171768 | A1 | 6/2015 | Perreault | |
| 2016/0099686 | A1 | 4/2016 | Perreault et al. | |
| 2018/0205315 | A1 * | 7/2018 | Giuliano | H02M 3/073 |
| 2019/0379287 | A1 | 12/2019 | Zhang et al. | |
| 2020/0021196 | A1 | 1/2020 | Scoones et al. | |
| 2021/0288614 | A1 | 9/2021 | Hoversten et al. | |
| 2021/0385752 | A1 | 12/2021 | Hoversten et al. | |
| 2022/0131463 | A1 | 4/2022 | Giuliano et al. | |
| 2022/0149725 | A1 * | 5/2022 | Garrett | H02M 1/0095 |
| 2023/0054485 | A1 | 2/2023 | Hoversten et al. | |
| 2023/0056740 | A1 | 2/2023 | Perreault et al. | |
| 2023/0057037 | A1 | 2/2023 | Hoversten et al. | |
| 2023/0148059 | A1 | 5/2023 | Szczeszynski | |
| 2024/0080004 | A1 | 3/2024 | Garrett et al. | |
| 2024/0305192 | A1 * | 9/2024 | Szczeszynski | H02M 7/4833 |
| 2025/0015718 | A1 * | 1/2025 | Pedroso | H02M 1/0095 |
| 2025/0309830 | A1 * | 10/2025 | Gazder | H02M 3/1584 |
| 2025/0309832 | A1 * | 10/2025 | Perreault | H02M 3/1582 |
| 2025/0317056 | A1 * | 10/2025 | King | H02M 7/4837 |

FOREIGN PATENT DOCUMENTS

| | | | |
|---|---|---|---|
| CN | 101689662 | A | 3/2010 |
| CN | 105281688 | A | 1/2016 |
| CN | 113 949 258 | A | 1/2022 |
| KR | 100817080 | B1 | 3/2008 |
| KR | 10-2018-0019242 | | 2/2018 |
| WO | WO 2010/081843 | | 7/2010 |
| WO | WO 2014/085097 | | 6/2014 |

OTHER PUBLICATIONS

Cheshire et al., "Flying Capacitor Four-Level Supply Modulator with Active Balancing for RF Power Amplifier Applications"; 2023 IEEE 24th Workshop on Control and Modeling for Power Electronics (COMPEL); Jun. 2023; 7 pages.
Response to Office Action dated Dec. 23, 2025, for U.S. Appl. No. 18/353,331; Response filed Feb. 11, 2026; 11 pages.
U.S. Appl. No. 17/131,150, filed Dec. 22, 2020, Chen, et al.
Cao, et al.; "A Family of Zero Current Switching Switched-Capacitor DC-DC Converters"; 2010 Twenty-Fifth Annual IEEE Applied Power Electronics Conference and Exposition (APEC); Feb. 21-25, 2010; 8 Pages.
Cao, et al; "Multiphase Multilevel Modulator DC-DC Converter for High-Current High-Gain TEG Application"; IEEE Transactions on Industry Application; vol. 47; No. 3; May/Jun. 2011; 9 Pages.
Chen, et al.; "A High Efficiency High Power Step-Up Resonant Switched-Capacitor"; 2012 IEEE Energy Conversion Congress and Exposition (ECCE); Sep. 15-20, 2012; 5 Pages.
Shoyama, et al.; "Resonant Switched Capacitor Converter with High Efficiency"; 2004 35th Annual IEEE Power Electronics Specialists Conference; 2004; 7 Pages.
Sun, et al.; "High Power Density, High Efficiency System Two-Stage Power Architecture for Laptop Computers"; 2006 37th IEEE Power Electronics Specialists Conference; Jun. 18-22, 2006; 7 Pages.
Unknown; "Fundamentals of Power Electronics"; Chapter 19: Resonant Conversion; Sep. 19, 2019; 87 Pages.
Yeung, et al.; "Multiple and Fractional Voltage Conversion Ratios for Switched-capacitor Resonant Converters"; 2001 IEEE 32nd Annual Power Electronics Specialists Conference (IEEE Cat. No.01CH37230); Jun. 17-21, 2001; 6 Pages.
U.S. Appl. No. 18/753,516, filed Jun. 25, 2024, Perreault et al.
U.S. Appl. No. 18/753,510, filed Jun. 25, 2024, Perreault et al.
U.S. Appl. No. 18/753,506, filed Jun. 25, 2024, Perreault et al.
U.S. Appl. No. 18/753,499, filed Jun. 25, 2024, Perreault et al.
U.S. Appl. No. 18/753,494, filed Jun. 25, 2024, Perreault et al.
Office Action dated May 20, 2024, for U.S. Appl. No. 18/353,336; Response filed Sep. 11, 2024; 9 pages.
Notice of Allowance dated May 20, 2024, for U.S. Appl. No. 18/353,336; 9 pages.
Intention to Grant dated Oct. 1, 2024, for Chinese Application No. 202080056421.X; 6 pages.
Korean Office Action dated Jul. 31, 2024, for Korean Application No. 10-2024-7002052; Response filed Sep. 30, 2024; 43 pages with English translation from Espacenet.
Korean Office Action dated Jul. 3, 2023, for Korean Patent Application No. 10-2022-7004103 (with English translation); 7 pages.
Chen Minjie et al., "Multitrack Power Conversion Architecture", IEEE Transactions on Power Electronics, vol. 32, No. 1, Jan. 2017; pp. 325-340 (16 pages).
Extended European Search Report dated Jun. 15, 2023, for European Patent Application No. 20837180.7; 9 pages.
Non-Final Office Action dated May 20, 2024, for U.S. Appl. No. 18/353,336; 12 pages.
Korean Notice of Allowance dated Oct. 17, 2023, for Korean Patent Application No. 10-2022-7004103; 8 pages.
Response to Extended European Search Report dated Jun. 15, 2023, for European Patent Application No. 20837180.7; Response filed Jan. 8, 2024; 14 pages.
International Search Report and Written Opinion of the ISA dated Nov. 13, 2020, for PCT/US2020/041162; 13 Pages.

(56) References Cited

OTHER PUBLICATIONS

U.S. Non-Final Office Action dated Aug. 9, 2021 for U.S. Appl. No. 17/281,076; 12 Pages.
Response to U.S. Non-Final Office Action dated Aug. 9, 2021 for U.S. Appl. No. 17/281,076; Response filed on Aug. 25, 2021; 9 Pages.
Notice of Allowance dated Sep. 27, 2021, for U.S. Appl. No. 17/281,076; 9 Pages.
Notice of Allowance dated Sep. 18, 2024, for U.S. Appl. No. 18/353,337; 11 pages.
Response to U.S. Non-Final Office Action dated May 23, 2024, for U.S. Appl. No. 18/353,337; Response filed on Sep. 5, 2024; 11 Pages.
Korean Office Action (w/English translation) dated Jul. 31, 2024 for Korean Patent Application No. 10-2024-7002052; 18 pages.
Chinese Office Action (w/English translation) dated Aug. 1, 2024 for Chinese Patent Application No. 202080056421.X; 9 pages.
Response to U.S. Non-Final Office Action dated Mar. 21, 2024, for U.S. Appl. No. 17/572,024; Response filed on Jul. 22, 2024; 10 pages.
Notice of Allowance dated Aug. 19, 2024, for U.S. Appl. No. 17/572,024; 11 pages.
Non-Final Office Action dated Mar. 21, 2024, for U.S. Appl. No. 17/572,024; 14 pages.
Texas Instruments Application Report SLVA750A; May 2016; 15 pages.
Non-Final Office Action dated May 23, 2024, for U.S. Appl. No. 18/353,337; 12 pages.
Chinese Office Action dated Nov. 29, 2023, for Chinese Patent Application No. 202080056421.X; 13 pages (w/English translation).
Office Action dated Dec. 23, 2025, for U.S. Appl. No. 18/353,331; 13 pages.
Radic et al., "High-Power Density Hybrid Converter Topologies for Low-Power Dc-Dc SMPS"; 2014 International Power Electronics Conference; May 2014; 5 pages.
Das et al., "Modular Isolated Vertically Symmetric Dual Inductor Hybrid Converter for Differential Power Processing"; 2021 IEEE Energy Conversion Congress & Exposition; Oct. 2021; 5 pages.
Oota et al., "An AC-DC Converter Using a Differential Switched-Capacitor Transformer"; IEEE Power Electronics Specialists Conference; May 1998; 7 pages.
Uno et al., "LLC Resonant Voltage Multiplier-Based Differential Power Processing Converter Using Voltage Divider with Reduced Voltage Stress for Series-Connected Photovoltaic Panels under Partial Shading"; Electronics, 8, 1193; Oct. 2019; 18 pages.
U.S. Appl. No. 18/925,683, filed Oct. 24, 2024, Hoversten et al.
International Search Report and Written Opinion dated Oct. 2, 2024, for PCT/US2024/035361; 21 Pages.
English translation of Notice of Allowance dated Apr. 27, 2025, for Korean Patent Application No. 10-2024-7002052; 1 page.
Restriction Requirement dated Mar. 12, 2026, for U.S. Appl. No. 18/753,499; 8 pages.
Response to Restriction Requirement dated Mar. 12, 2026, for U.S. Appl. No. 18/753,499; Response filed Apr. 13, 2026; 2 pages.
Notice of Allowance dated Mar. 20, 2026, for U.S. Appl. No. 18/353,331; 7 pages.

* cited by examiner

DIFFERENTIAL HYBRID SUPPLY GENERATOR AND SUPPLY MODULATOR

CROSS-REFERENCE TO RELATED APPLICATIONS

This application claims the benefit under 35 U.S.C. § 119 of U.S. Provisional Patent Application No. 63/510,165 filed on Jun. 26, 2023, which is hereby incorporated by reference herein in its entirety.

BACKGROUND

The efficiency of radio-frequency (rf) power amplifiers (PAs) can be improved through “supply modulation” (or “drain modulation” or “collector modulation”), in which the power supply voltage provided to the PA is adjusted dynamically (“modulated”) over time depending upon the rf signal being synthesized. For the largest efficiency improvements, supply voltage can be adjusted discretely (among discrete levels) or continuously on a short time scale that tracks or dynamically accommodates rapid variations in rf signal amplitude (or envelope), such as may occur as data is encoded in the rf signal or as the rf signal amplitude is desired to be changed with high envelope bandwidth (e.g., as in envelope tracking, envelope tracking advanced, polar modulation, “class G” power amplification, multilevel back-off, multilevel LINC, Asymmetric Multilevel Outphasing, etc.). The power supply voltage (or voltage levels) provided to the PA may also be adapted to accommodate longer-term changes in desired rf envelope (e.g., “adaptive bias”) such as associated with adapting transmitter output strength to minimize errors in data transfer, for rf “traffic” variations, etc.

“Continuous” supply modulation (e.g., “envelope tracking” or “adaptive bias”) may be advantageously realized by dynamically selecting an intermediate voltage from among a set of discrete power supply voltages and then further regulating (stepping down) this intermediate voltage to create a continuously-variable supply voltage to be provided to the PA, or by pulse-width modulating between two or more levels and filtering the output to create a continuously-varying waveform.

Some rf amplifier systems utilize “discrete” supply modulation (or discrete “drain modulation”) in which the supply voltage is switched among a set of discrete voltage levels, possibly including additional filtering or modulation to shape the voltage transitions among levels. Systems of this type include “class G” amplifiers, multilevel LINC (MLINC) Power Amplifiers, Asymmetric Multilevel Outphasing (AMO) Power Amplifiers, Multilevel Backoff amplifiers (including “Asymmetric Multilevel Backoff” amplifiers) and digitized polar transmitters among other types. Hybrid systems which utilize a combination of continuous and discrete supply modulation may also be realized.

SUMMARY

Described are concepts, systems, circuits, devices and techniques for use in and/or with PA architectures using supply modulation. The described concepts, systems, circuits, devices and techniques can provide both very rapid variations in modulated power supply voltage (e.g., among multiple discrete levels) while also providing the ability to slowly adapt the voltages of the discrete levels over a desired range. Such concepts, systems, circuits, devices and techniques find use in a number of applications including, but not limited to PA architectures.

Using descried concepts, systems, circuits, devices and techniques, it is possible to efficiently and compactly generate a set of m power supply voltages. Two of the m power supply voltages (e.g., $V_1$ and $V_m$) can be independently controlled. The other m–2 power supply voltages can be distributed in some prescribed relation to the two independently controlled power supply voltages, such as spaced in an even fashion between them and/or around them (e.g., with adjacent voltage levels each separated by an approximate voltage ΔV). Thus, for example, the following m power supply voltages can be provided wherein $V_1$ and $V_m$ are the independently controlled supply voltages:

$$V_k = V_1 + (k-1)\cdot(V_m - V_1)/(m-1) \text{ for } k = 1 \ldots m.$$

Such an arrangement is equivalent to allowing for independently specifying or controlling:

(a) minimum ($V_{min}$) and maximum ($V_{max}$) voltage levels (with the spacing between voltage levels ΔV determined in terms of $V_{min}$ and $V_{max}$ and the total number of levels m).

(b) the minimum supply voltage level ($V_{min}$) and the inter-level voltage spacing ΔV (with the maximum voltage level $V_{max}$ determined by ΔV and the total number of levels m.)

(c) the maximum supply voltage level ($V_{max}$) and the inter-level voltage spacing ΔV (with the minimum voltage level $V_{min}$ determined by ΔV and the total number of levels m.)

The concepts, systems, circuits, devices and techniques described herein provide substantially all (or most) of the practical benefits available from supply modulation (e.g., in terms of PA efficiency) while at the same time avoiding limitations associated with providing truly independent voltage level control or ratiometric levels. Thus, the concepts, systems, circuits, devices and techniques described herein provide significant advantages in combinations of size, cost, efficiency and performance as compared to existing approaches.

Further benefits are provided if one only need generate two regulated supply voltages and be able to directly provide one or more additional supply voltage levels to the PA, without the necessity of having a separate supply generator element to generate these additional levels cascaded with a supply modulator to select among the levels. Merging the functions of intermediate level generation and supply modulation can reduce the number and size of passive components (e.g., capacitors) required as well as the number, required area and loss of semiconductor elements (e.g., switches).

In accordance with one aspect of the concepts described herein, a system includes: a differential multilevel converter comprising: a differential input including a first input terminal configured to be coupled to a first voltage $V_A$ and a second input terminal configured to be coupled to a second, different voltage $V_B$; a plurality of switches $S_A$, $S_{A'}$, $S_B$, $S_{B'}$ coupled between the first and second input terminals; and a capacitor $C_f$ having a first terminal coupled to a first terminal of a first one of the plurality of switches and a second terminal coupled to a first terminal of a second, different one of the plurality of switches; an output terminal coupled to a first terminal of a third, different one of the plurality of switches and a controller coupled to the plurality of switches and configured to control selected ones of the plurality of switches $S_A$, $S_{A'}$, $S_B$, $S_{B'}$ to switch, at points in time, between a plurality of switch states with each switch state producing an output voltage $V_{sm}$ corresponding to one of three discrete voltage levels L1, L2, L3 at the output terminal of the differential multilevel converter and wherein: at least two of the plurality of switch states produce an output voltage which is substantially the same and at those points in time when ones of the plurality of switches switch among the at least two switch states producing the substantially same output voltage, the controller seeks to maintain a voltage $V_{cf}$ across the capacitor $C_f$ within a voltage deviation $\Delta V$ of a target voltage and wherein the voltage deviation $\Delta V$ determines a maximum deviation of the substantially same output voltage from an ideal output voltage.

With this arrangement, a system may synthesize one of three discrete voltage levels from a differential input. That is, from two supply voltages, the system operates to to directly provide one or more additional discrete voltage levels. Such discrete voltage levels may find use, for example, in a discrete digital envelope tracking system in which such discrete voltage levels may be provided to a supply terminal of a power amplifier (PA) in a base station (e.g., a base station of a cellular system) or mobile hand set (e.g., a cell phone or other mobile device), without the necessity of having a separate supply generator element to generate these additional levels cascaded with a supply modulator to select among the levels. Merging the functions of intermediate level generation and supply modulation can reduce the number and size of passive components (e.g., capacitors) required as well as the number, required area and loss of semiconductor elements (e.g., switches).

It should be appreciated that individual elements of different embodiments described herein may be combined to form other embodiments not specifically set forth above. Various elements, which are described in the context of a single embodiment, may also be provided separately or in any suitable or reasonable sub-combination. It should also be appreciated that other embodiments not specifically described herein are also within the scope of the following claims.

Accordingly, system, circuits and techniques described herein may include one or more of the following features independently or in combination with one or more other features to include: a differential multilevel converter comprises switched capacitors configured to synthesize instantaneous voltage levels while enabling desired voltage/charge-balance on the capacitors; a differential multilevel converter comprising a differentially-connected flying-capacitor multilevel converter (FCML); a differential multi-level converter comprising a capacitor-based energy-transfer topology in which the charge transfer requirements prevent one or more of the synthesizable levels to be continuously provided without switching of the differentially-connected multi-level converter; a first switch $S_{Opt,A}$; and a second switch $S_{opt,B}$ with the first and second switches configured to enable direct energy transfer from output A (e.g., $V_A$) to output B (e.g., $V_B$) or vice versa; a multi-output regulation stage provided as one of: (a) a magnetic regulation stage; or (b) a hybrid magnetic/switched-capacitor regulation stage; a multi-output regulation stage of claim comprising a pair of output decoupling capacitors; and a differential output decoupling capacitor; a differential multi-level converter configured to receive at least a first voltage $V_A$ and a second voltage $V_B$, and combine a differential capacitive energy transfer supply generation function with a supply modulation function to thereby provide the differential multi-level converter having an area and size which is reduced compared to an area and size required to provide like first and second voltages $V_A$, $V_B$ using a differential supply generator which is separate from, but coupled to, a supply modulator; a differential multi-level converter in which the second voltage $V_B$ is larger than the first voltage $V_A$; a differential multi-level converter comprising a differential decoupling capacitor $C_D$ coupled between terminals (or points) at which exist respective ones of the first and second voltages $V_A$, and $V_B$; a differential multi-level converter configured such that: (1) the output is taken with discrete levels; and (2) a dc input voltage is taken differentially between the first and second voltages $V_A$ and $v_B$ rather than from an input source and common; a differential multi-level converter configured such that the output voltage output $V_{SM}$ is a ground referenced output voltage $v_{SM}$ which may take on discrete voltage values distributed between the first and second voltage values $V_A$ and $V_B$, with energy transferred from and between terminals at which $V_A$ and $V_B$ exist and the of the output differential multi-level converter; a differential multi-level converter having switches (e.g., $S_A$, $S_{A'}$, $S_B$, $S_{B'}$) which are all NMOS devices; a differential multi-level converter having switches (e.g., $S_A$, $S_{A'}$, $S_B$, $S_{B'}$) comprising a combination of NMOS and PMOS devices; a differential multi-level converter having switches (e.g., $S_A$, $S_{A'}$, $S_B$, $S_{B'}$) comprising all PMOS devices; differential multi-level converter comprising a pair of switches implemented as a CMOS pair; a differential multi-level converter having a first pair of switches implemented as a CMOS pair and a second pair of switches implemented as a CMOS pair; a differential multi-level converter comprising switches having unidirectional blocking capability and which are required to block less than or equal to the maximum difference between the first and second voltages $v_A$ and $v_B$ but more than half the maximum difference between the first and second voltages $V_A$, $V_B$; a differential multi-level converter comprising switches with gate-drive levels derived from the first and second voltages $V_A$, $V_B$; a differential multi-level converter configured to provide four (4) switch states providing the following specified output voltage $V_{SM}$:

| State | Switches On | $v_{SM}$ | $v_{SM\approx}$ | Level | $v_{cf}$ |
|---|---|---|---|---|---|
| 1 | $S_A$, $S_B$ | $v_B$ | $v_B$ | L3 | Unchanging |
| 2 | $S_A$, $S_{B'}$ | $v_B - v_{cf}$ | $(v_A + v_B)/2$ | L2 | Increasing (under load) |
| 3 | $S_B$, $S_{A'}$ | $v_A + v_{cf}$ | $(v_A + v_B)/2$ | L2 | Decreasing (under load) |
| 4 | $S_{B'}$, $S_{A'}$ | $v_A$ | $v_A$ | L1 | Unchanging |

a differential multi-level converter provides a three (3) level supply voltage corresponding to voltages $V_A$ and $V_B$ and $(V_A+V_B)/2$ wherein Level 1=$V_A$, Level 3=$V_B$, and Level 2=($V_A$ and $V_B$)/2); a differential multi-level converter configured to operate such that: switch state 1 passes the second voltage $V_B$ to the output terminal of the differential multilevel converter; switch state 4 passes the first voltage $V_A$ to the output terminal of the differential multilevel converter; switch state 2 results in a voltage corresponding to $V_B-V_{cf}$ being provided to the output terminal of the differential multilevel converter; and switch state 3 results in in a voltage corresponding to $V_B+V_{cf}$ being provided to the output terminal of the differential multilevel converter; a differential multi-level converter switches are controllable to maintain a value of voltage across the capacitor $V_{cf}$ to be near a value of voltage corresponding to a voltage value of $(V_B-V_A)/2$; a differential multi-level converter switches are controllable to maintain a value of voltage $v_{cf}$ to be near a value of voltage corresponding to a voltage value of $(V_B-V_A)/2$ such that both states 2 and 3 provide an output voltage substantially equal to a voltage of $(V_A+V_B)/2$; a differential multi-level converter in which selections between states 2 and 3 results in a voltage across the capacitor $V_{cf}$ being maintained near a value of voltage corresponding to a voltage value of $(V_B-V_A)/2$ such that both states 2 and 3 provide an output voltage corresponding to a voltage value of about $(V_A+V_B)/2$; a differential multi-level converter wherein the voltage across the capacitor $V_{cf}$ may be maintained near $(v_B-v_A)/2$ by appropriately selecting between states 2 and 3 when seeking to synthesize an output voltage level near $(v_A+v_B)/2$; a differential multi-level converter wherein when selecting which of states 2, 3 to use to supply a voltage close to $(v_A+v_B)/2$ at the modulator output (i.e., synthesizing Level 2, or L2), state 2 can be selected if $v_{cf}$ falls too far below $(v_B-v_A)/2$ and state 3 can be selected if $v_{cf}$ rises too far above $(v_B-v_A)/2$; a differential multi-level converter comprising a linear circuit which may be an active linear circuit; a differential multi-level converter wherein in response to a positive load current, a voltage $v_{cf1}$ across the capacitor $C_f$ will increase over time in state 2 and will decrease over time in state 3; a controller which seeks to maintain a voltage $v_{cf1}$ across the capacitor $C_f$ within a voltage deviation $\Delta V_1$ of a target voltage and wherein the voltage deviation $\Delta V$ determines a maximum target deviation of a discrete voltage level from an ideal voltage level; a controller which acts to maintain a voltage $v_{cf1}$ across the at least one capacitor $C_f$ within a voltage deviation $\Delta V_1$ of a target voltage and wherein the voltage deviation $\Delta V$ determines a maximum desired deviation of a discrete voltage level from an ideal voltage level; a controller operates on an on an unclocked basis to select switch states to synthesize a desired level; a hybrid supply generator and modulator provided as an integrated circuit including the differential multilevel converter and the multi-output regulation stage; a filter having first and second terminals with a first one of the first and second filter terminals coupled to the output terminal of the differential multilevel converter; an amplifier having a supply terminal coupled to a second one of the first and second filter terminals; a filter provided as a reconfigurable pulse shaping network; a disconnect switch coupled between an output terminal of a differential multilevel converter and a supply terminal of a radio frequency (rf) amplifier and operable to electrically disconnect the output terminal of the differential multilevel converter from the rf amplifier; a multi-output regulation stage having N outputs, the multi-output regulation stage comprising: N separate buck-boost converters configured to synthesize first and second voltages $v_A$ and $v_B$ wherein the first and second voltages $v_A$ and $v_B$ are coupled to respective ones of the first and second outputs of the multi-output regulation stage wherein each of the N separate buck-boost converters are provided as buck-boost converters comprising four switches to provide the buck-boost converters a 4-switch buck-boost converters; a multi-output regulation stage comprising N−2 flying capacitors and N−1 complementary switch pairs to yield up to $2^{(N-1)}$ switching states that may be used for level synthesis; a multi-output regulation stage comprising a pre-charge circuit configured to pre-charge at least some of the N−2 flying capacitors.

In accordance with a still further aspect of the concepts described herein a radio frequency (rf) module includes a hybrid supply generator/modulator comprising a hybrid magnetic/switched-capacitor power converter configured to synthesize three or more discrete supply modulator voltage levels $v_{SM}$ at its output at substantially any instant in time. The radio frequency (rf) module may further include one or more of the following features independently or in combination with one or more other features to include: a supply modulator having voltage levels $v_{SM}$ based upon a pair of independently-controlled dc supply voltages synthesized from an input voltage $V_{IN}$; the three or more discrete levels are related discrete voltage levels; the hybrid supply generator/modulator generates two or more regulated supply voltages and directly provides one or more additional supply voltage levels to a power amplifier; a hybrid supply generator/supply modulator which includes a multi-output regulation stage which receives, couples or otherwise receives an input voltage $V_{IN}$ and synthesizes two intermediate voltages $V_A$ and $V_B$; and a multilevel converter having its input differentially connected or otherwise coupled between voltages $V_A$ and $V_B$, the multilevel converter configured to enable synthesis of three or more instantaneous output voltage levels $v_{SM}$ wherein the hybrid supply generator/supply modulator is provided as integrated circuit.

In accordance with a still further aspect of the concepts described herein a system includes a differential multi-level converter; and a multi-output regulation stage having N outputs, the multi-output regulation stage comprising: N separate power converters configured to synthesize first and second voltages $v_A$ and $v_B$ wherein the first and second voltages $v_A$ and $v_B$ are coupled to respective ones of the first and second outputs of the multi-output regulation stage wherein depending upon voltage range requirements, at least one of the N separate power converters is implemented as a 4-switch buck-boost converter and at least one of the N separate power converters is implemented either as: a buck converter configured to supply the smaller of the two voltages $v_A$ and $v_B$; or as a boost converter configured to supply the larger of the two voltages $v_A$ and $v_B$.

According to another aspect of the present disclosure, a hybrid supply generator/modulator comprises: a multi-output regulation stage configured to receive an input voltage and synthesize two intermediate voltages having voltage levels different from each other; a multilevel converter configured to receive the two intermediate voltages at its input and provide a supply voltage having a voltage level corresponding to one of the two intermediate voltage levels or at least one synthesized voltage level different than the two intermediate voltage levels, the multilevel converter comprising at least one flying capacitor and a set of at least four switches; and at least one charge regulation circuit to control charge on the at least one flying capacitor.

In some embodiments, one of the two intermediate voltages is the input voltage. In some embodiments, the at least one flying capacitor and the set of at least four switches are collectively configured to transfer charge from the two intermediate voltages to the supply voltage.

In some embodiments, the at least one charge regulation circuit is configured to monitor a voltage of the at least one flying capacitor and to charge or discharge the at least one flying capacitor to maintain said voltage within a voltage range. In some embodiments, the charge regulation circuit includes a differential sensor configured to detect the voltage of the at least one flying capacitor. In some embodiments, the voltage range is based on a reference voltage. In some embodiments, the reference voltage is a variable voltage. In some embodiments, the reference voltage is related to the two intermediate voltages. In some embodiments, the reference voltage is derived from the two intermediate voltages. In some embodiments, the reference voltage is at a midpoint between the two intermediate voltages. In some embodiments, the at least one charge regulation circuit is configured to control the charge on the at least one flying capacitor based on a comparison involving the reference voltage and the voltage across the at least one flying capacitor. In some embodiments, the at least one charge regulation circuit is configured to control the charge on the at least one flying capacitor based on comparing a magnitude of a difference between the reference voltage and the voltage across the at least one flying capacitor to a threshold value.

In some embodiments, the at least one charge regulation circuit is configured to selectively control the charge of the at least one flying capacitor based on a state or mode. In some embodiments, the state or mode is a state or mode of the hybrid supply generator/modulator. In some embodiments, the at least one charge regulation circuit is configured to control the charge of the at least one flying capacitor during at least one of: a shutdown mode of operation; a standby mode of operation; and a startup mode of operation.

In some embodiments, the at least one charge regulation circuit comprises a linear regulator configured to receive a reference voltage and to control the charge of the at least one flying capacitor. In some embodiments, the at least one charge regulation circuit further comprises another set of at least two switches configured to selectively connect terminals of the at least one flying capacitor to the linear regulator. In some embodiments, a first one of the another set of at least two switches is connected between an output of the linear regulator and a first terminal of the at least one flying capacitor, and a second one of the another set of at least two switches is connected between the output of the linear regulator and a second terminal of the at least one flying capacitor. In some embodiments, the another set of at least two switches are configured to sink or source current through the at least one flying capacitor to maintain a voltage of the at least one flying capacitor within a voltage range.

In some embodiments, the at least one charge regulation circuit comprises: a regulator having one or more controllable source elements configured to charge and discharge the at least one flying capacitor; and a charge control circuit configured to receive a reference voltage and to control individual ones of the controllable source elements to maintain a voltage across the at least one flying capacitor to within a voltage range. In some embodiments, the one or more controllable source elements comprise one or more controllable current sources. In some embodiments, the one or more controllable source elements are configured to sink or source current through the at least one flying capacitor to maintain a voltage of the at least one flying capacitor within a voltage range.

In some embodiments, the at least one flying capacitor includes a plurality of flying capacitors, wherein the at least one charge regulation circuit comprises a plurality of charge regulation circuits each configured to control charge on a corresponding one of the plurality of flying capacitors. In some embodiments, the at least one charge regulation circuit is configured to adjust at least one of the two intermediate voltages.

According to another aspect of the present disclosure, a method is provided for controlling charge on at least one flying capacitor of a hybrid supply generator/modulator having a multi-output regulation stage and a multilevel converter, the method comprising: monitoring a voltage of the at least one flying capacitor; and charging or discharging the at least one flying capacitor to maintain said voltage within a voltage range.

In some embodiments, the monitoring of the voltage of the at least one flying capacitor comprises detecting the voltage of the at least one flying capacitor using a differential sensor. In some embodiments, the voltage range is based on a reference voltage. In some embodiments, the reference voltage is a variable voltage. In some embodiments, the reference voltage is derived from two intermediate voltages generated by the multi-output regulation stage. In some embodiments, the reference voltage is between two intermediate voltages generated by the multi-output regulation stage. In some embodiments, the charging or discharging of the at least one flying capacitor to maintain said voltage within a voltage range comprises performing a comparison involving the voltage of the at least one flying capacitor to the reference voltage. In some embodiments, the comparison comprises: calculating a difference between the reference voltage and the voltage of the at least one flying capacitor; and comparing a magnitude of the difference to a threshold value.

In some embodiments, the method further comprises: determining a mode of operation of the hybrid supply generator/modulator, wherein the charging or discharging of the at least one flying capacitor is responsive to the determined mode of operation. In some embodiments, the wherein the charging or discharging of the at least one flying capacitor is responsive to the mode of operation being at least one of: a shutdown mode of operation; a standby mode of operation; and a startup mode of operation.

In some embodiments, the charging or discharging of the at least one flying capacitor comprises operating a plurality of switches configured to selectively connect terminals of the at least one flying capacitor to a regulator. In some embodiments, the charging or discharging of the at least one flying capacitor comprises controlling one or more controllable source elements. In some embodiments, the method further comprises adjusting at least one of two intermediate voltages generated by the multi-output regulation stage using circuitry also used for the charging or discharging of the at least one flying capacitor.

According to another aspect of the present disclosure, an apparatus comprises: a multi-output regulation stage having an input to receive an input voltage and at least two outputs to provide two intermediate voltages having voltage levels different from each other; a multilevel converter having at least two inputs to receive the two intermediate voltages and provide an output voltage having a level corresponding to one of the two intermediate voltage levels or another level generated from the two intermediate voltage levels using at least one capacitor; and at least one charge regulation circuit to regulate voltage across the at least one capacitor to maintain said voltage within a range.

According to another aspect of the present disclosure, a system comprises: a hybrid supply generator/modulator having: a first stage having an input configured to receive an input voltage and first and second outputs configured to provide respective first and second intermediate voltages having respective first and second intermediate voltage levels, and a second stage having first and second inputs configured to respectively receive the first and second intermediate voltages, a switching network, at least one energy storage device, and an output configured to provide an output voltage; and a controller configured to operate the switching network to modulate the voltage level of the output voltage from among a set of three or more voltage levels.

In some embodiments, the first or second intermediate voltage corresponds to the input voltage. In some embodiments, the set of three or more voltages levels includes at least: a first voltage level corresponding to the first intermediate voltage level; a second voltage level different from the first and second intermediate voltage levels; and a third voltage level corresponding to the second intermediate voltage level. In some embodiments, the switching network has at least the following states: a first state producing the third voltage level; a second state producing the second voltage level; a third state also producing the second voltage level; and a fourth state producing the first voltage level.

In some embodiments, in response to a command to set the output voltage level to the second voltage level, the controller uses a state machine to operate the switching network alternately between the second and third states to maintain the second voltage level. In some embodiments, transitions of the state machine are based at least in part on a voltage across the at least one energy storage device. In some embodiments, transitions of the state machine are based on comparisons involving a voltage across the at least one energy storage device, the first and second intermediate voltage levels, and a threshold value.

In some embodiments, the switching network includes: a first switch having a first terminal connected to the second input of the second stage; a second switch having a first terminal connected to a second terminal of the first switch; a third switch having a first terminal connected to a second terminal of the second switch; and a fourth switch having a first terminal connected to a second terminal of the third switch and a second terminal connected to the first input of the second stage. In some embodiments, in the first state, the first and second switches are on; in the second state, the first and third switches are on; in the third state, the second and fourth switches are on; and in the fourth state, the third and fourth switches are on.

In some embodiments, a first terminal of the at least one energy storage device is connected between the first and second switches and a second terminal of the at least one energy storage device is connected between the third and fourth switches. In some embodiments, the output of the second stage is connected between the second and third switches. In some embodiments, the set of three or more voltages levels includes at least: a first voltage level corresponding to the first intermediate voltage level; a second voltage level different from the first and second intermediate voltage levels; a third voltage level also different from the first and second intermediate voltage levels; and a fourth voltage level corresponding to the second intermediate voltage level.

In some embodiments, the switching network has at least the following states: a first state corresponding to the first voltage level; a second state corresponding to the second voltage level; a third state also corresponding to the second voltage level; a fourth state corresponding to the third voltage level; a fifth state also corresponding to the second voltage level; a sixth state also corresponding to the third voltage level; a seventh state also corresponding to the third voltage level; and an eighth state corresponding to the fourth voltage level. In some embodiments, the controller uses: a first state machine to operate the switching network alternately between the second, third, and fifth states to maintain the second voltage level; and a second state machine to operate the switching network alternately between the fourth, sixth, and seventh states to maintain the third voltage level.

In some embodiments, the at least one energy storage device includes a plurality of energy storage devices, and wherein transitions of the first and second state machines are based on voltages across each of the plurality of energy storage devices. In some embodiments, transitions of the first and second state machines are based on comparisons involving voltages across one the plurality of energy storage devices, the first and second intermediate voltage levels, and threshold values.

In some embodiments, the switching network includes: a first switch having a first terminal connected to the second input of the second stage; a second switch having a first terminal connected to a second terminal of the first switch; a third switch having a first terminal connected to a second terminal of the second switch; a fourth switch having a first terminal connected to a second terminal of the third switch; a fifth switch having a first terminal connected to a second terminal of the fourth switch; and a sixth switch having a first terminal connected to a second terminal of the third switch and a second terminal connected to the first input of the second stage.

In some embodiments, in the first state, the fourth, fifth, and sixth switches are on; in the second state, the first, fourth, and fifth switches are on; in the third state, the second, fourth, and sixth switches are on; in the fourth state, the first, second, and fourth switches are on; in the fifth state, the third, fifth, and sixth switches are on; in the sixth state, the first, third, and fifth switches are on; in the seventh state, the second, third and sixth switches are on; and in the eight state, the first, second, and third switches are on.

In some embodiments, the at least one energy storage device includes first and second energy storage devices; a first terminal of the first energy storage device is connected between the second and third switches and a second terminal of the first energy storage device is connected between the fourth and fifth switches; and a first terminal of the second energy storage device is connected between the first and second switches and a second terminal of the second energy storage device is connected between the fifth and sixth switches. In some embodiments, the output of the second stage is connected between the third and fourth switches.

According to another aspect of the present disclosure, a method is provided for controlling a hybrid supply generator/modulator, the method comprising: producing control signals to turn switches of a second stage of the hybrid supply generator/modulator on and off to modulate a voltage level of a supply voltage from among a set of three or more voltage levels, wherein the hybrid supply generator/modulator comprises a first stage to generate first and second intermediate voltage levels from a first input and a second stage to synthesize the supply voltage from the first and second intermediate voltage levels.

In some embodiments, turning the switches of the second stage on and off includes using one or more state machines to alternately operate the switches between the different ones of at least four distinct switching states to maintain at least one of the set of three or more voltage levels. In some embodiments, transitions of the one or more state machines are based on a voltage across at least one energy storage device of the second stage. In some embodiments, transitions of the one or more state machines are based on comparisons involving a voltage across the at least one energy storage device, the first and second intermediate voltage levels, and at least one threshold value. In some embodiments, the one or more state machines include at least two state machines, and wherein transitions of the state machine are based on comparisons involving a voltage across the at least one energy storage device, the first and second intermediate voltage levels, and at least two threshold values.

According to another aspect of the present disclosure, a hybrid generator/modulator comprises: a regulation stage having a single input and at least two outputs, the regulation stage configured to receive an input voltage at the single input and to provide two intermediate voltages at respective ones of the at least two outputs; and a multilevel converter configured to receive the two intermediate voltages and provide an output voltage having a voltage level corresponding to a voltage level of one of the two intermediate voltages or at least one other voltage level synthesized from the two intermediate voltages.

In some embodiments, the regulation stage comprises a converter with a single input and more than one output and a single inductive element. In some embodiments, the regulation stage comprises: a first decoupling capacitor connected to a first one of the at least two outputs; and a second decoupling capacitor connected to a second one of the at least two outputs. In some embodiments, the regulation stage further comprises a differential decoupling capacitor connected across the at least two outputs.

In some embodiments, the regulation stage comprises two converters to provide respective ones of the two intermediate voltages. In some embodiments, at least one of the two converters is a buck-boost converter. In some embodiments, at least one of the two converters is a buck converter. In some embodiments, at least one of the two converters is a boost converter. In some embodiments, at least one of the two converters comprises at least two switches and at least one inductive element.

In some embodiments, the regulation stage comprises: at least on inductive element; a first switch connected between the single input and the at least one inductive element; a second switch connected at one end between the first switch and the at least one inductive element and at another end to ground; a third switch connected between the at least one inductive element and a first one of the at least two outputs; and a fourth switch connected at one end between the fourth switch, the at least one inductive element, and the third switch, and at another end to a second one of the at least two outputs. In some embodiments, the regulation stage further comprises a fourth switch connected at one end between the at least one inductive element and the third switch and at another end to ground. In some embodiments, the hybrid generator/modulator further comprises two additional switches configured to enable direct energy transfer between the at least two outputs.

In some embodiments, the regulation stage comprises: a first converter configured to generate a first one of the two intermediate voltages; and a second converter configured to generate a second one of the two intermediate voltages, wherein the first and second converters are in a cascade arrangement. In some embodiments, the regulation stage wherein the second converter is powered by the first one of the two intermediate voltages generated by the first converter. In some embodiments, the second converter is a buck converter. In some embodiments, a voltage level of the first one of the two intermediate voltages is greater than a voltage level of the second one of the two intermediate voltages.

In some embodiments, the regulation stage comprises: a direct connection between the single input is and a first one of the at least two outputs; and a first regulator coupled between the single input is and a second one of the at least two outputs. In some embodiments, the first regulator comprises a buck converter. In some embodiments, the first regulator comprises a boost converter.

According to another aspect of the present disclosure, a system comprises: a regulation stage having at least one output coupled to an input via one or more converters, the regulation stage configured to receive an input voltage at a single input and to provide at least one intermediate voltage at the at least one output; and a multilevel converter configured to receive two intermediate voltages including the at least one intermediate voltage provided by the regulations stage and to provide an output voltage having a voltage level corresponding to a voltage level of one of the two intermediate voltages or at least one other voltage level synthesized from the two intermediate voltages.

According to another aspect of the present disclosure, a system comprises: a hybrid supply generator/modulator comprising: an input to receive an input voltage; an output to provide a modulated voltage; a multi-output regulation stage configured to provide two intermediate voltages having voltage levels different from each other, at least one of the two intermediate voltages synthesized from the input voltage; and a multilevel converter configured to receive the two intermediate voltages and to generate the modulated voltage having a voltage level corresponding to one of the two intermediate voltage levels or at least one synthesized voltage level different from both intermediate voltage levels; and circuitry coupled to the output of the hybrid supply generator/modulator and to a power supply terminal of at least one radio frequency (rf) amplifier, the circuitry configured to modify the modulated voltage supplied to the at least one rf amplifier.

In some embodiments, the circuitry comprises a disconnect switch configured to selectively supply a zero voltage level to the at least one rf amplifier. In some embodiments, the circuitry comprises a disconnect switch configured to selectively isolate the output of the hybrid supply generator/modulator from the at least one rf amplifier. In some embodiments, the disconnect switch is configured to be actuated in conjunction with enabling or disabling the rf amplifier.

In some embodiments, the circuitry comprises a pulse shaping network (PSN) configured to filter the modulated voltage. In some embodiments, the PSN includes at least one passive element. In some embodiments, the at least one passive element is realized as a discrete element. In some embodiments, the at least one passive element is realized on an integrated circuit (IC) or module. In some embodiments, the at least one passive element results from parasitic resistance, inductance, or capacitance. In some embodiments, the PSN includes: first and second inductors connected in series between the output of the hybrid supply generator/modulator and the power supply terminal of the at least one rf amplifier; a capacitor having a first terminal connected between first and second inductors; and a third inductor connected between a second terminal of capacitor and ground.

In some embodiments, the PSN includes: a resistor having a first terminal connected to the output of the hybrid supply generator/modulator; and a capacitor having a first terminal connected to a second terminal of the resistor and a second terminal connected to ground. In some embodiments, the PSN includes: a capacitor having a first terminal connected to the output of the hybrid supply generator/modulator and a second terminal connected to ground; and a resistor having a first terminal connected to the first terminal of the capacitor.

In some embodiments, the circuitry further comprises a switching network. In some embodiments, the switching network is configured such that in a first state, the switching network provides a first signal path having a first filter configuration between the output of the hybrid supply generator/modulator and the power supply terminal of the at least one rf amplifier, and in a second state, the switching network provides a second signal path having a second, different filter configuration between the output of the hybrid supply generator/modulator and the and the power supply terminal of the at least one rf amplifier. In some embodiments, the switching network comprises at least one passive element having a first terminal connected to the output of the hybrid supply generator/modulator, a switching network configured such that in a first state the switching network connects a second terminal of the at least one passive element to ground, and in a second state, the switching network disconnects the second terminal of the at least one passive element from ground.

In some embodiments, the switching network is coupled in a cascaded configuration with the hybrid supply generator/modulator. In some embodiments, the switching network is coupled across the PSN and configured to selectively provide a signal path which bypasses the PSN. In some embodiments, the switching network is coupled in parallel with a passive element of the PSN and configured to alter a transfer function of the PSN by selectively shorting at least one passive element. In some embodiments, the switching network comprises plurality of switches and at least a first set of the plurality of switches are located on a first integrated circuit die and at least a second set of the plurality of switches are located on a second, different integrated circuit die.

According to another aspect of the present disclosure, a system comprises: a hybrid supply generator/modulator comprising: an input to receive an input voltage; an output to provide a modulated voltage; a multi-output regulation stage configured to provide two intermediate voltages having voltage levels different from each other, at least one of the two intermediate voltages synthesized from the input voltage; and a multilevel converter configured to receive the two intermediate voltages and to generate the modulated voltage having a voltage level corresponding to one of the two intermediate voltage levels or at least one synthesized voltage level different from both intermediate voltage levels, wherein the output of the hybrid supply generator/modulator is directly or indirectly coupled to a power supply input of at least one radio frequency (rf) amplifier.

According to another aspect of the present disclosure, a method is provided for change a frequency response of circuit coupled to an output of a hybrid supply generator/modulator and to a radio frequency (rf) amplifier, the method comprising: in a first state, configuring the circuit to provide a first signal path having a first filter configuration between the hybrid supply generator/modulator output and the rf amplifier input; and in a second state, configuring the circuit to provide a second signal path having a second, different filter configuration between the hybrid supply generator/modulator output and the rf amplifier input.

According to another aspect of the present disclosure, a hybrid generator/modulator comprises: a regulation stage configured to provide two intermediate voltages having voltage levels different from each other, at least one of the two intermediate voltages synthesized from an input voltage; and a plurality of multilevel converters each configured to selectively output three or more instantaneous output voltage levels from the two intermediate voltages for supplying one or more power amplifiers (PAs).

In some embodiments, at least two of the plurality of multilevel converters are used to produce a supply voltage provided to at least one of the one or more PAs. In some embodiments, outputs of the at least two of the plurality of multilevel converters are combined via a combiner circuit to produce said supply voltage. In some embodiments, the combiner circuit comprises a coupled magnetic structure. In some embodiments, the combiner circuit comprises a first winding connected at a first end to the output of the first of the at least two of the plurality of multilevel converters; and a second winding connected at a first end to the output of the second of the at least two of the plurality of multilevel converters. In some embodiments, the first and second windings have equal numbers of turns. In some embodiments, the combiner circuit comprises one or more inductors. In some embodiments, the combiner circuit comprises at least one of: an interphase transformer combiner; uncoupled magnetics; a transmission-line transformer combiner; and a three-port lumped or distributed passive network.

In some embodiments, at least one of the plurality of multilevel converters is coupled to a supply terminal of at least one of the one or more PAs via a filter circuit. In some embodiments, each of the plurality of multilevel converters is independently controllable. In some embodiments, one or more PAs include one or more radio frequency (rf) PAs.

According to another aspect of the present disclosure, a hybrid supply generator/modulator comprises: a regulation stage configured to provide two intermediate voltages having voltage levels different from each other, at least one of the two intermediate voltages synthesized from an input voltage; and at least two differential multilevel converters each configured to selectively output three or more instantaneous output voltage levels from the two intermediate voltages, wherein the outputs of the at least two differential multilevel converters are coupled to provide a power amplifier (PA) supply voltage; and a controller configured to independently control each of the at least two differential multilevel converters.

In some embodiments, the controller is configured to receive an input signal indicating a desired voltage level of the PA supply voltage and to provide outputs for independently commanding the instantaneous output voltage level of the at least two differential multilevel converters according to the desired voltage level. In some embodiments, the controller is configured to delay commanding one of the at least two differential multilevel converters relative to another one of the at least two differential multilevel converters such that the instantaneous output voltage levels of the at least two differential multilevel converters are different during a period corresponding to a duration of the delay. In some embodiments, the controller is configured to select the one of the at least two differential multilevel converters to delay commanding using a state machine. In some embodiments, the duration of the delay is configurable. In some embodiments, the at least two differential multilevel converters include at least a first differential multilevel converter, a second differential multilevel converter, and a third differential multilevel converter, wherein the controller is configured to delay command of the first differential multilevel converter relative to the second differential multilevel converter using a first delay duration, and to delay command of the second differential multilevel converter relative to the third differential multilevel converter using a second delay duration different from the first delay duration.

According to another aspect of the present disclosure, a method is provided for adjusting a time domain shape and frequency content of a supply voltage using two or more differential multilevel converters, the method comprising: receiving an input signal indicating a desired voltage level of the supply voltage; generating a first output to command an instantaneous output voltage level of a first one of the two or more differential multilevel converters according to the desired voltage level; and after a delay, generating a second output to command an instantaneous output voltage level of a second one of the two or more differential multilevel converters according to the desired voltage level.

In some embodiments, the instantaneous output voltage levels of the two or more differential multilevel converters are different during a period corresponding to a duration of the delay. In some embodiments, the method further comprises: changing the duration of the delay in order to adjust the time domain shape and the frequency content of the supply voltage. In some embodiments, the method further comprises: selecting which of the two or more differential multilevel converters to delay command of using state machine.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1A:
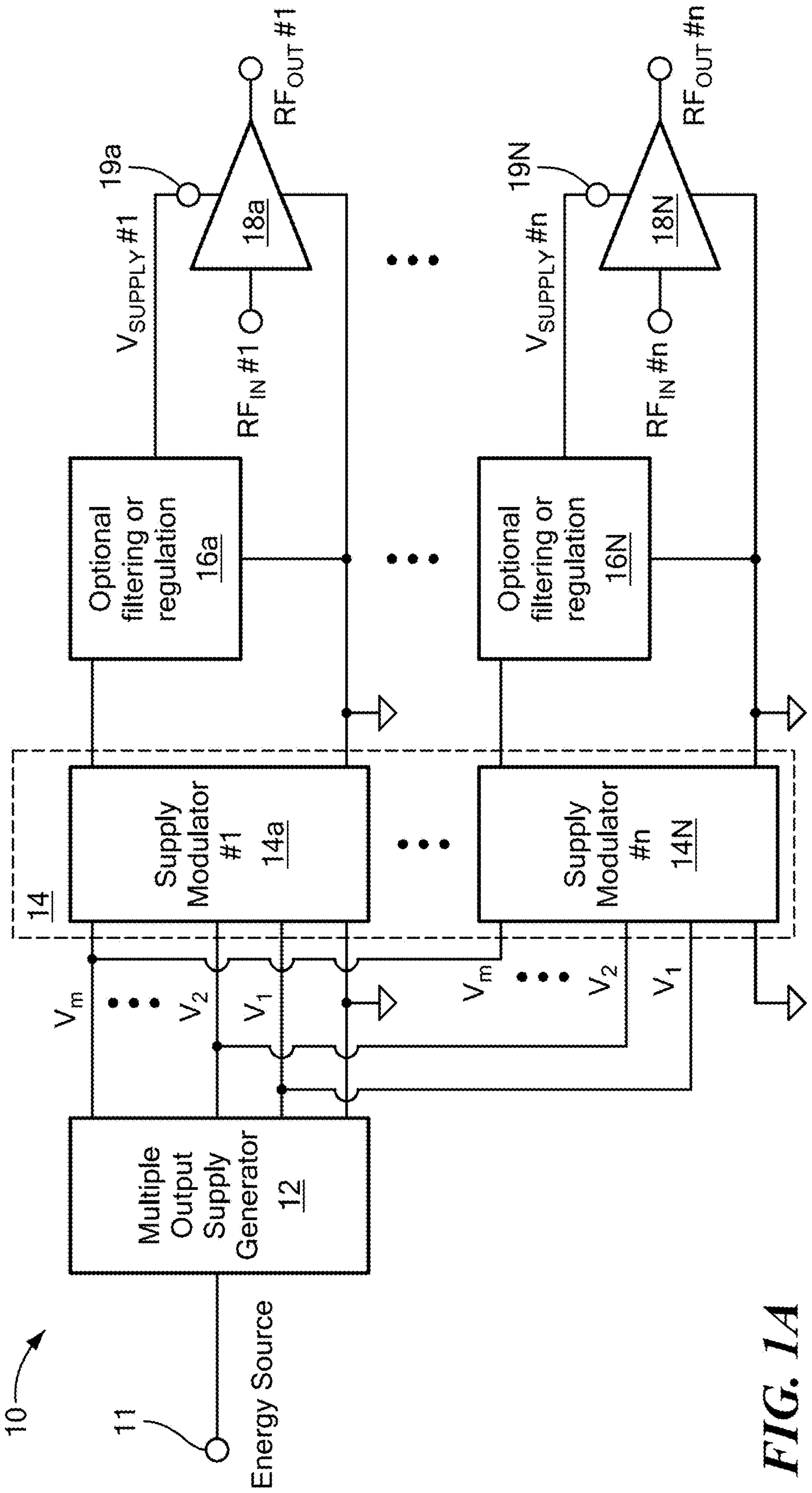
FIG. 1A is a block diagram of an rf amplifier system utilizing multiple supply levels which may supply multiple PAs.

Referring now to FIG. 1A, shown is an overview of an illustrative rf power amplifier system architecture utilizing supply modulation wherein a supply modulator switches among multiple voltages generated by a separate supply generator (elements and aspects signal processing and control for such a system are omitted for clarity).

Illustrative system 10 includes a multiple output supply generator subsystem (or more simply a "supply generator") 12 that can synthesize multiple power supply voltages $V_1$-$V_m$ from a single input source 11. In some examples, supply generator 12 may regulate one or more of power supply voltages $V_1$-$V_m$. Supply generator 12 provides one or more of the voltages $V_1$-$V_m$, to inputs of one or more supply modulators subsystems (or more simply "supply modulators") 14*a*-14N of a supply modulator system 14. Supply modulators 14*a*-14N can switch (and ideally, rapidly switch) among the different power supply voltages provided thereto by supply generator 12 to thus provide modulated supply voltages $V_{supply\ \#1}$–$V_{supply\ \#N}$ at an output thereof. Switches may be modulated sufficiently rapidly to provide a power supply voltage to the PA such that the PA can provide the required rf output envelope while maintaining high efficiency, in accordance with techniques known in the art as discrete drain modulation, envelope tracking advanced (ETA), discrete envelope tracking, and digital envelope tracking (digital ET). Such techniques are described, for example, in one or more of U.S. Pat. Nos. 8,829,993;

9,160,287; 9,166,536; 9,172,336; 9,209,758; 9,755,672. The supply voltage inputs may be coupled to supply terminals of respect ones of one or more PAs 18*a*-18N. In some examples, PAs 18*a*-18N may be provided as rf power amplifiers. In some examples, supply generator 12 may supply the same or different voltages to supply modulators 14. In some examples, supply generator 12 a different number of voltages may be coupled between supply generator 12 and supply modulators 14.

In some examples, some or all of the supply voltages may be coupled to the supply terminals of the PAs through respective ones of optional filtering or voltage regulation stages 16*a*-16N. The filtering/regulation stages 16*a*-16N may comprise filtering networks, including passive filters and/or active filters and/or additional means of regulating the voltage (e.g., including low-dropout regulator(s), LDOs) to the PA, $V_{supply}$, from the modulated voltage, $V_{mod}$.

In some examples, one, some or all of the supply modulator subsystems 14*a*-14N may comprise one or more switches to couple one or more voltages provided by supply generator 12 to PA supply terminals 19*a*-9N. A variety of different switching circuits (i.e. switches having a wide a variety of switch configurations or switch topologies) may be utilized to realize supply modulator subsystems 14. For example, a supply modulator subsystem may comprise a plurality of serially coupled switches configured to provide a "series" modulator. Alternatively, a supply modulator subsystem may comprise a plurality of parallel coupled switches configured to provide a "parallel" modulator. Alternatively still, a supply modulator subsystem may comprise one or more serially coupled switches and one or more parallel coupled switches.

It is appreciated that the manner in which the voltages are synthesized by the supply generator affects the required ratings of the switches in the one or more supply modulators 14*a*-14N. This can be an important consideration as the required voltage ratings of the modulator switches can influence (and in some cases, highly influence) switching speed (and achievable modulation rate) and modulator efficiency, both of which are significant system factors. Regardless of the modulator switch topology used, if there are m supply levels ordered in increasing voltage $V_1, \ldots, V_m$ (i.e. $V_1<V_2< \ldots <V_m$), the plurality (or chain) of switches coupled between the $j^{th}$ supply voltage $V_j$ and the output $V_{mod}$ may ideally be rated to block at least a negative voltage of magnitude $(V_m-V_j)$ and a positive voltage that is either $(V_j- V_1)$ or $V_j$ depending upon whether the modulator sources a lowest voltage $V_1$ or should ideally be able to directly supply zero volts to the PA. In some examples having designs of the latter type, where the power supply provided to the PA needs to be "cut off" (discharged to a zero volt power supply), a separate low-frequency "turn-off" or "disconnect" switch can be advantageously placed in series with the output of a supply modulator capable of sourcing modulator output voltages $V_1, \ldots, V_m$. Such a turn-off switch can reduce the modulator switch chain voltage blocking requirements from $V_j$ to $(V_1-V_1)$; this can be advantageous for modulator design. Thus, In some examples, an rf power amplifier system such as system 10 may comprise a "series" modulator in a form suitable for integrated circuit (IC) fabrication and for use with ratiometric supply voltages (e.g., $V_2=2V_1$, $V_3=3V_1$, $V_4=4V_1$). Such a design illustrates the impact of the supply levels on the required voltage rating of individual modulator devices; by correct selection of the level voltages, the best use of integrated CMOS processes can be made using both core devices and extended voltage devices to achieve the required voltage blocking characteristics of the modulator switch chains. Moreover, such a circuit illustrates the use of the generated levels for gate drive of the devices. This type of drive approach facilitates high efficiency and switching speed. However, to take advantage of driving the device gates between adjacent level voltages (e.g., between $V_j$ and $V_{j-1}$), level voltages for this design should be maintained with sufficient spacing; otherwise, more sophisticated gate drive designs may be needed that can limit achievable switching performance.

Figure 1B:
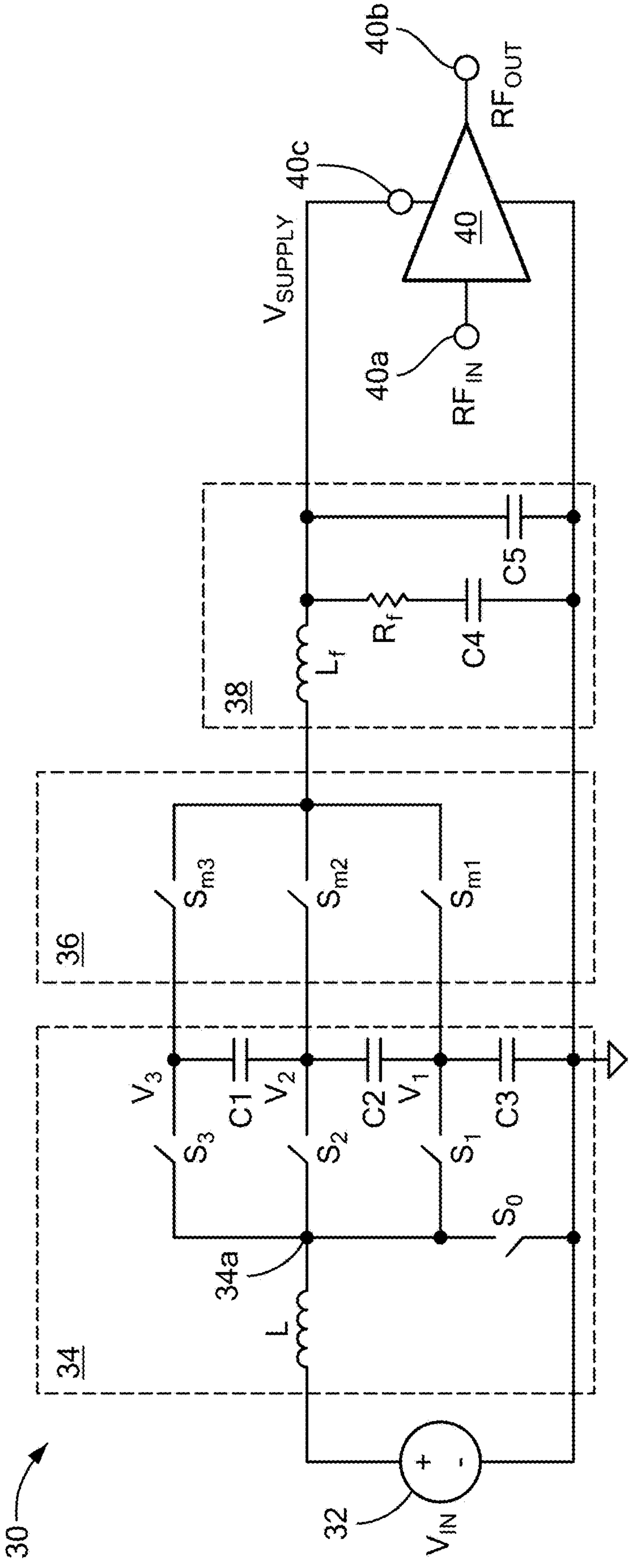
FIG. 1B is a block diagram of an rf amplifier system utilizing multiple supply levels and implemented as a single-inductor multiple-output boost converter as a supply generator, a parallel supply modulator and an LC filter.

FIG. 1B shows an implementation of the architecture illustrated in FIG. 1A, which may be suitable for discrete supply modulation, for example.

As shown, a system 30 can comprise a multiple output supply generator 34 a supply modulator 36 and optional filter 38 and a PA 40 having an rf input 40*a*, an rf output 40*b* and a supply terminal 40*c*. In this example of FIG. 1B, supply generator 34 is provided as a single inductor 3-output boost converter comprising an inductor L having a first terminal coupled to a voltage supply 32 and a second terminal coupled to a node 34*a*. One or more switches (here three switches $S_1$, $S_2$, $S_3$) have a first terminal coupled to node 34*a* and a second terminal coupled to at least one voltage node established via capacitor stack C1, C2, C3, C4 (e.g. a plurality of capacitors C1, C2, C3, C4 serially coupled between a first voltage node and ground so as to establish a plurality of voltage nodes $V_1$-$V_3$). A fourth switch $S_0$ has a first terminal coupled to node 34*a* and a second terminal coupled to ground. In the example of FIG. 1A, the second terminal of switches $S_1$, $S_2$, $S_3$ are coupled to respective ones of voltage nodes $V_1$, $V_2$, V3.

Also in the example of FIG. 1B, power supply modulator comprises a plurality of switches $S_{m1}$-$S_{m3}$ with a first terminal of each switch $S_{m1}$-$S_{m3}$ coupled to a corresponding one of voltage terminals $V_1$-$V_3$ and a second terminal of each switch $S_{m1}$-$S_{m3}$ coupled to a node 36*a*.

In the example of FIG. 1B, node 36*a* is coupled to supply terminal 40*c* of PA 40 though filter 38. In some examples, filter 38 can be provided as an LC filter comprising inductor Lf, resistor Rf and capacitors C4, C5. In other examples, node 36*a* may be coupled to supply terminal 40*c* of PA 40 through other circuitry (i.e. circuitry other than filter circuitry). In still other examples, node 36*a* may be directly coupled to supply terminal 40*c* of PA 40.

The illustrative systems illustrated in FIGS. 1A, 1B include two separate subsystems: (a) a supply generator that can synthesize multiple power supply voltages from a single input source, and possibly regulate one or more of those power supply voltages, and (b) one or more supply modulators that can each rapidly switch among the power supply voltages provided by the supply generator to provide a modulated supply voltage to a PA.

In accordance with the concepts described herein, the inventors have recognized that the manner in which these two subsystems are best implemented (or "realized") may depend upon the power level, voltage level and application space of the rf amplifier system. The inventors have also recognized that for many mobile applications (e.g., cell phones, smart phones, personal devices and the like), it may be desirable to monolithically integrate electronic elements of both the supply generator and supply modulator on a single semiconductor die (e.g., in a CMOS process or a BCD process). The inventors have further recognized that in some cases it may be desirable to integrate electronics for the supply generator, supply modulator(s) and PAs on a single die. In other cases (especially at high power) it may be desirable to implement the subsystems with discrete components connected on one or more printed circuit boards.

Figure 2B:
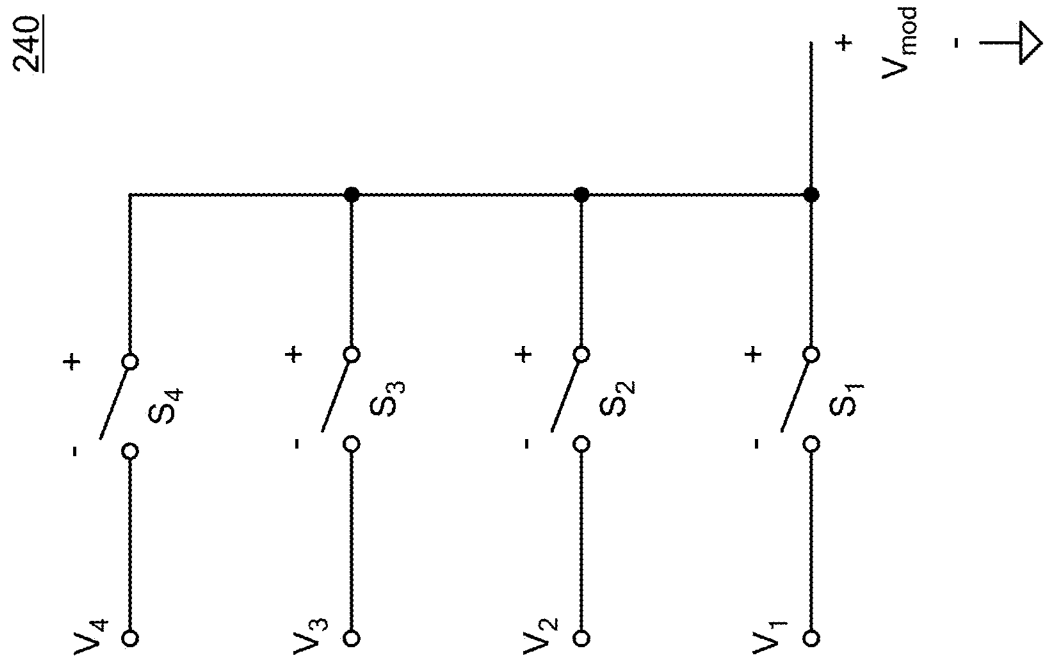
FIG. 2B is a schematic diagram of an illustrative switching network provided as a parallel supply modulator.
Figure 2A:
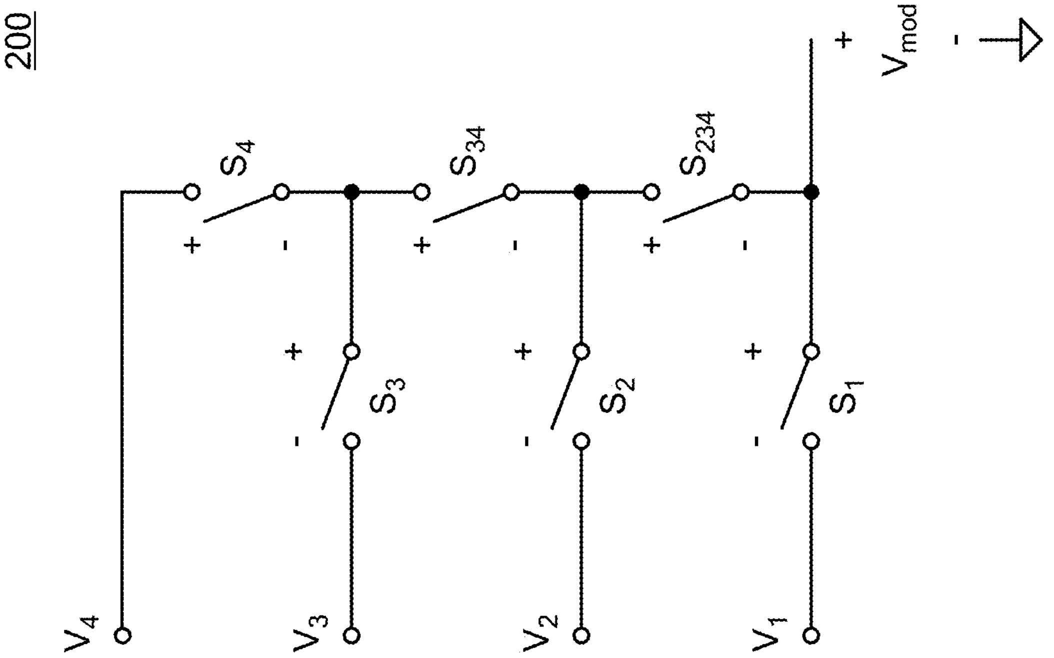
FIG. 2A is a schematic diagram of an illustrative switching network provided as a series supply modulator.

A variety of different switching circuits may be utilized to implement/realize a supply modulator subsystem. Two illustrative networks are shown in FIGS. 2A, 2B. FIG. 2A illustrates a series modulator 200 having switches $S_1$-$S_4$, $S_{34}$, and $S_{234}$ connected as shown. FIG. 2B illustrates a parallel modulator 240 having switches $S_1$-$S_4$ connected as shown. Additionally, filtering networks, including passive filters and/or active filters and/or additional means of regulating the voltage (e.g., including low-dropout regulator(s), LDOs) to the PA $V_{supply}$ from the modulated voltage $V_{mod}$, may be utilized, as illustrated in FIG. 1.

Figure 3:
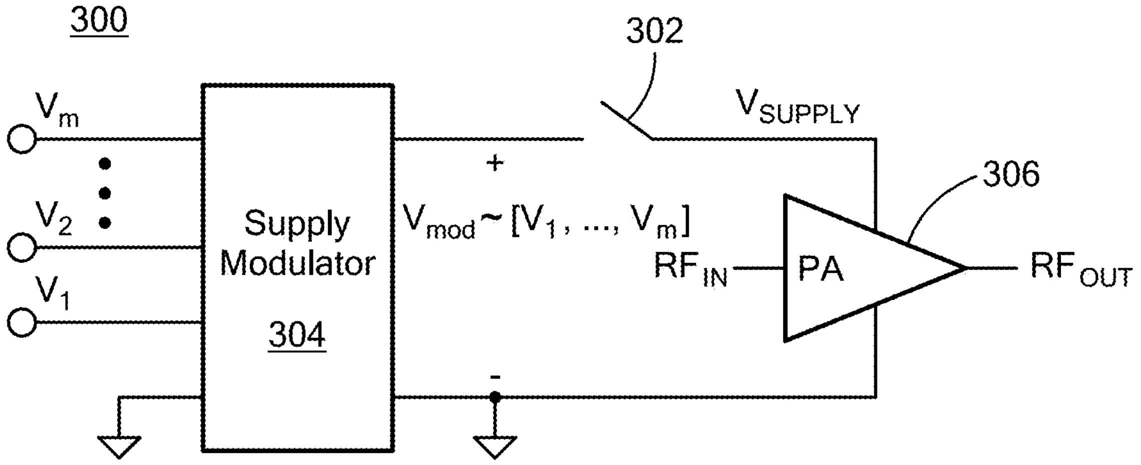
FIG. 3 is a block diagram of a supply modulator with a cascaded turn-off switch.

Referring now to FIG. 3, in some embodiments, the modulated power supply provided to the PA (e.g., $V_{supply}$) may need to be "cut off" (discharged to a zero-volt level). For example, this can be used to enable reduction of the modulator switch voltage ratings in cases when a zero output must be provided to the PA. In such cases, a circuit 300 can include a separate low-frequency turn-off switch 302 (or "disconnect switch") coupled in series between an output of a supply modulator 304 (capable of sourcing modulator output voltages $V_1, \ldots, V_m$) and a PA 306.

Figure 4:
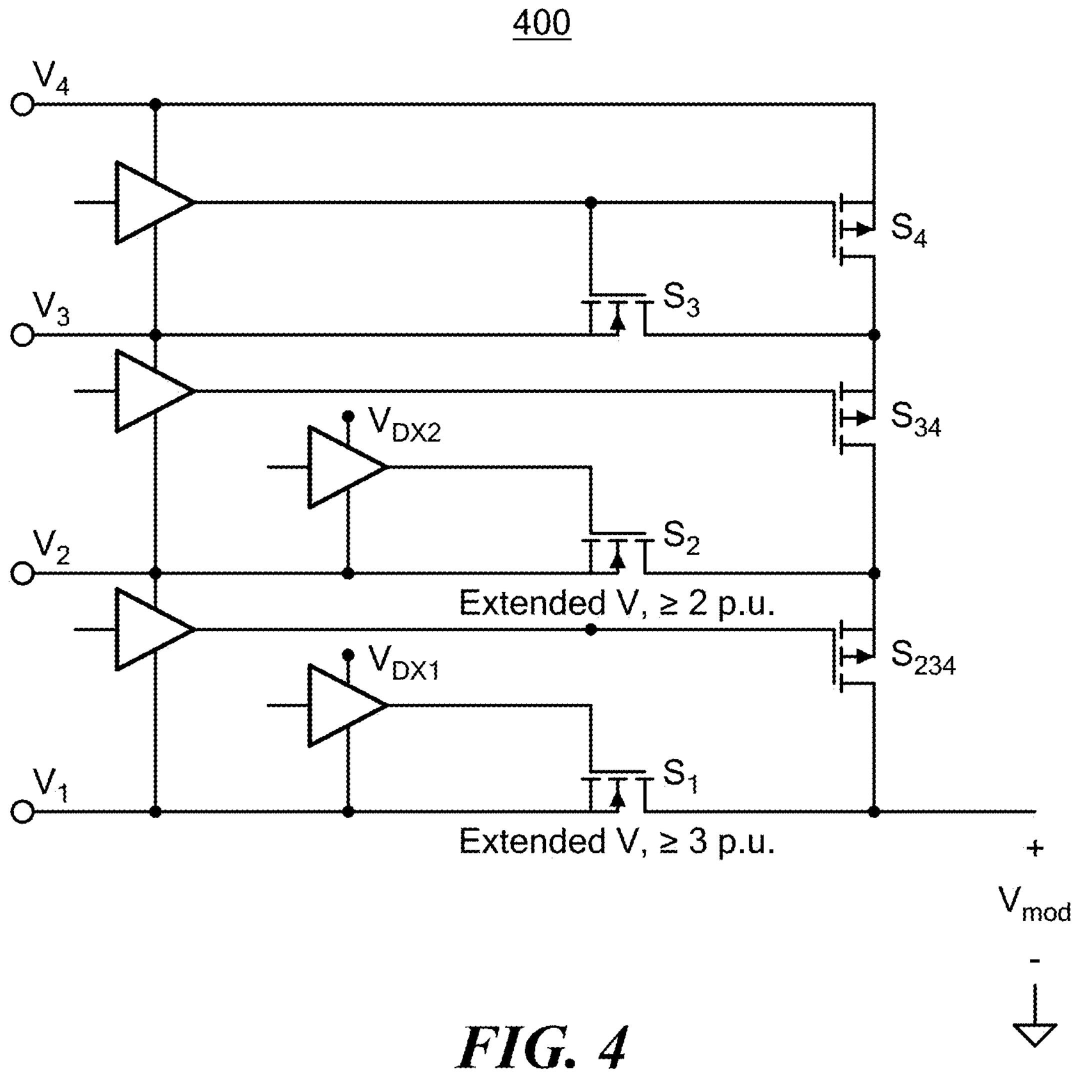
FIG. 4 is a schematic diagram of an illustrative implementation of the series modulator of FIG. 2A.

FIG. 4 shows an implementation of the series modulator of FIG. 2A, in a form suitable for integrated circuit fabrication and for use with ratiometric supply voltages (e.g., $V_2=2V_1$, $V_3=3V_1$, $V_4=4V_1$). An illustrative circuit 400 includes switches $S_1$, $S_2$, and $S_3$ implemented as NMOS transistors and switches $S_4$, $S_{34}$, and $S_{234}$ implemented as PMOS transistors. Circuit 400 also includes CMOS gate drivers powered differentially among levels.

Circuit 400 illustrates the impact of the supply levels on the required voltage rating of individual modulator devices; by correct selection of the level voltages, the best use of integrated CMOS processes can be made using both core devices and extended voltage devices to achieve the required voltage blocking characteristics of the modulator switch chains. Moreover, circuit 400 illustrates the use of the generated levels for gate drive of the devices (e.g., transistors). This type of drive approach can facilitate high efficiency and switching speed.

To take advantage of driving the device gates between adjacent level voltages (e.g., between $V_j$ and $V_{j-1}$), level voltages for this design must be maintained with sufficient spacing. Otherwise, more sophisticated gate drive designs may be needed that can limit achievable switching performance. Devices, circuits and techniques described herein facilitate maintaining voltage levels that are suitable for achieving integrated circuit-based modulators and high-performance gate drives through the ability to maintain desired voltage relationships among the levels.

Supply generators can be realized through a variety of methods. For example, supply generators can be realized using multiple separate converters, multiple-output magnetic converters, multiple-output switched-capacitor converters and hybrid magnetic/switched-capacitor converters providing a ratiometric set of output voltages. A further approach is to realize a multiple-output supply generator that creates two independently controllable dc voltages (e.g., with a magnetic conversion stage) and further uses a differential capacitive energy transfer stage to realize one or more further dc supply voltages that are that ratiometrically distributed between or around the two independently controllable voltages. Each of these approaches has limitations (which some may consider substantial limitations) in terms of achievable size, cost, efficiency and/or performance (e.g., modulation bandwidth) of supply-modulated rf amplifier systems.

Use of multiple separate power converters to generate the multiple supply voltages yields a solution that is flexible, allowing each output voltage to be independently regulated to desired values independent of input voltage variations and providing the ability to continuously adjust the output voltages over time (e.g., to provide for adaptive bias of the PA). Unfortunately, this solution is inherently large and expensive, owing to the large numbers of physically large power supply components (e.g., magnetic components) required.

Single-inductor multiple-output converters, (sometimes referred to as "SIMO" converters) allow multiple output voltages to be independently regulated while only requiring a single magnetic component, somewhat mitigating the size challenge of multiple power converters. However, as SIMO designs inherently utilize time-sharing of the inductor to supply the multiple outputs, performance and efficiency can degrade and control complexity can increase with increasing numbers of outputs. This characteristic can limit the efficacy of this approach in multilevel supply modulator systems, which typically utilize between three and seven supply levels to achieve high performance (with even more levels potentially desirable in some cases).

Some types of converters, such as conventional multiple-output magnetic converters (e.g., multi-output flyback converters), multiple-output switched-capacitor converters and hybrid magnetic/switched-capacitor converters yield multiple ratiometrically related output voltages while reducing the numbers of magnetic components required as compared to using multiple independent power converters. Traditional multiple-output magnetic converters typically utilize transformers with scaled turns ratios to generate multiple (ideally) ratiometrically scaled output voltages. These designs can only usually regulate a single output, with the ratiometric relations of the other outputs approximately maintained by the transformer turns ratios (unless additional "post regulation" is provided the other outputs, such as through use of added linear regulators). The use of transformers tends to lower achievable efficiency in these designs (often to unacceptable levels), and such designs may suffer significant cross regulation among the outputs in practice (i.e., one output voltage varying depending upon the load on a different output). This results in undesirable performance in rf amplifier systems unless additional post regulation is used, which can further degrade performance.

Multiple-output switched-capacitor converter circuits can generate multiple ratiometrically related output voltages while achieving very high efficiency and small size, with the rational (ideal) ratios among output voltages determined by the circuit topology and/or switching pattern. However, with this type of circuit, the output voltages are all scaled versions of the input voltage, which does not provide a means to continuously regulate the output voltages independent of variations in the input voltage; this is a significant disadvantage in many systems.

Some limitations of these previous approaches to multiple-output supply generation can be addressed via hybrid magnetic/switched-capacitor circuits having ratiometrically scaled outputs. In these designs, a magnetic regulation stage independently regulates a single output voltage (independent of the system input voltage) with additional ratiometrically-related output voltages synthesized and enforced through the action of a switched-capacitor voltage balancer stage. For example, in an m-output supply generator, the magnetic stage may take an input voltage $V_X$ and regulate a single output voltage $V_Y$, with the switched capacitor voltage action synthesizing (ideally) voltages $k_1-V_Y$, $k_2-V_Y$, . . . , $k_{m-1}-V_Y$, where constants $k_1$, . . . , $k_{m-1}$ are rational numbers determined by the circuit topology and/or switching pattern. Advantages of this approach include relatively high efficiency and small size requirements for synthesizing multiple related output voltages and relative simplicity of control.

Merits of the above design approaches notwithstanding, all designs yielding ratiometric supply generator voltage outputs have limitations (which some may consider significant limitations) for PA systems utilizing multiple level supply modulation.

One limitation of ratiometric outputs relates to the usable supply voltage ranges for available PAs. Some PAs may function well with wide supply voltage ranges of up to 4:1 or even larger (e.g., function well across a power supply voltage range from a maximum voltage of $V_{max}$ down to a minimum voltage equal to or less than $V_{min}=V_{max}/4$.) Many other PAs—including those typically used in applications such as Wi-Fi, mobile handset, and MIMO transmitters for LTE and 5G applications—can only operate over much narrower supply voltage ranges (e.g., 3:1 or even less). With ratiometric supply voltages, if the maximum voltage generated is reduced (e.g., for conditions of reduced average PA output power) then the synthesized ratiometric voltages are all reduced proportionately. This often means that one or more of the lowest synthesized voltages will become unusable for supply modulation under such conditions, as they fall below the allowed minimum PA power supply voltage. This in turn reduces the achievable PA efficiency enhancement that can be provided through supply modulation under these conditions. In many applications, it would be desirable if the power supply voltages were not maintained as a fixed set of ratios, such that all (or nearly all) of the synthesized supply voltage levels remained above the allowed minimum voltage for the PA under reduced power operation.

Another limitation of ratiometric outputs relates to how the spacing between voltages varies as the largest supply voltage synthesized is reduced. In a ratiometric-output supply generator, two adjacent voltages may be expressed as $k_j-V_Y$ and $k_{j-1}-V_Y$, where k is a scaling value, j is an integer index, V is a voltage and Y is an index corresponding to the number of voltage levels, $V_Y$ is the $Y^{th}$ voltage level and where the value of $V_Y$ may be scaled up or down as the average transmit power of the PA is adjusted. The difference between voltage levels may thus be expressed as $(k_j-k_{j-1})-V_Y$ which scales up and down proportional to $V_Y$. As described above in conjunction with FIG. 4, this can be problematic for driving of integrated modulator switches, especially where the gate drive voltages are derived from interlevel voltages (voltage differences between levels). This can result in increased gate drive complexity in an integrated modulator, and can limit achievable switching performance of the modulator. In many applications, it would be desirable for the power supply voltages not to be maintained as a fixed set of ratios, such that the spacing between adjacent levels can be controlled independently of the maximum supply voltage synthesized.

A Hybrid Power Supply Generator/Supply Modulator

For PA architectures using supply modulation, it may be desirable to provide a system that provides both very rapid variations in modulated power supply voltage (e.g., among multiple discrete levels) while also providing the ability to slowly adapt the voltages of the discrete levels over a desired range.

In particular, and as previously discussed, it would be useful to be able to efficiently and compactly generate a set of m discrete levels for supply to a PA, with two of the m voltage levels being independently controllable and the other m−2 voltage levels distributed in a prescribed relation to the two independently-controlled levels.

While not quite as flexible as truly independent control of all voltages, one would gain most of the practical benefits available from supply modulation (e.g., in terms of PA efficiency) while avoiding the above-described limitations associated with providing truly independent voltage level control or ratiometric levels. Such a design would provide significant advantages in combinations of size, cost, efficiency and performance as compared to existing approaches.

It would be further beneficial if one only need generate two regulated supply voltages and be able to directly provide one or more additional supply voltage levels to the PA, without the necessity of having a separate supply generator element to generate these additional levels cascaded with a supply modulator to select among the levels. Merging the functions of intermediate level generation and supply modulation can reduce the number and size of passive components (e.g., capacitors) required as well as the number, required area and loss of semiconductor elements (e.g., switches).

Figure 5:
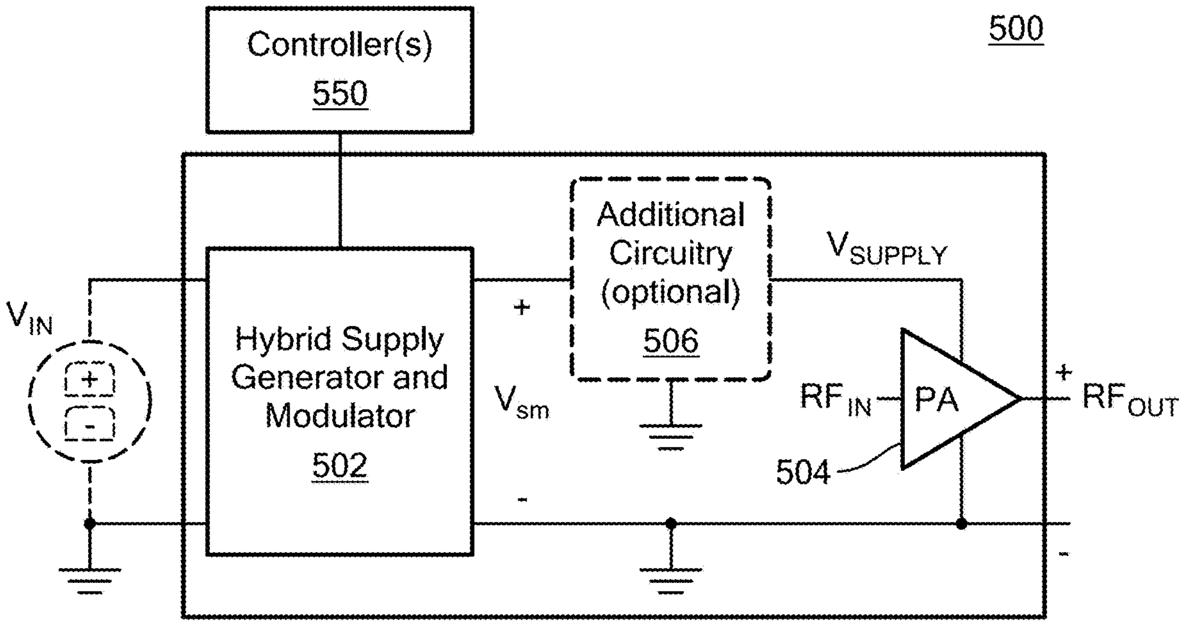
FIG. 5 is a block diagram of an rf amplifier system utilizing a hybrid supply generator/modulator to provide multiple supply levels.

Referring now to FIG. 5, shown is a general system architecture of an rf amplifier system (or "rf module") 500 comprising a hybrid supply generator/modulator 502 configured to generate and provide a modulated supply voltage $V_{sm}$ to a PA 504. The hybrid supply generator/modulator 502 may comprise a hybrid magnetic/switched-capacitor power converter that can synthesize three or more discrete levels (which may be related discrete voltage levels) at its output (i.e., voltage $V_{SM}$ may correspond to one of three or more discrete voltage levels at any instant in time). As described above, voltage $V_{SM}$ may be based upon a pair of two independently controlled dc supply voltages that it synthesizes from an input voltage $V_{IN}$. In some implementations, one of the two dc supply voltages may be directly equal to voltage $V_{IN}$, and the second supply voltage may be independently controlled.

Of note, "hybrid magnetic/switched-capacitor converters" are a broad class of converters. Disclosed systems described as "hybrid supply generator/modulator" may be considered a specific and subtype of this broad class. Also of note, in the term, "hybrid magnetic/switched-capacitor converters," the word "hybrid" refers to hybridization of a magnetic converter and a switched-capacitor converter together. In contrast, in the term "hybrid supply generator/modulator," the word "hybrid" refers to hybridization of the supply generator and supply modulator.

As shown in the figure, system 500 can optionally include additional circuitry 506 coupled between an output of the hybrid supply generator/modulator 502 and the PA 504. Additional circuitry 506 may comprise, for example, a disconnect switch, filtering network(s) including passive filters and/or active filters, low-dropout regulator(s), LDO(s), and/or additional means of regulating or controlling the PA supply voltage, $V_{supply}$, from the modulated voltage, $V_{sm}$. In some embodiments, additional circuitry 506 can have more than two terminals. For example, additional circuitry 506 can optionally be connected to ground, as shown.

System 500 can also include one or more controllers 550 to operate switches and/or other devices of hybrid supply generator/modulator 502 using control techniques described in detail below. For example, the one or more controllers 550 can implement, execute, or otherwise utilize one or more state machines described herein for modulating $V_{sm}$. In some embodiments, the hybrid supply generator/modulator 502 can include a multi-output regulation stage (or "first stage") and a differential multilevel converter (or "second stage") and the one or more controllers 550 can include at least one controller to control the switching state of the multi-output regulation stage and at least one controller to control the switching state of the differential multilevel converter. These can be the same controller or different controllers. In some embodiments, at least one of the one or more controllers 550 may be configured to receive commands for selecting/controlling a voltage level of the modulated voltage, $V_{sm}$.

Figure 11:
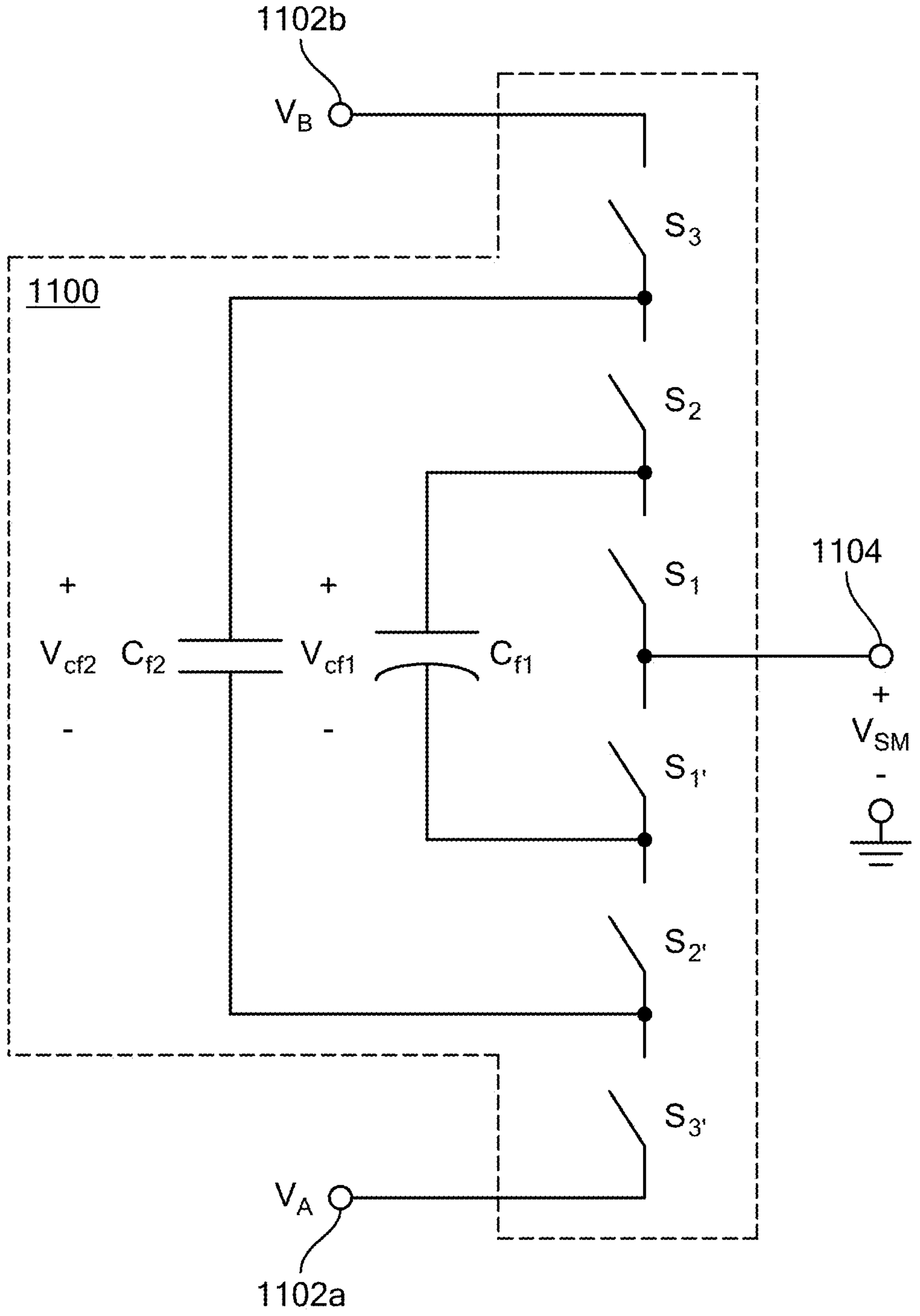
FIG. 11 is a schematic diagram of a differential multilevel converter suitable for use in a hybrid supply generator/supply modulator, the converter capable of providing four (4) effective output levels using eight (8) switch states.

In some embodiments, the one or more controllers 550 can include a digital controller configured to provide one or more control signals to one or more hybrid supply generators/modulators. In response, the hybrid supply generators/modulators can provide variable supply voltages to one or more rf amplifiers. That is, the control signals can be used to select discrete supply voltages for the amplifiers from among multiple independent supply voltages generated by the hybrid supply generator/modulators. In more detail, the control signals may be used to directly, or indirectly, operate one or more switches within the hybrid supply generator/modulator (e.g., switches within a multi-output regulation stage such as illustrated in FIGS. 7A-E and/or switches within the differential multilevel converter such as illustrated in FIG. 8 or FIG. 11.)

Figure 5A:
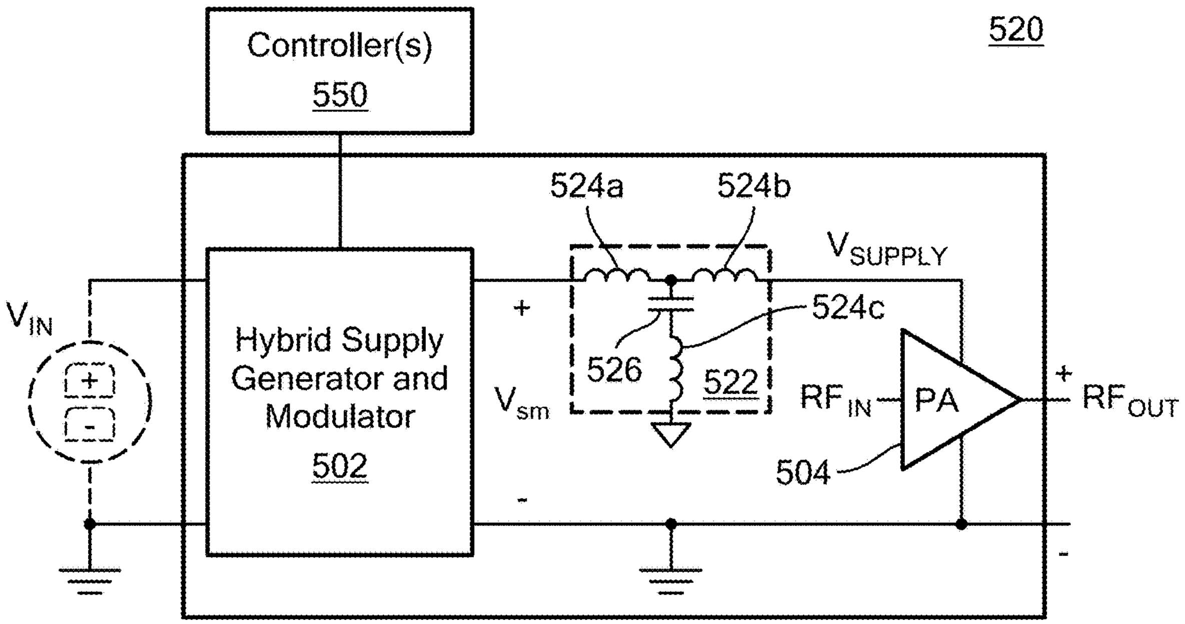
FIG. 5A is a block diagram of an rf amplifier system having a hybrid supply generator/modulator and a filter network.

FIG. 5A shows an rf amplifier system 520 similar to that of FIG. 5, wherein the additional circuitry 506 is implemented as a filter network 522. Illustrative filter network 522 includes first and second inductors 524*a*, 524*b* connected in series between an output of hybrid supply generator/modulator 502 and an input of PA 504. Filter network 522 further includes a capacitor 526 having one terminal connected between first and second inductors 524*a*, 524*b*, and a third inductor 524*c* connected between the other terminal of capacitor 526 and ground. Filter network 522 may sometimes be referred to as a pulse-shaping network (PSN).

The filter network 522 of FIG. 5 is merely one example and other types of filter networks may be used. For example, a reconfigurable filter may be used, whereby one or more switches are configured to change the filtering parameters (or characteristics) of filter network.

Figure 5B:
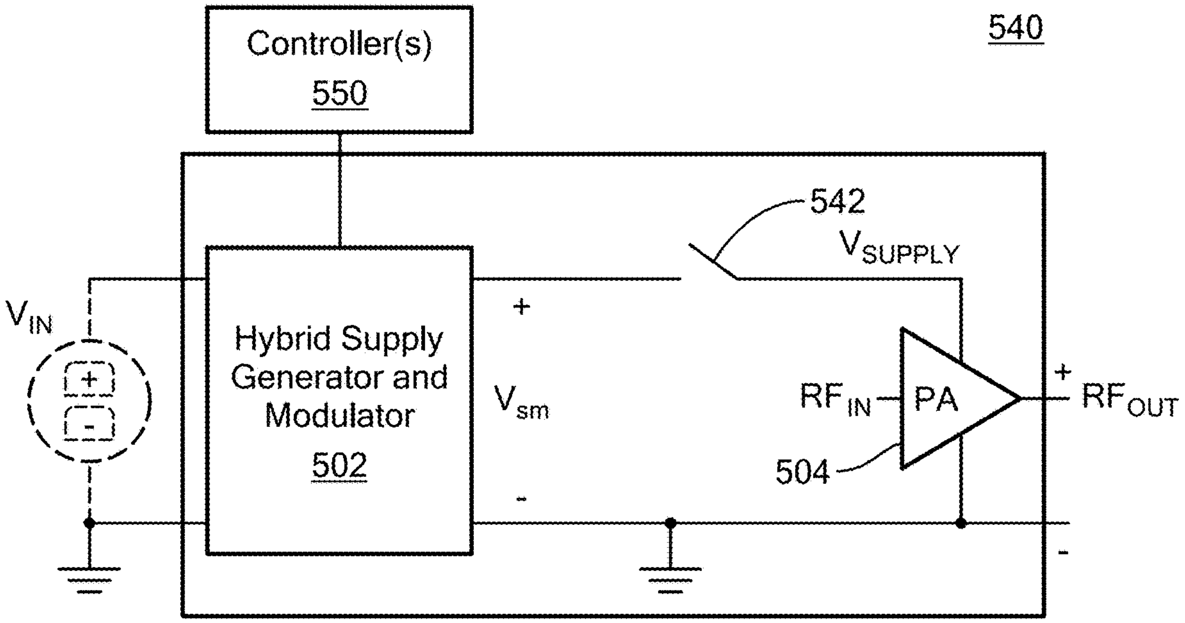
FIG. 5B is a block diagram of an rf amplifier system having a hybrid supply generator/modulator and a PA turn-off switch.

FIG. 5B shows an rf amplifier system 540 similar to that of FIG. 5, wherein the additional circuitry 506 is implemented a PA turn-off switch 542 (or "disconnect" switch). As previously discussed, in some cases, the modulated power supply provided to the PA (e.g., $V_{supply}$) may need to be "cut off" (discharged to a zero-volt level). For example, this can be used to enable reduction of the modulator switch voltage ratings in cases when a zero output must be provided to the PA. In such cases, a low-frequency turn-off switch 542 can be connected in series between an output of the hybrid supply generator/modulator 502 and an input of PA 504, as shown. Turn-off switch 542 can be used to selectively isolate the output of the multi-output regulation stage from the rf amplifier.

In some embodiments, rf amplifier system 540 can be part of a transceiver system having a modem among other components external to the rf amplifier system. The modem or another one of the components can directly or indirectly generate control signals to cause the turn-off switch 542 to be actuated in conjunction with enabling/disabling the rf amplifier.

Figure 6:
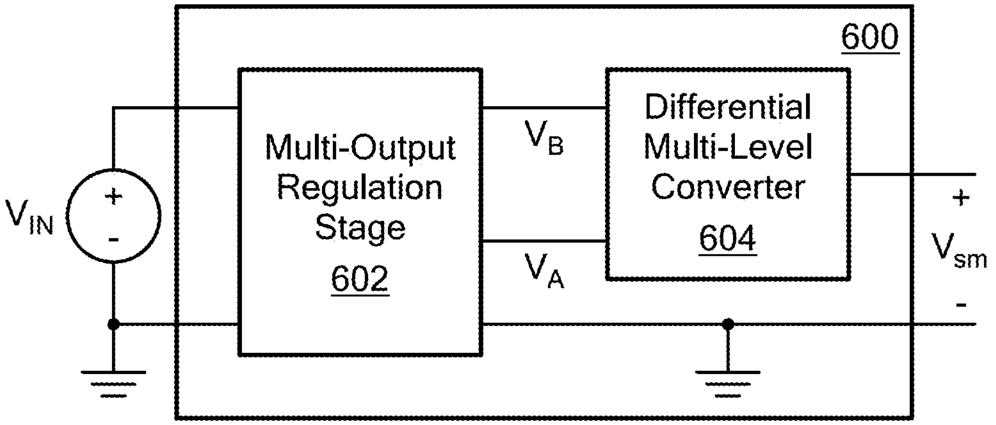
FIG. 6 is a block diagram illustrating an architecture of a hybrid supply generator/supply modulator suitable for use in an rf amplifier system.

FIG. 6 shows an illustrative architecture of a hybrid supply generator/supply modulator 600, according to some embodiments. Illustrative hybrid supply generator/supply modulator 600 may be provided within the system 500 of FIG. 5. For example, modulator 600 of FIG. 6 may correspond in whole or in part to modulator 502 of FIG. 5.

Illustrative hybrid supply generator/supply modulator 600 includes a multi-output regulation stage 602 and a differentially coupled multilevel converter 604.

Multi-output regulation stage 602 is configured to receive, couple, or otherwise takes an input voltage $V_{IN}$ and synthesizes two intermediate voltages $V_A$ and $V_B$. In some embodiments, intermediate voltages $V_A$ and $V_B$ may be independently controllable. In some embodiments, multi-output regulation stage 602 may be provided as a magnetic or hybrid magnetic/switched-capacitor regulation stage.

Differentially coupled multilevel converter 604 has input differentially connected or otherwise coupled between intermediate voltages $V_A$ and $V_B$ and is configured to synthesize three or more instantaneous output voltage levels $V_{SM}$ therefrom. In some embodiments, differentially coupled multilevel converter 604 may use switched capacitors to synthesize instantaneous levels while enabling desired voltage/charge-balance on the capacitors. Differentially coupled multilevel converter 604 may be based on a differentially connected flying-capacitor multilevel converter (FCML) or on some other capacitor-based energy-transfer topology, including those in which the charge transfer requirements prevent one or more of the synthesizable levels to be continuously provided without switching of the differentially connected multilevel converter.

Multi-output regulation stage 602 and differentially coupled multilevel converter 604 can include one or more devices (e.g., switches) configured to be controlled according to one or more control techniques described in detail below.

The multi-output regulation stage 602 and/or differential multilevel converter 604 can be controlled by one or more controllers, such as the one or more controllers 550 of FIG. 5.

Figure 6A:
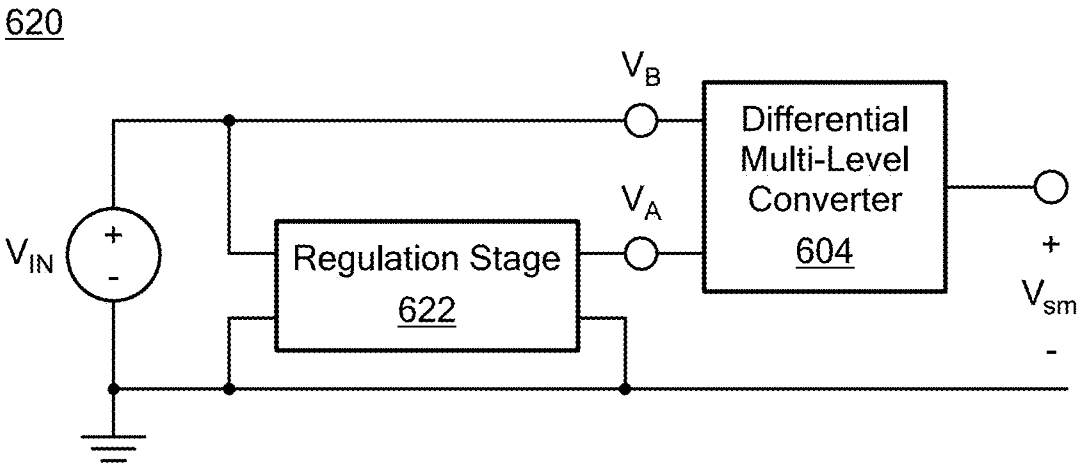
FIG. 6A is a block diagram of another hybrid supply generator/supply modulator architecture wherein one of the intermediate voltages corresponds to the input voltage.

FIG. 6A shows another architecture of a hybrid supply generator/supply modulator 620 wherein one of the intermediate voltages directly corresponds to the input voltage. As shown, the input voltage $V_{in}$ can be provided as input to a regulation stage 622 and also connected to provide intermediate voltage $V_B$ to differential multilevel converter 604. The other intermediate voltage $V_A$ provided to differential multilevel converter 604 can be generated by regulation stage 622. In other words, $V_B$ can be said to bypass the regulation stage 622. Regulation stage 622 may be similar to any of the multi-output regulation stage implementations described herein or portions thereof, but adapted to have only a signal output and associated circuitry. While FIG. 6A shows an example where $V_B$ corresponds to $V_{in}$, in other examples the same general approach can be used to have $V_A$ correspond to $V_{in}$.

The multi-output regulation stage 602 and/or differential multilevel converter 604 can be controlled by one or more controllers, such as the one or more controllers 550 of FIG. 5.

Referring now to FIGS. 7A-7E, shown are implementations of a multi-output regulation stage which may be provided within the hybrid supply generator/supply modulator 600 of FIG. 6, according to embodiment of the present disclosure. For example, the multi-output regulation stage implementations of FIGS. 7A-7E may correspond, in whole or in part, to multi-output regulation stage 602 of FIG. 6. Likewise, the implementations of FIGS. 7A-7E may be used within the system 500 of FIG. 5.

Figure 7A:
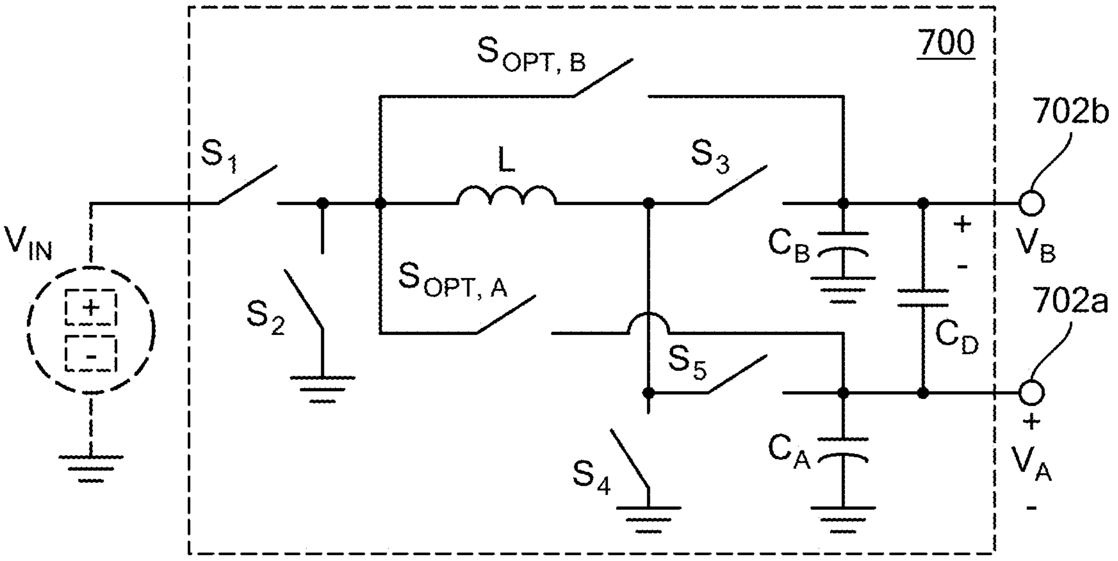
FIGS. 7A-E are schematic diagrams illustrating implementations of a multi-output regulation stage suitable for use in a hybrid supply generator/supply modulator.
Figure 8:
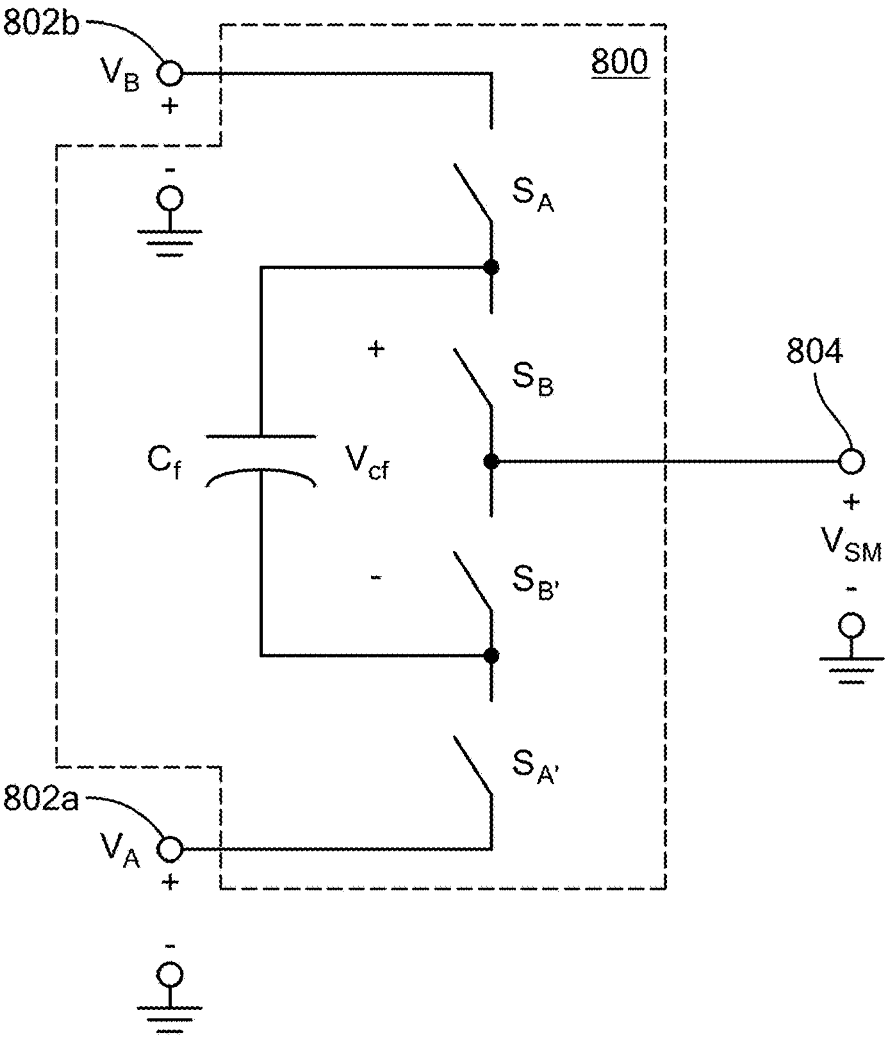
FIG. 8 is a schematic diagram of a differential multilevel converter suitable for use in a hybrid supply generator/supply modulator, the converter capable of providing three (3) effective output levels using four (4) switch states.

FIG. 7A illustrates a multi-output regulation stage 700 comprising a two-output single-input-multiple-output (SIMO) converter based upon a 4-switch buck-boost converter, but with an additional output and switch. Multi-output regulation stage 700 has two outputs 702*a* and 702*b* (e.g., terminals) at which respective ones of synthesized voltages $V_A$ and $V_B$ may be provided. A first switch $S_1$ is connected between a voltage source, $V_{IN}$, and an inductive element, L. A second switch $S_2$ is connected at one end between $S_1$ and L and at the other end to ground (or, more generally, a reference voltage). A third switch $S_3$ is connected between L and an output 702*b* (providing $V_B$). A fourth switch $S_4$ is connected at one end between L and $S_3$ and at the other end to ground. A fifth switch $S_5$ is connected at one end between $S_4$, L, and $S_3$ and at the other end to another output 702*a* (providing $V_A$). Independent decoupling capacitors $C_A$ and $C_B$ may be connected to respective outputs 702*a* and 702*b*, as shown.

As shown, additional optional switches $S_{opt,A}$ and $S_{opt,B}$ may be included to enable direct energy transfer from output 702*a* to output 702*b* or vice versa. Also as shown, a differential decoupling capacitor $C_D$ may be optionally included and connected across the two outputs 702*a*, 702*b*.

Figure 7B:
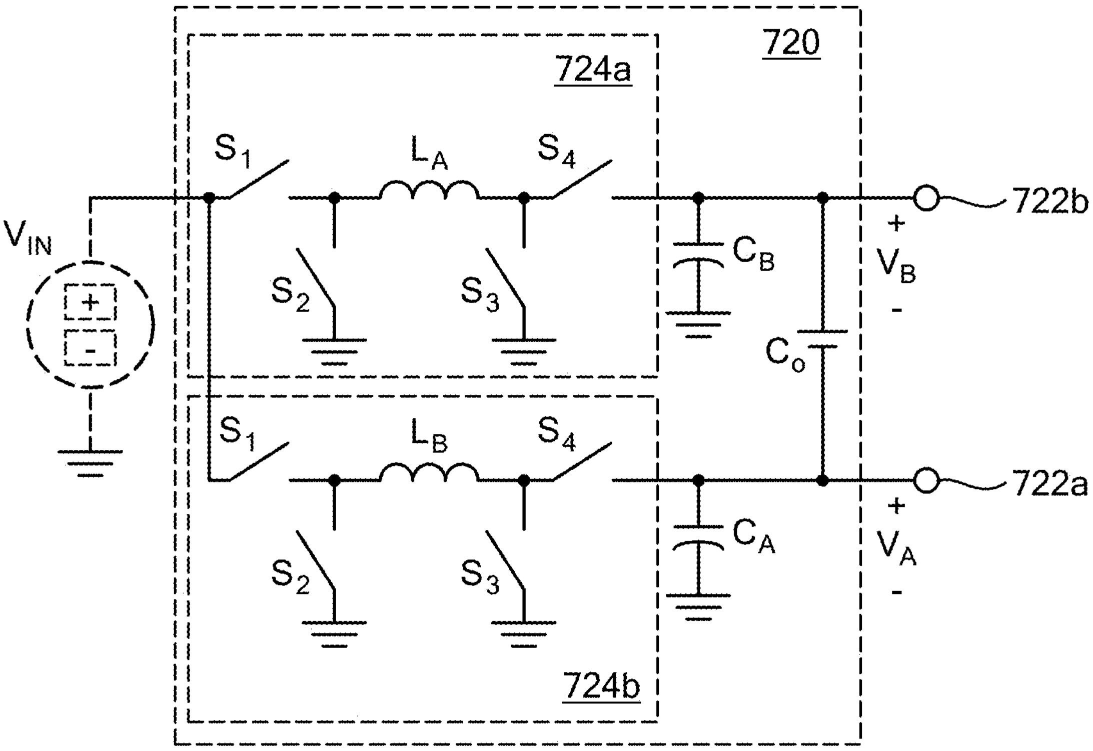

FIG. 7B illustrates a multi-output regulation stage 720 having two outputs 722*a* and 722*b* (e.g., terminals) at which respective ones of voltages $V_A$ and $V_B$ may be provided. The voltages $V_A$ and $V_B$ may be synthesized using separate 4-switch buck-boost converters 724*a* and 724*b*, respectively. As shown, each buck-boost converter 724*a*, 724*b* has four switches $S_1$-$S_4$ and an inductive element ($L_A$ or $L_B$). Optional output decoupling capacitors $C_A$, $C_B$, and/or $C_D$ may also be provided, as shown.

While the embodiment of FIG. 7B includes two buck-boost converters, depending upon voltage range requirements, two different types of converters may be used. For example, in other embodiments, one converter may be implemented as a 4-switch buck-boost, while the other converter may be implemented either as a simple buck converter (e.g., to supply the smaller of the two voltages $V_A$ and $V_B$) or as a simple boost converter (to supply the larger of the two voltages $V_A$ and $V_B$).

Figure 7C:
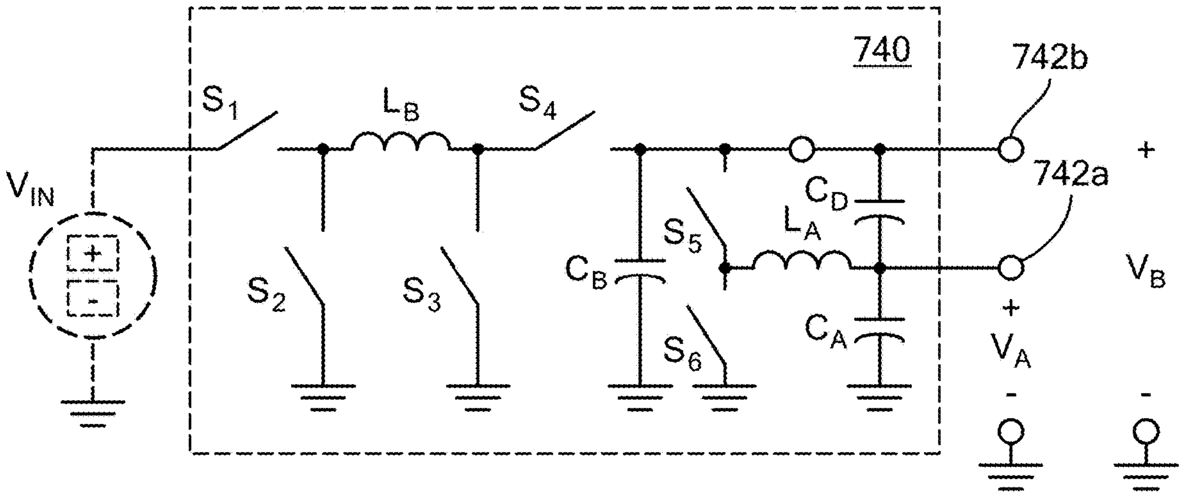

FIG. 7C illustrates a multi-output regulation stage 740 which includes a 4-switch buck-boost converter to synthesize a first output voltage $V_B$ at an output 742*b* and includes a buck converter powered from voltage $V_B$ to synthesize a second independently regulated voltage $V_A$ at another output 742*a*, where $V_A$ is less than or equal to $V_B$. In more detail, the buck-boost converter comprises switches $S_1$-$S_4$ and inductive element $L_B$, whereas the buck converter comprises switches $S_5$, $S_6$ and inductive element $L_A$. Optional output decoupling capacitors $C_A$, $C_B$, and/or $C_D$ may also be provided, as shown.

It will be appreciated that other like conversion approaches can be used to synthesize two independently controllable voltages $V_A$ and $V_B$. For example, the structure of FIG. 7C can be adapted such that the initial buck-boost stage is omitted, and the input ($V_{in}$) is directly connected to capacitor $C_B$, such that voltage $V_B$ equals the input voltage and voltage $V_A$ is independently controllable. Like structures may be created such that voltage $V_A$ equals the input voltage and voltage $V_B$ is independently controllable (e.g., derived from voltage $V_A$ with a boost converter).

Figure 7D:
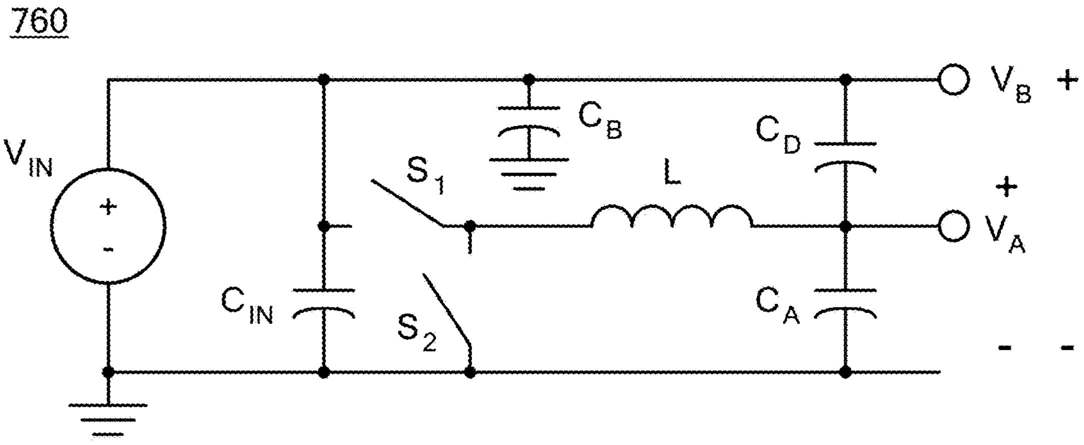

FIG. 7D illustrates a multi-output regulation stage 760 wherein $V_B$ directly corresponds to the input voltage $V_{in}$ and $V_A$ is generated from $V_{in}$ using a buck converter such that $V_A < V_B$. The buck converter may include, for example, an input capacitor $C_{in}$, a pair of switches $S_1$, $S_1$, and an inductor L, connected as shown. Output decoupling capacitors $C_A$, $C_B$, and/or $C_D$ may optionally be provided.

Figure 7E:
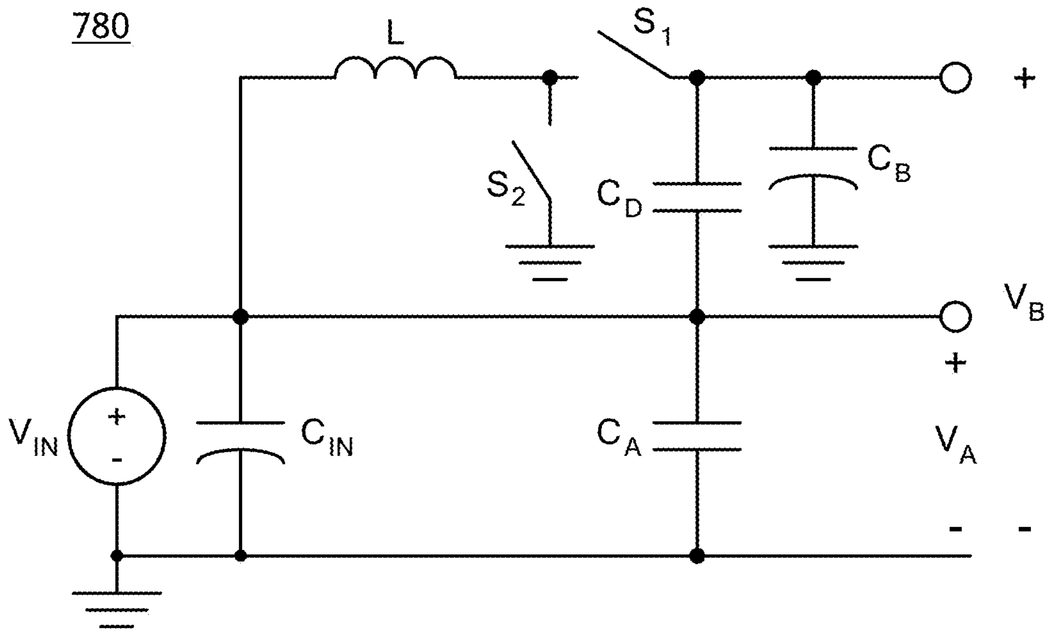

FIG. 7E illustrates a multi-output regulation stage 780 wherein $V_A$ directly corresponds to the input voltage $V_{in}$ and $V_B$ is generated from $V_{in}$ using a boost converter such that $V_A < V_B$. The boost converter may include, for example, a pair of switches $S_1$, $S_1$, an inductor L, and at least one of capacitors $C_B$ or $C_D$, connected as shown. Decoupling capacitors $C_A$ and/or $C_{IN}$ may optionally be provided.

Of note, whereas the hybrid supply generator/supply modulator 620 of FIG. 6A provides the input voltage as one of the intermediate voltages by bypassing the regulation stage 622, the same result can be achieved without bypassing the regulation stage, such as using the regulation stage implementation of FIG. 7D or FIG. 7E.

The various switches illustrated in FIGS. 7A-E can be controlled by one or more controllers, such as by the one or more controllers 550 of FIG. 5. For example, the one or more controllers can generate control signals that are coupled to selectively turn individual switches on or off.

FIG. 8 shows the structure of an illustrative differential multilevel converter 800 which may be the same as or similar to the differential multilevel converter described in conjunction with FIG. 6. The differential multilevel converter operates from two voltages $V_A$ and $V_B$ received at respective inputs 802*a* and 802*b* (e.g., terminals). The two voltages $V_A$, $V_B$ may, for example, be synthesized by a multi-output regulation stage which may be the same as or similar to one of the multi-output regulation stages described above in conjunction with FIGS. 7A-7E. In some embodiments, voltage $V_B$ may be controlled to be larger than voltage $V_A$. In some embodiments, $V_B$ or $V_A$ may correspond to an input voltage $V_{in}$.

Differential multilevel converter 800 includes four switches $S_A$, $S_B$, $S_{A'}$, $S_{B'}$ connected in series between the two inputs 802*a*, 802*b*, and a flying capacitor $C_f$ connected at one end between $S_A$ and $S_B$ and at the other end between $S_{A'}$ and $S_{B'}$. An output 804 (e.g., a terminal) can be connected between $S_B$ and $S_{B'}$, as shown, to provide a modulated output voltage $V_{sm}$, which can be ground referenced for example. Converter 800 may optionally include a differential decoupling capacitor $C_D$ (not shown) coupled between inputs 802*a*, 802*b*.

The structure of converter 800 is partially similar to that of a flying capacitor multilevel converter (FCML) with distinctions that: (1) the output 804 is taken with discrete levels instead of being filtered to provide a continuously-variable output; and (2) the dc input 802*a*, 802*b* is taken differentially between $V_A$ and $V_B$ rather than from an input source and common. The ground referenced output voltage $V_{SM}$ may thus take on discrete values distributed between voltage values $V_A$ and $V_B$, with energy transferred from and between $V_A$ and $V_B$ and the output 804.

The switches $S_A$, $S_B$, $S_{A'}$, $S_{B'}$ may be implemented in a variety of manners with some or all of the switches having unidirectional blocking capability. For example, one or all of the switches may be configured to block less than or equal to the maximum difference between $V_A$ and $V_B$, but more than half the maximum difference therebetween.

In a CMOS or BCD process, one or more of the switches $S_A$, $S_B$, $S_{A'}$, $S_{B'}$ may be realized as all NMOS devices or a combination of NMOS and PMOS devices, or all as PMOS devices. In some implementations one may choose to implement switches $S_A$ and $S_{A'}$ as a CMOS pair and switches $S_B$ and $S_{B'}$ as a CMOS pair. Selection of a particular implementation may be based on size/performance of the switches and/or gate drive convenience of the switches, with gate-drive levels optionally derived from $V_A$ and $V_B$.

In some embodiments, the differential multilevel converter of FIG. 8 can be operated according to four (4) different switch states, providing the output voltage $V_{SM}$ indicated in Table 1. That is, a controller (e.g., the one or more controllers 550 of FIG. 5) can be connected and configured to turn individual switches $S_A$, $S_B$, $S_{A'}$, $S_{B'}$ on or off to achieve a given one of the states set forth in Table 1.

TABLE 1

| State | Switches On | $V_{SM}$ | $V_{SM\approx}$ | Level | $V_{cf}$ |
|---|---|---|---|---|---|
| 1 | $S_A$, $S_B$ | $V_B$ | $V_B$ | L3 | Unchanging |
| 2 | $S_A$, $S_{B'}$ | $V_B - V_{cf}$ | $(V_A + V_B)/2$ | L2 | Increasing (under load) |
| 3 | $S_B$, $S_{A'}$ | $V_A + V_{cf}$ | $(V_A + V_B)/2$ | L2 | Decreasing (under load) |
| 4 | $S_{B'}$, $S_{A'}$ | $V_A$ | $V_A$ | L1 | Unchanging |

Table 1 shows the behavior of the differential multilevel converter of FIG. 8 for different switch states. In the table, $V_{cf}$ denotes the voltage across flying capacitor $C_f$. State one (1) passes $V_B$ to $V_{SM}$, while state four (4) passes $V_A$ to $V_{SM}$. State two (2) results in $V_{SM}=V_B-V_{cf}$, while state (3) results in $V_{SM}=V_A+V_{cf}$. It is appreciated herein that, with suitable switching control of the converter (i.e., appropriate selections between states two (2) and three (3)), $V_{cf}$ will be maintained near $(V_B-V_A)/2$, which results in both states two (2) and three (3) providing an output voltage $V_{SM}=(V_A+V_B)/2$, as indicated in Table 1.

Controlled using the switch states of Table 1, converter 800 enables three effective levels (i.e., approximate level values) to be synthesized at its output 804: $V_A$, $V_B$, and $(V_A+V_B)/2$. Converter 800 may thus be utilized to provide similar functionality to a 3-level supply modulator producing levels $L1=V_A$, $L3=V_B$, and $L2=(V_A+V_B)/2$, for example.

A benefit of the design of FIG. 8 is that it combines the differential capacitive energy transfer supply generation function with the supply modulation function, reducing device area and component size as compared to using a separate differential supply generator and supply modulator.

In some embodiments, $V_{cf}$ (the voltage across flying capacitor $C_f$) may be maintained near $(V_B-V_A)/2$ by appropriately selecting between states two (2) and three (3) of Table 1 when seeking to synthesize an output voltage level near $(V_A+V_B)/2$. Under a positive load current (e.g., deriving from a PA), $V_{cf}$ will increase over time in state two (2) and will decrease over time in state three (3).

In some embodiments, when selecting which of states two (2) or three (3) to use to supply a voltage close to $(V_A+V_B)/2$ at the modulator output (i.e., synthesizing L2), state two (2) can be selected if $V_{cf}$ falls too far below $(V_B-V_A)/2$ and state three (3) can be selected if $V_{cf}$ rises too far above $(V_B-V_A)/2$, where "too far" can be defined using one or more threshold values as described below.

In some embodiments, switching between states two (2) and three (3) can be controlled on a hysteretic basis and/or with clocked switching transitions. For example, such switching can occur instantaneously when the voltage $V_{cf}$ exceeds an allowed voltage deviation $\Delta V$ above or below $(V_B-V_A)/2$, or with transitions clocked, such as at a discrete supply modulation clocking rate. In some embodiments, the allowed voltage deviation $\Delta V$ value may be hardcoded in the controller, may be a programmable value of the controller, or maybe be conveyed via an external signal.

It will be appreciated that circuitry may be provided to measure/detect the voltage $V_{cf}$ across the flying capacitor $C_f$. For example, a differential sensor (not shown) may be provided, with each of its two inputs connected to a different terminal of $C_f$ and its output connected to the controller controlling the switch states.

Figure 9:
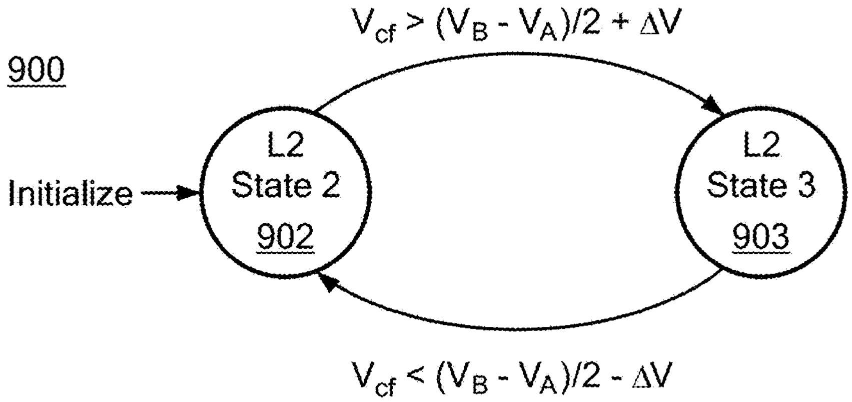
FIGS. 9 and 9A are diagrams of state machines that can be used for controlling switch state in the differential multilevel converter of FIG. 8.

Referring now to FIG. 9, shown is an illustrative state machine 900 that may be used to control the switch state of the differential multilevel converter 800 to maintain L2 (i.e., $V_{SM}$ $(V_A+V_B)/2$) by transitioning back and forth (e.g., alternating) between states two (2) and three (3). For example, when L2 is selected (e.g., when the hybrid supply generator/supply modulator is commanded to output the voltage level L2), the controller can use state machine 900 to determine whether state two (2) or three (3) is used to synthesize L2.

In the example of FIG. 9, transitions between state two 902 and state three 903 are a function of the capacitor voltage $V_{cf}$. In more detail, starting from state two 902, state machine 900 can transition to state three 903 when Vet is greater than $(V_B-V_A)/2+\Delta V$. State machine 900 can transition back to state two 902 when $V_{cf}$ is less than $(V_B-V_A)/2-\Delta V$.

Such state transitions can be made on either an instantaneous or clocked basis. The allowed deviation $\Delta V$ of Vet from $(V_B-V_A)/2$ determines the maximum deviation of the L2 output voltage from $(V_A+V_B)/2$, and may be used as a fixed value or a programmable value. Reducing $\Delta V$ gives a more precise supply modulator output voltage for L2 (smaller difference between the two states synthesizing L2) but requires more frequent switching between states.

In some embodiments, state machine 900 may be re-initialized each time L2 is selected (i.e., transitioning from L1 or L3), with the initialization dependent upon voltage $V_{cf}$. For example, it may be desirable to initialize the state machine to state two 902 if $V_{cf}<(V_B-V_A)/2$ and to initialize the state machine to state three 903 if $V_{cf}>(V_B-V_A)/2$. Such a selection—or a similar one with different threshold(s)—can reduce the number of transitions required between states two (2) and three (3) to synthesize L2, and hence improve efficiency.

Figure 9A:
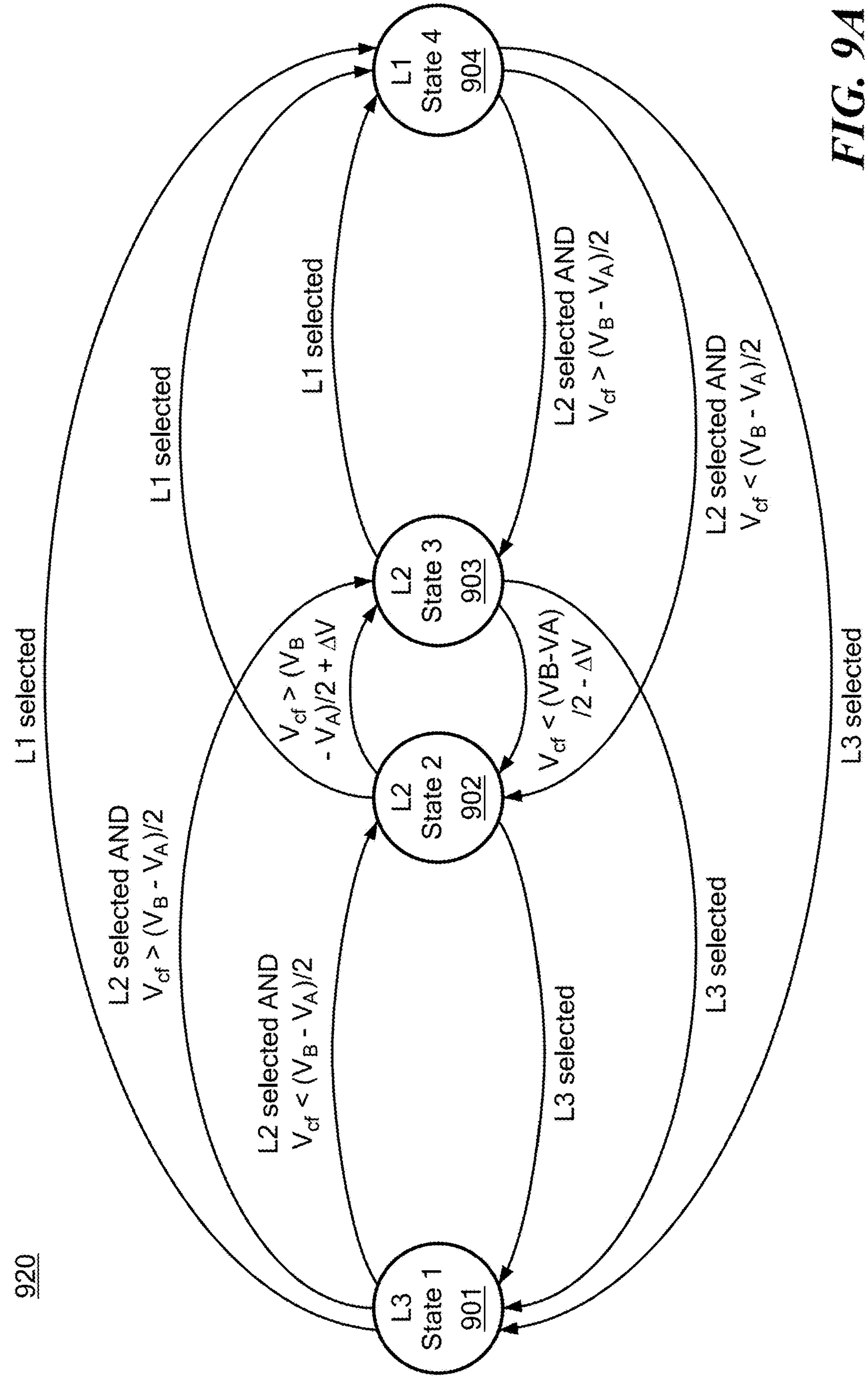

Turning to FIG. 9A, according to some embodiments, the illustrative state machine of FIG. 9 for maintaining L2 voltage can be integrated into a larger state machine 920 for controlling all three levels L1, L2, and L3. In addition to states 902 and 903 corresponding to L2, illustrative state machine 920 also includes state 901 corresponding to L3 and state 904 corresponding to L1.

In some cases, state machine 920 can be initialized (e.g., at startup/power up) to one of the states 901-904 based on a default voltage level programmed or hardcoded into controller, for example.

State machine 920 can transition between states 901-904 in response to level select commands, such as commands received from an external circuit or control unit. For example, as shown, state machine 920 can transition to state 904 when L1 is selected and can transition to state 901 if L3 when selected. When L2 is selected, state machine 920 can transition to either state 902 or state 903 depending on Vco, the voltage across the flying capacitor.

One or more system controllers (e.g., controller(s) 550 of FIG. 5) can implement, execute, or otherwise utilize the state machine of FIG. 9 and/or FIG. 9A to control a differential multilevel converter.

Figure 10A:
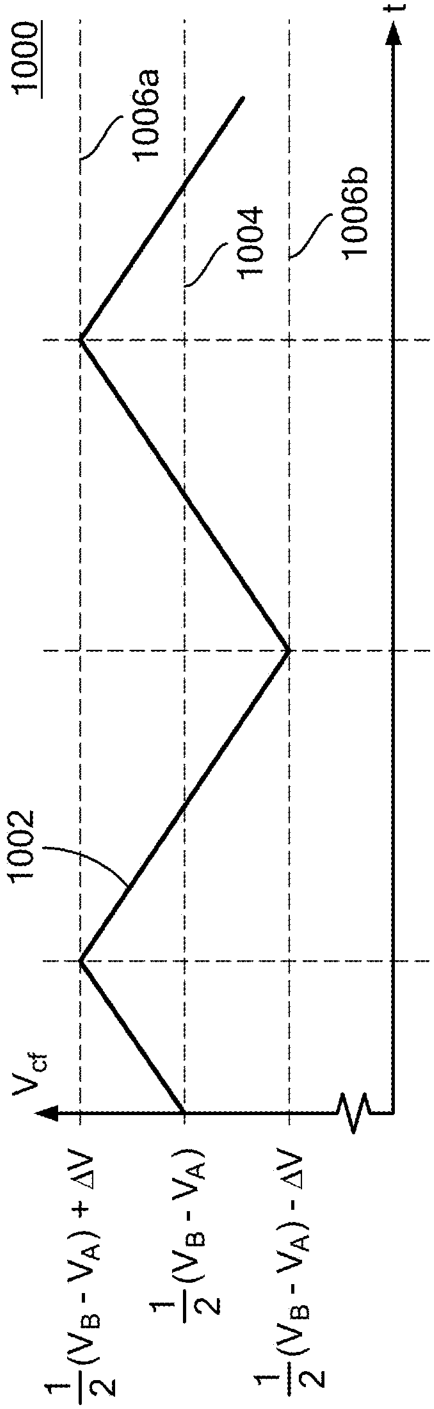
FIGS. 10A-10C are a series of plots illustrating voltage patterns and state transitions associated with the state machine of FIG. 9.
Figure 10B:
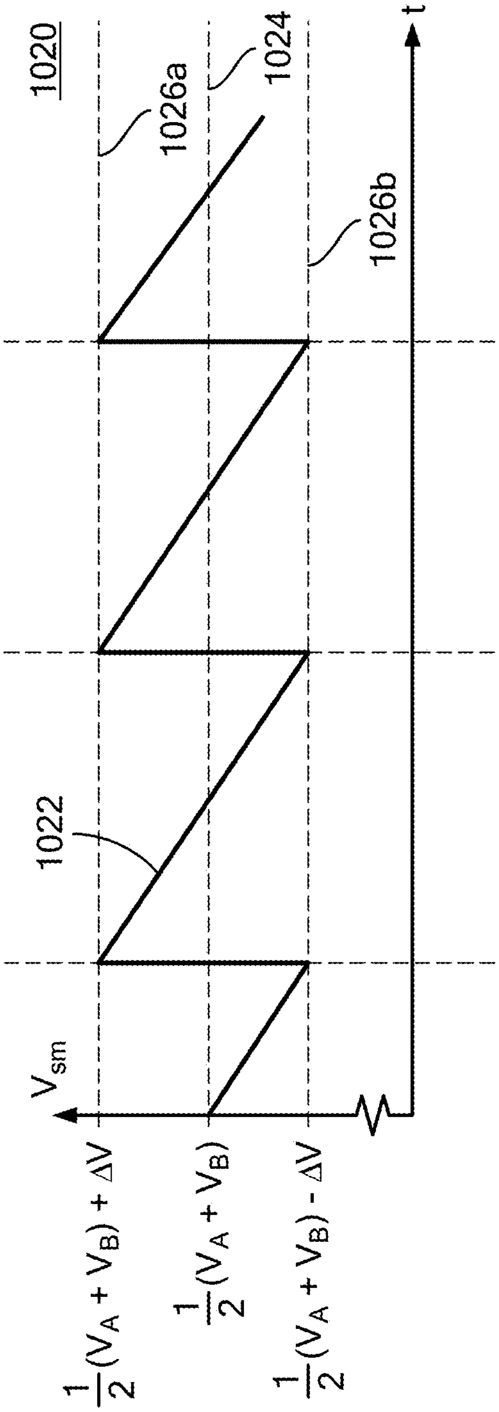
Figure 10C:
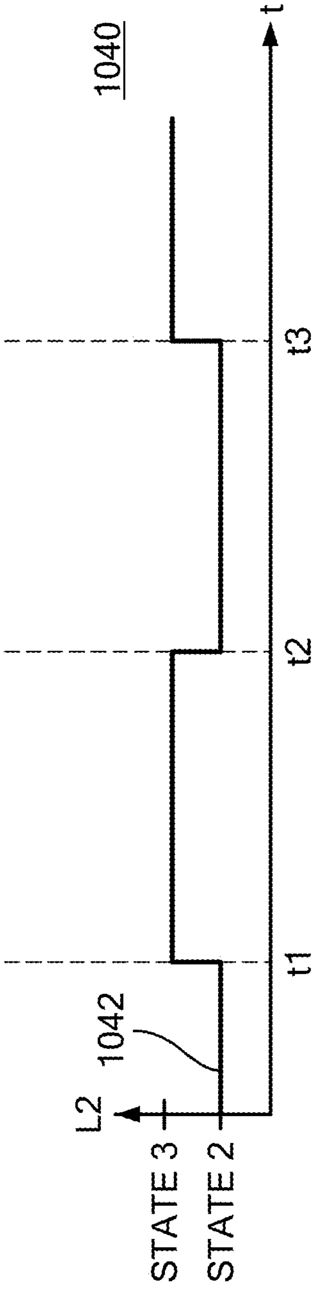

FIGS. 10A-10C illustrate voltage patterns (FIGS. 10A, 10B) and state transitions (FIG. 10C) associated with the state machine of FIG. 9 when used on an unclocked basis.

FIG. 10A shows a plot 1000 having a vertical axis corresponding to voltage and a horizontal axis corresponding to time t. A curve 1002 represents $V_{cf}$ over time. Horizontal line 1004 indicates $(V_A-V_B)/2$, horizontal line 1006*a* indicates $(V_B-V_A)/2+\Delta V$, and horizontal line 1006*b* indicates $(V_B-V_A)/2-\Delta V$.

FIG. 10B shows a plot 1020 having a vertical axis corresponding to voltage and a horizontal axis corresponding to time t. A curve 1022 represents $V_{sm}$ over time. Horizontal line 1024 indicates $(V_A+V_B)/2$ (i.e., the effective L2 value), horizontal line 1026*a* indicates $(V_A+V_B)/2+\Delta V$, and horizontal line 1026*b* indicates $(V_A+V_B)/2-\Delta V$.

FIG. 10C shows a plot 1040 having a vertical axis corresponding to the L2 switch state (i.e., state two (2) or state three (3)) and a horizontal axis corresponding to time t. A curve 1042 indicates the L2 state, which is a function of $V_{cf}$ (FIG. 10A). For example, at time t1, curve 1042 changes from state (2) to state (3) when curve 1002 crosses (or approaches) horizontal line 1006*a*. Subsequently, at time t2, curve 1042 changes from state (3) to state (2) when curve 1002 crosses (or approaches) horizontal line 1006*b*.

From FIGS. 10A-10C, it can be seen that the approach of transitioning between switch states as a function of $V_{cf}$ maintains $V_{cf}$ within a maximum voltage deviation $\Delta V$ from a center voltage $(V_B-V_A)/2$, and maintains the supply modulator voltage $v_{sm}$ within a maximum voltage deviation $\Delta V$ from a center voltage $(V_B+V_A)/2$.

L2 state selection may additionally or alternatively be done on a clocked basis. One way to do this is, for example, to use a state machine like that in FIG. 9 to select how L2 is synthesized, with the state of a state machine updated on a clock edge. The clock may be the same clock as that used to make level selections, or may be derived from it.

In some embodiments, when transitioning L2 states on a clocked basis, the manner in which L2 is synthesized on each clock cycle can be updated, choosing state two (2) if $V_{cf}<(V_B-V_A)/2$ or state three (3) if $V_{cf}>(V_B-V_A)/2$, optionally using a small degree of hysteresis in the comparator upon which the decision is made. For a fully clocked selection, this approach can lead to a minimum deviation in $V_{sm}$ from $(V_B+V_A)/2$ for L2, at the expense of a possibly high number of transitions to do so.

Turning to FIG. 11, the general concepts, structures, and techniques described above can be extended to provide a hybrid supply generator/supply modulator having more than three (3) output levels.

FIG. 11 shows a differential multilevel converter 1100 for a hybrid supply generator/supply modulator. Converter 1100 operates from two voltages $V_A$ and $V_B$ received at respective inputs 1102*a* and 1102*b*, and synthesizes $V_{sm}$ at output 1104. In some embodiments, voltage $V_B$ may be controlled to be larger than voltage $V_A$. In some embodiments, $V_B$ or $V_A$ may correspond to an input voltage $V_{in}$.

Converter 1100 includes two (2) flying capacitors $C_{f1}$, $C_{f2}$ and three (3) complementary switch pairs $S_1/S_{1'}$, $S_2/S_{2'}$, and $S_3/S_{3'}$. The switch pairs can be operated (e.g., by a controller) according to eight (8) different switch states to provide four (4) effective output levels ($V_{sm}$).

A voltage $V_{cf1}$ across first flying capacitors $C_{f1}$ can be controlled to be near $(V_B-V_A)/3$ and a voltage $V_{cf2}$ across second flying capacitors $C_{f2}$ can be controlled to be near $2(V_B-V_A)/3$, enabling one to synthesize four effective output levels:

$$L1=V_A;$$

$$L2=V_B-2(V_B-V_A)/3\approx V_A+(V_B-V_A)/3;$$

$$L3=V_B-(V_B-V_A)/3\approx V_A+2(V_B-V_A)/3;\text{ and}$$

$$L4=V_B.$$

There is thus an evenly spaced distribution of effective output levels between $V_A$ and $V_B$.

In some embodiments, switches $S_1$, $S_{1'}$, $S_2$, $S_{2'}$, $S_3$, $S_{3'}$ may be selected to have a voltage rating of more than ⅓ the maximum difference between $V_B$ and $V_A$, but need not be rated for more than the maximum difference between $V_B$ and $V_A$. Again, gate drive sources for the switches may be derived from input voltages $V_A$, $V_B$ and/or flying capacitor voltages $V_{cf1}$, $V_{cf2}$.

Table 2 shows the behavior of the differential multilevel converter 1100 of FIG. 11 for eight (8) different switch states.

TABLE 2

| State | Switches On | $V_{SM}$ | $V_{SM\approx}$ | Level | $V_{cf1}$ | $V_{cf2}$ |
|---|---|---|---|---|---|---|
| 1 | $S_{1'}$, $S_{2'}$, $S_{3'}$ | $V_A$ | $V_A$ | L1 | Unchanging | Unchanging |
| 2 | $S_1$, $S_2$, $S_3$ | $V_B - V_{cf2}$ | $V_B - 2(V_B - V_A)/3$ | L2 | Unchanging | Increasing |
| 3 | $S_{1'}$, $S_2$, $S_{3'}$ | $V_A + V_{cf2} - V_{cf1}$ | $V_B - 2(V_B - V_A)/3$ | L2 | Increasing | Decreasing |
| 4 | $S_1$, $S_2$, $S_3$ | $V_B - V_{cf1}$ | $V_B - (V_B - V_A)/3$ | L3 | Increasing | Unchanging |
| 5 | $S_1$, $S_2$, $S_{3'}$ | $V_A + V_{cf1}$ | $V_B - 2(V_B - V_A)/3$ | L2 | Decreasing | Unchanging |
| 6 | $S_1$, $S_2$, $S_3$ | $V_B - V_{cf2} + V_{cf1}$ | $V_B - (V_B - V_A)/3$ | L3 | Decreasing | Increasing |
| 7 | $S_1$, $S_2$, $S_{3'}$ | $V_A + V_{cf2}$ | $V_B - (V_B - V_A)/3$ | L3 | Unchanging | Decreasing |
| 8 | $S_1$, $S_2$, $S_3$ | $V_B$ | $V_B$ | L4 | Unchanging | Unchanging |

As can be seen from Table 2, there is one way to synthesize L2 (i.e., state one (1)), one way to synthesize L4 (i.e., state eight (8)), and three ways to synthesize each of the two intermediate effective output levels L2 and L3. In particular, L2 may be synthesized with states two (2), three (3), and five (5) while L3 may be synthesized with states four (4), six (6), and seven (7).

The states synthesizing each of the two intermediate effective levels each have different effects on the charging and discharging of $C_{f1}$ and $C_{f2}$. (i.e., $V_{cf1}$ or $V_{cf2}$ increasing or decreasing under load). By dynamically choosing which state is used to synthesize a desired intermediate output level, the capacitor voltages $V_{cf1}$ and $V_{cf2}$ can be maintained each near their target voltages of $(V_B-V_A)/3$ and $2(V_B-V_A)/3$. These control selections can be done through a variety of means including through use of one or more appropriate state machines. For example, a control scheme/state machine can be selected to have $V_{cf1}$ to be maintained within a voltage $\Delta V_1$ of the target voltage $(V_B-V_A)/3$ and $V_{cf2}$ to be maintained within a voltage $\Delta V_2$ of the target voltage $2(V_B-V_A)/3$. The values $\Delta V_1$ and $\Delta V_2$ may be hardcoded in the controller, may be programmable values of the controller, or maybe be conveyed via one or more external signals.

It will be appreciated that circuitry may be provided to measure/detect the voltage $V_{cf1}$ across flying capacitor $C_{f1}$ and the voltage $V_{cf2}$ across flying capacitor $C_{f2}$. For example, two differential sensors (not shown) may be provided, one having its inputs connected across C1 and the other having its inputs connected across C2. The outputs of both differential sensors can be connected to the controller controlling the switch states.

Figure 12A:
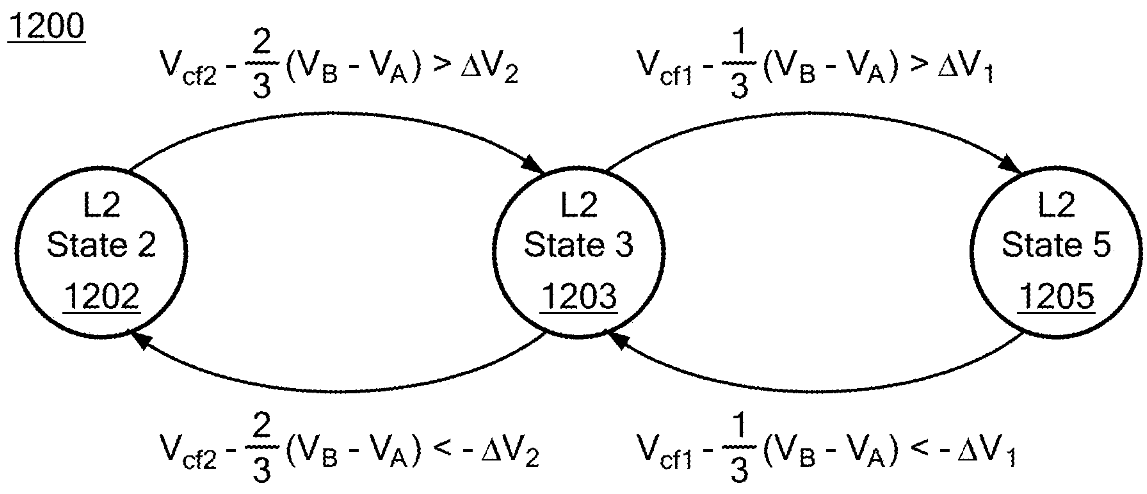
FIGS. 12A and 12B are diagrams of state machines that can be used for controlling switch state in the differential multilevel converter of FIG. 11.
Figure 12B:
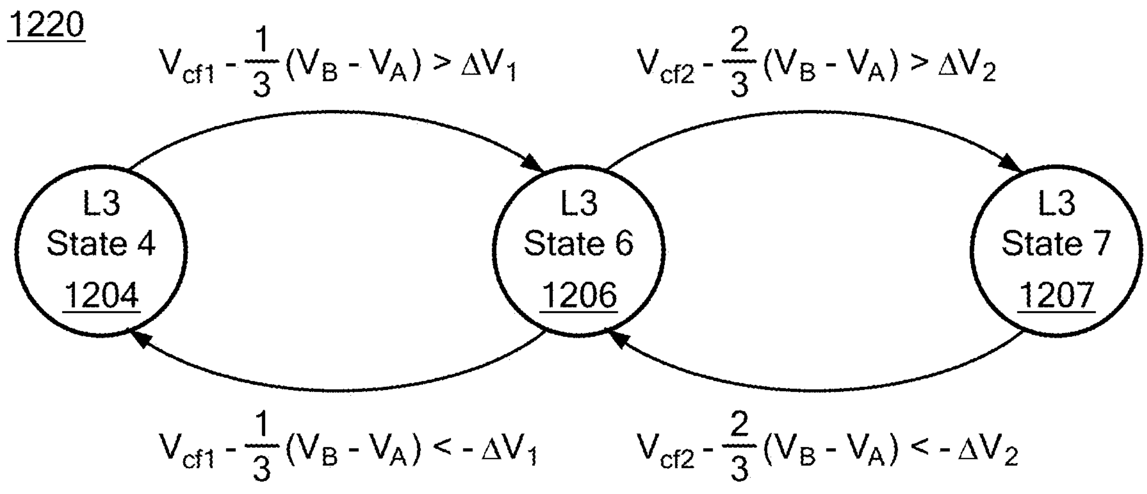

FIGS. 12A and 12B show state machines that can be used to control the switch state of the differential multilevel converter 1100 of FIG. 11.

FIG. 12A shows a state machine 1200 that may be used to control the switch state of the converter 1100 to maintain L2 by transitioning between state two 1202, state three 1203, and state five 1205 as a function of $V_{cf1}$ or $V_{cf2}$. For example, when L2 is selected (e.g., when the hybrid supply generator/supply modulator is commanded to output the voltage level L2), the controller can use state machine 1200 to determine whether state two (2), three (3), or five (5) is used to synthesize L2.

FIG. 12B shows a state machine 1220 that may be used to control the switch state of the converter 1100 to maintain L3 by transitioning between state four 1204, state six 1206, and state seven 1207 as a function of $V_{cf1}$ or $V_{cf2}$. For example, when L3 is selected, the controller can use state machine 1220 to determine whether state four (4), six (6), or seven (7) is used to synthesize L3.

The illustrative state machines of FIGS. 12A, 12B will select which states to use to synthesize the intermediate output levels within the desired tolerances. Again, the state machines can be implemented on a clocked or unclocked basis. It will be apparent that there is adequate control authority in the proposed system to select states to both synthesize the desired output levels and maintain the flying capacitor voltages in an acceptable range; many other means can likewise be realized to do so.

The illustrative state machines of FIGS. 12A, 12B can be integrated into a larger state machine with eight distinct states as in Table 2 for controlling all four levels L1-L4, with transitions occurring in response to level select commands (similar to the state machine described above in the context of FIG. 9A for a 3-level converter).

After reading the disclosure provided herein, those of ordinary skill in the art will appreciate that hybrid supply generator/supply modulator designs having more flying capacitors and more effective output levels can be synthesized by direct extension of the 3-level design of FIG. 8 and the 4-level design of FIG. 11.

In general, designs providing N effective output levels may utilize N−2 flying capacitors and N−1 complementary switch pairs (yielding up to $2^{(N-1)}$ switch states that may be used for level synthesis).

It will be appreciated that additional circuitry may be used to pre-charge the flying capacitors (e.g., Cr in FIG. 8 or $C_{f1}$ and $C_{f2}$ in FIG. 11) to desired levels before modulation starts.

In some embodiments, additional circuitry may also be provided to maintain the flying capacitor voltages to within a desired range (e.g., close to their respective target voltages) during time periods when the synthesized output levels do not provide charging/discharging control of the capacitor voltage(s), when the system is not operating (e.g., in standby mode or in startup), and/or when the voltage levels $V_A$, $V_B$, or their references are adjusted. Such circuitry might comprise linear circuits (e.g., current sources, linear regulators, etc.) implemented in the integrated circuit.

Figure 13A:
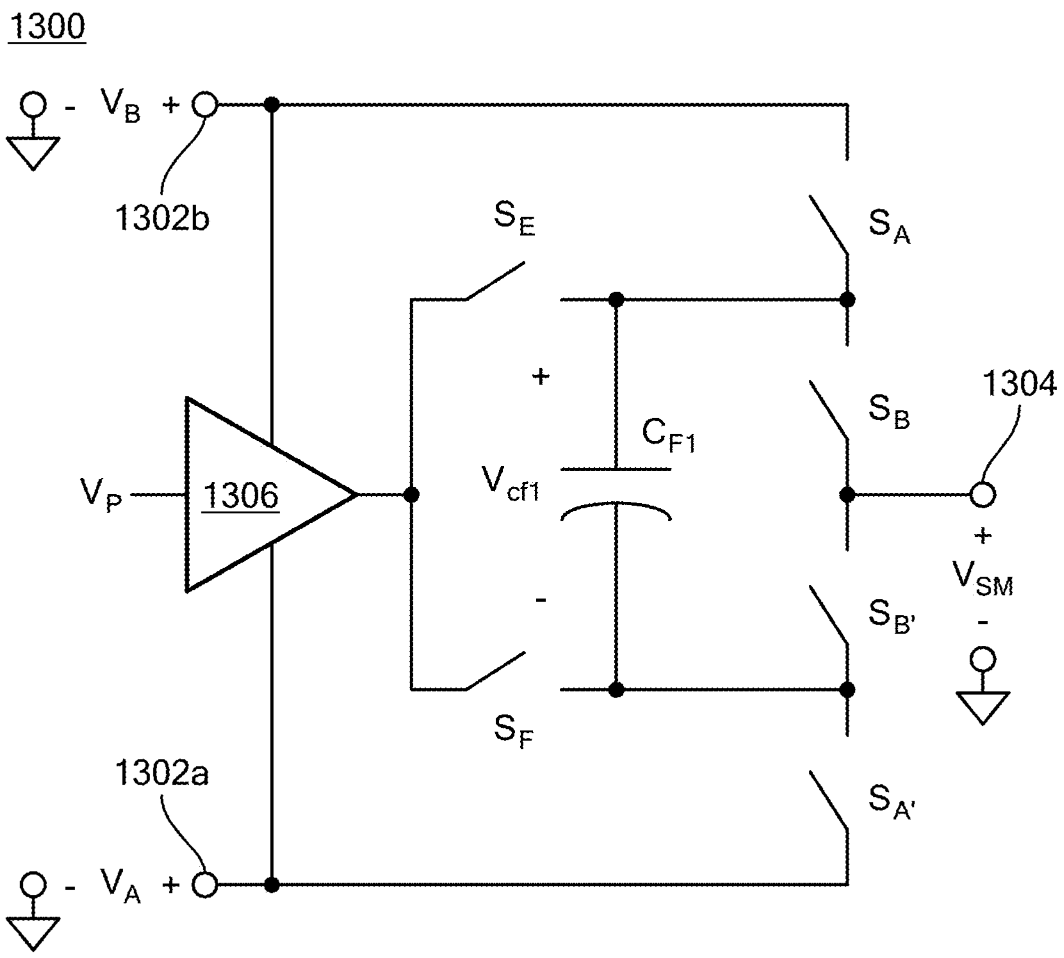
FIGS. 13A and 13B are schematic diagrams of differential multilevel converters suitable for use in a hybrid supply generator/supply modulator, the converters having circuitry to regulate charge on a flying capacitor.

FIG. 13A shows an example of a differential multilevel converter 1300 with one flying capacitor $C_f$ and circuitry for regulating or controlling charge thereon, according to some embodiments.

Converter 1300 operates from two voltages $V_A$ and $V_B$ received at inputs 1302*a* and 1302*b*, respectively. The two voltages may, for example, be synthesized by a multi-output regulation stage which may be the same as or similar to one of the multi-output regulation stages described above in conjunction with FIGS. 7A-7E. In some embodiments, voltage $V_B$ may be controlled to be larger than voltage $V_A$. An output 1304 provides a modulated output voltage $V_{sm}$, which can be ground referenced.

As shown, the differential multilevel converter circuit includes a set of four switches $S_A$, $S_B$, $S_{A'}$, $S_{B'}$ connected in series between inputs 1302*a*, 1302*b*, a flying capacitor $C_{f1}$ having a first terminal connected between switches $S_A$ and $S_B$, and a second terminal connected between switches $S_A$' and $S_B$'.

To regulate charge on the capacitor $C_{f1}$, the converter 1300 further includes charge regulation circuitry (sometimes referred to as "pre-charge" or "charge holding" circuitry). In the example of FIG. 13A, the charge regulation circuitry includes a regulator 1306 (e.g., a linear regulator) receiving a reference voltage $V_P$, a fifth switch SE connected between an output of regulator 1306 and a first terminal of flying capacitor $C_{f1}$, and a sixth switch SF connected between the output of regulator 1306 and a second terminal of flying capacitor C1. The linear regulator may be supplied differentially between $V_A$ and $V_B$ is designed to source and/or sink current to make its output voltage close to the reference voltage $V_P$. The reference voltage $V_P$ may be selected based on the levels $V_A$ and $V_B$. To regulate charge on the flying capacitor in a three-level system, reference voltage $V_P$ may be selected to be half-way in between $V_A$ and $V_B$ such that the linear regulator seeks to charge $v_{cf1}$ towards half of $(V_B-V_A)$. Alternatively, it may be dynamically programmable (e.g., from external circuitry). In a four-level system, one may have a charge control circuit for each of the flying capacitors, with reference voltages selected to charge the capacitor voltages towards $(V_B-V_A)/3$ and $2(V_B-V_A)/3$, respectively.

Converter 1300 provides a ground referenced output voltage $V_{SM}$ taken between switches $S_B$ and $S_{B'}$, as shown. The output voltage $V_{SM}$ may take on discrete values distributed between voltage values $V_A$ and $V_B$, with energy transferred from and between $V_A$ and $V_B$ and the output.

The switches in FIG. 13A may be implemented in a variety of manners including but not limited to the various switch implementations described above with FIG. 8.

The regulator 1306 and switches SE, SF may be used to regulate the flying capacitor voltage $V_{cf1}$ to within a desired range (e.g., close to reference voltage $V_p$) during time periods when the synthesized output levels do not provide charging/discharging control of the capacitor voltage(s), when the system is not operating (e.g., in standby mode or in startup), and/or when the voltage levels $V_A$, $V_B$ or their references are adjusted.

In a state where switch $S_A$ is held on, switch SF may be turned on and the regulator 1306 can sink or source current through $C_{f1}$ such that the voltage on $C_F$ is maintained close to a desired reference voltage $V_p$. Likewise, in a state where switch $S_{A'}$ is held on, switch SE may be turned on and regulator 1306 can sink or source current through $C_{f1}$ such that the voltage on $C_{f1}$ is maintained close to the desired reference voltage $V_p$.

The reference voltage $V_P$ can be related to the intermediate voltages $V_A$, $V_B$. For example, $V_P$ can be at the midpoint between $V_A$ and $V_B$, that is, $V_P=(V_B+V_A)/2$. One could optionally create reference voltage $V_P$ through a voltage divider between $V_A$ and $V_B$. Alternatively, the reference voltage $V_P$ may be provided externally in either analog or digital form.

Regulator 1306 may be configured to drive the voltage across $C_{f1}$ to match reference voltage $V_P$ or may be configured to act to drive the voltage across $C_{f1}$ towards $V_P$ only when the difference between $V_P$ and $V_{cf1}$ exceeds a threshold value $\Delta V_p>0$. In some embodiments, the threshold $\Delta V_p$ may be selected to greater than the voltage $\Delta V$ used for selecting the switch state to synthesize the output voltage level near $(V_B+V_A)/2$.

In some embodiments, regulator 1306 (e.g., a linear regulator) may be configured to source or sink current if $V_{cf1}$ is greater than a magnitude $\Delta V_p$ away from $V_p$. This can include a hysteretic comparison. In some examples, one comparator with hysteresis may be used. In other examples, two comparators may be used: a first comparator to detect when $V_{cf}$ is greater than $V_p+\Delta V_p$ and a second comparator to detect when $V_{cf}$ is less than $V_p-\Delta V_p$. If the first comparator is activated, regulator 1306 may be activated to drive $V_{cf}$ down. If the second comparator is activated, regulator 1306 may be activated to drive $V_{cf}$ up. When the voltage is within $V_p-\Delta V_p<V_{cf}<V_p+\Delta V_p$, the regulator may not act.

In some embodiments, charge regulation circuitry (e.g., regulator 1306 and switches SE, SF) may be selectively activated and deactivated based on operating mode, modulator state, duration of a particular modulator state, etc. For example, charge regulation circuitry be selectively activated during modes such as startup and standby, or during particular states of the modulator (such as when switch $S_A$ or $S_{A'}$ is active) or when particular states of the modulator are held for more than a certain duration, or when voltages $V_A$ and $V_B$ are being adjusted.

Figure 13B:
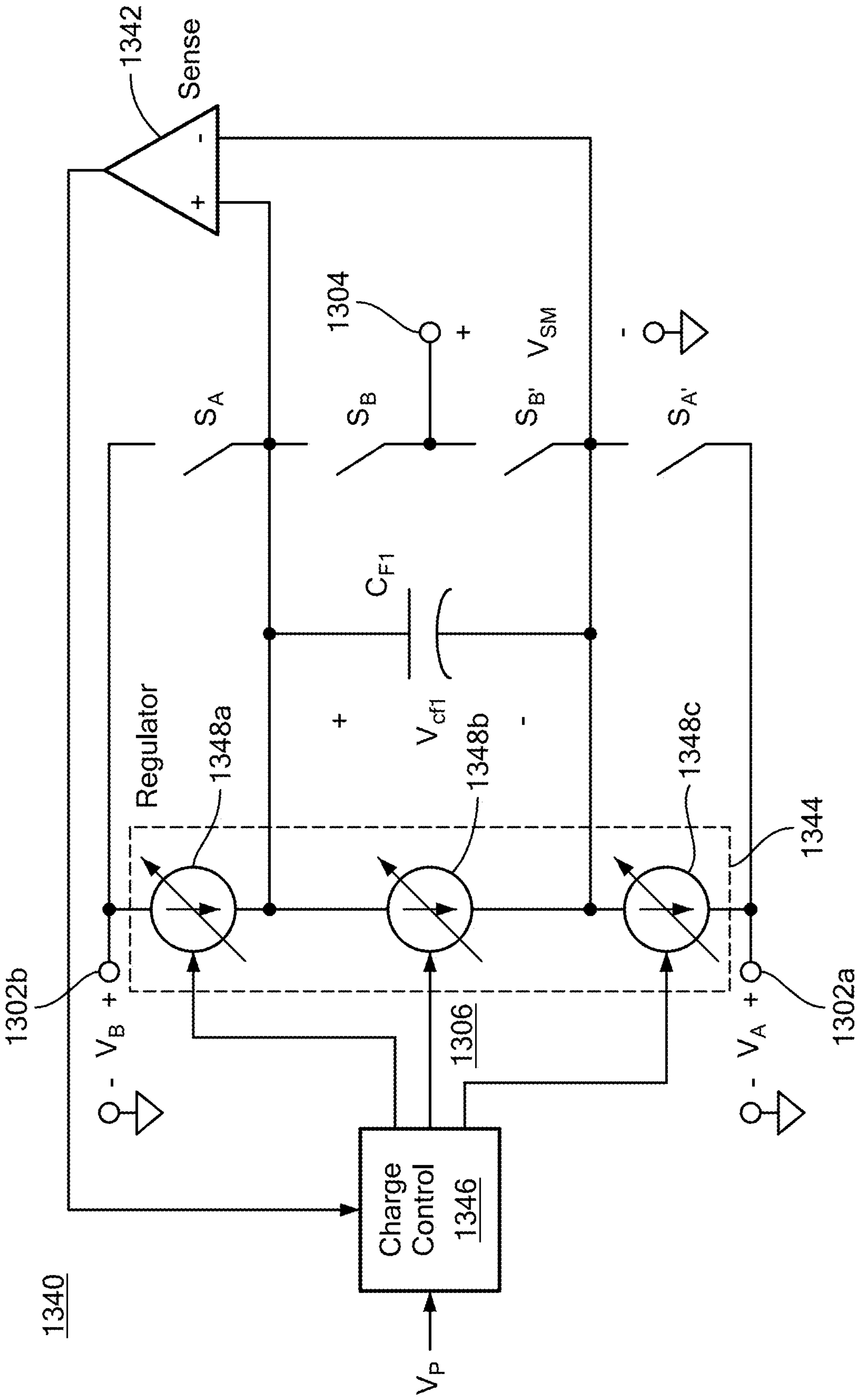

FIG. 13B shows another example of a differential multilevel converter 1340 with one flying capacitor and circuitry for regulating or controlling charge thereon, according to some embodiments. Similar to the converters of FIGS. 8 and 13A, converter 1340 of FIG. 13B includes a set of four switches $S_A$, $S_B$, $S_{A'}$, $S_{B'}$ connected in series between inputs 1302*a*, 1302*b*, a flying capacitor $C_{f1}$ having a first terminal connected between switches $S_A$ and $S_B$, and a second terminal connected between switches $S_A$' and $S_B$'.

Additionally, converter 1340 of FIG. 13B includes a differential sensor 1342, a regulator 1344, and a charge control circuit 1346, which may collectively be referred to as the "charge regulation circuitry." Differential sensor 1342 has inputs connected to opposite terminals of $C_{f1}$ to detect the voltage $V_{cf1}$ across $C_{f1}$, and an output connected as input to charge control circuit 1346. Regulator 1344 can include controllable source elements 1348*a*-1348*c* (e.g., controllable current sources) that can charge and discharge capacitor $C_{f1}$. Charge control circuit 1346 receives a reference input $V_p$ (e.g., a reference voltage) and the output of differential sensor 1342 and is configured to control the regulator and, more particularly, to control individual source elements 1348*a*-1348*c* of regulator 1344.

In some embodiments, charge control circuit 1346 may be configured to charge or discharge $C_{cf1}$ if its voltage $V_{cf1}$ is more than some magnitude $\Delta V_p$ away from $V_p$. In some examples, this may be done using two comparators: a first comparator to detect when $V_{cf1}$ is more than $V_p+\Delta V_p$ and a second comparator to detect when $V_{cf}$ is less than $V_p-\Delta V_p$. If the first comparator is activated, then middle current source 1348*b* can be activated/turned up to drive $V_{cf1}$ down. If the second comparator is activated, current sources 1348*a* and 1348*c* can be activated to drive $V_{cf1}$ up. When the voltage is within $V_p-\Delta V_p<V_{cf}<V_p+\Delta V_p$, all current sources 1348*a-c* can be turned off.

In some embodiments, reference input $V_p$ can be related to the intermediate voltages $V_A$, $V_B$ such as discussed above for FIG. 13A.

In some embodiments, current sources 1348*a-c* of FIG. 13B may be controlled to regulate the voltage at each terminal of the capacitor in response to $V_A$ target voltage, $V_B$ target voltage, system operating mode, and/or other conditions.

Similar to the charge regulation circuitry discussed above with FIG. 13A, the charge regulation circuitry of FIG. 13B can drive the voltage across C to match reference input $V_p$ or may be configured to act to drive the voltage across C towards $V_P$ only when the difference between $V_P$ and $V_{cf1}$ exceeds a threshold value $\Delta V_p$. In some embodiments, the threshold $\Delta V_p$ may be selected to greater than the voltage $\Delta V$ used for selecting the switch state to synthesize the output voltage level near $(V_B+V_A)/2$.

Also as discussed above with FIG. 13A, the charge regulation circuitry of FIG. 13B may be selectively activated and deactivated based on operating mode, modulator state, duration of a particular modulator state, etc.

FIGS. 13A and 13B illustrate charge regulation used with a differential multilevel converter 1340 having a single flying capacitor, such as may be used to provide three effective output levels. For converters with greater numbers of flying capacitors (e.g., the converter of FIG. 11 configured to provide four effective output levels), the general structures and techniques shown and described with FIGS. 13A and 13B may be extended to control charge on each of the flying capacitors. For example, using the approach of FIG. 13A, a separate linear regulator 1306 and pair of switches SE, SF may be provided for each flying capacitor. As another example, using the approach of FIG. 13B, a separate charge control circuit 1346 and set of controllable source elements 1348*a*-1348*c* may be provided for each flying capacitor.

Figure 14:
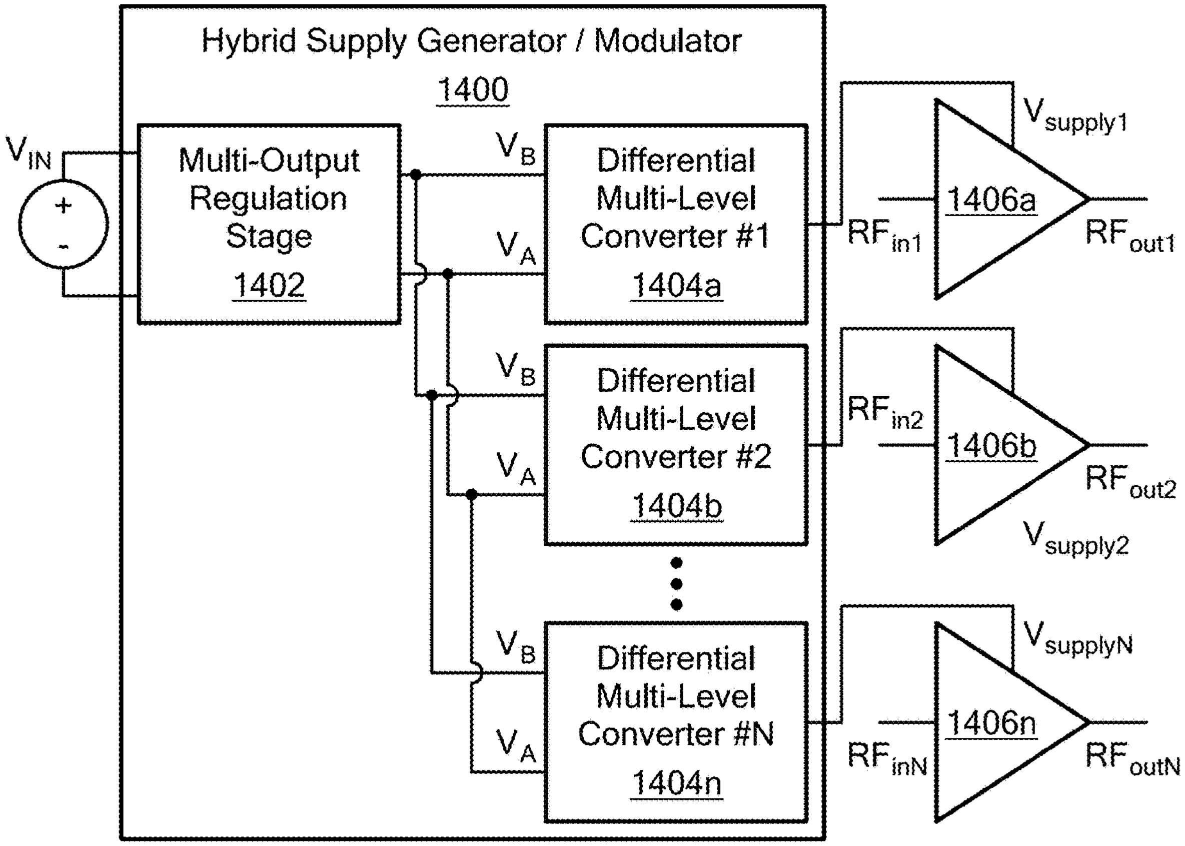
FIG. 14 is a schematic diagram of an RF power amplifier system having a hybrid supply generator/supply modulator with multiple outputs to supply multiple power amplifiers.

Turning to FIG. 14, according to embodiments of the present disclosure, a hybrid supply generator/supply modulator can have multiple outputs to supply one or more power amplifiers (e.g., with different voltages).

Illustrative hybrid supply generator/supply modulator 1400 includes a single multi-output regulation stage 1402 and a plurality of differentially-coupled multilevel converters 1404*a*, 1404*b*, . . . , 1404*n*. Multi-output regulation stage 1402 receives input voltage $V_{IN}$ and synthesizes two intermediate voltages $V_A$ and $V_B$ which may be independently controllable. Each of the differentially-coupled multilevel converters 1404*a-n* may receive the intermediate voltages $V_A$ and $V_B$ and be configured to synthesis one of three or more instantaneous output voltage levels, which voltage levels may be used to supply a corresponding one of a plurality of PAs 1406*a-n*.

In some embodiments, the differentially-coupled multilevel converters 1404*a-n* may directly provide supply voltages $V_{supply1 \ldots N}$ to the PAs 1406*a-n*, as shown. In other embodiments, the outputs of the differentially-coupled multilevel converters 1404*a-n* may be filtered/regulated using additional circuitry to provide the plurality of PA supply voltages $V_{supply1}$ . . . N. Examples of such additional circuitry are described above in the context of FIGS. 5, 5A, and 5B. In any case, it will be appreciated that different ones of the PA supply voltages $V_{supply1 \ldots N}$ may be independently controllable using the system architecture of FIG. 14.

Multi-output regulation stage 1402 may be the same as or similar to any of the multi-output regulation stage embodiments disclosed herein. Likewise, a given one of the differentially-coupled multilevel converters 1404*a-n* may be the same as or similar to that any of the differentially-coupled multilevel converter embodiments disclosed herein.

In some embodiments, multi-output regulation stage 1402 can be realized on an IC. In some embodiments, differential multilevel converters 1404-*n* can be realized on one or more ICs. In some embodiments, the multi-output regulation stage 1402 IC can be different from the differential multilevel converters 1404-*n* IC(s). In some embodiments, multi-output regulation stage 1402 and one or more differential multilevel converters 1404-*n* can be realized on the same IC.

Figure 14A:
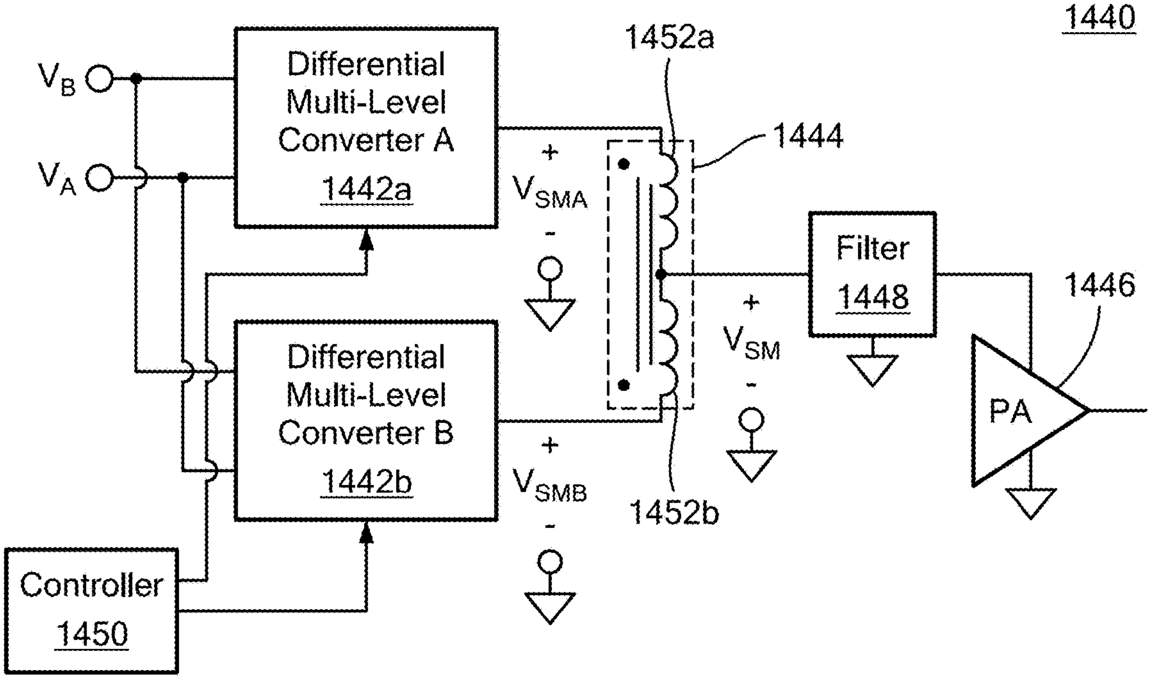
FIG. 14A is a schematic diagram of an RF power amplifier system having multiple differential multilevel converters magnetically coupled to supply a single power amplifier.

Turning to FIG. 14A, in some embodiments, the outputs of two or more differential multilevel converters can be combined (e.g., using coupled magnetics) to supply a single PA. Illustrative system 1440 includes differential multilevel converters 1442*a*, 1442*b* both configured to receive the same intermediate voltages $V_A$ and $V_B$ and to provide a respective modulated voltage $V_{SMA}$ and $V_{SMB}$. System 1440 further includes a combiner circuit 1444 configured to combine the modulated voltages $V_{SMA}$, $V_{SMB}$ into a combined modulated voltage $V_{SM}$, which is used to supply a PA 1446. For example, $V_{SM}$ may be coupled directly or indirectly to a bias port of PA 1446.

System 1440 can optionally include a filter circuit 1448 or other additional circuitry coupled between combiner circuit 1444 and PA 1446, as shown. For example, filter circuit 1448 can be configured to filter to smooth the transitions of supply voltage provided to PA 1446.

A controller 1450 can be coupled to control (e.g., independently control) switching states of the differential multilevel converters 1442*a* and 1442*b*. In some embodiments, controller 1450 may be provided as part of a hybrid supply generator/modulator that also includes differential multilevel converters 1442*a*, 1442*b*. For example, controller 145 may be implemented on the same IC as converters 1442*a*, 1442*b*.

It should also be appreciated that combiner circuit 1444 may be provided as any means capable of combing two or more modulated power supply output signals provided thereto so as to provide a combined modulated signal appropriate for use in an application of interest. Examples of such combining means are provided below. After reading the disclosure provided herein, one of ordinary skill in the art will appreciate how to select or design a means for combining appropriate for use in a particular application.

In the illustrative embodiment of FIG. 14A, combiner circuit 1444 is provided as a coupled magnetic structure having a high coupling (e.g., coupling coefficient in the range or about 0.5 or greater or in some applications, it may be desirable or necessary to utilize a coupling coefficient in the range of about 0.9 or greater) between windings 1452*a*, 1452*b* (e.g. an interphase transformer combiner). In this embodiment, output, $V_{SM}$, of combiner circuit 1444 is a linear combination of the inputs from the individual converters 1442*a*, 1442*b*.

Combiner circuit 1444 is not limited to interphase transformer combiners. It may comprise, for example, uncoupled magnetics (e.g., separate inductors or uncoupled windings on a single core structure), a transmission-line transformer combiner, a lumped or distributed GF combiner or hybrid circuit, or another three-port lumped or distributed passive network.

Also, while two converters 1442*a*, 1442*b* and a two-way combiner are shown in the example of FIG. 14A, a system may generally include M modulators and an M-way combiner. This may allow for increasingly high performance (e.g., reduced content of undesired frequencies for a given desired frequency content) as M is increased.

Two or more multilevel converters may be used together to provide a single output $V_{SM}$. One such technique that can be used with illustrative system 1440 is so-called "split pulse transitions" (SPT). With SPT, controller 1450 can receive a controller input signal indicating a voltage level desired at the combiner output $V_{SM}$, and produce outputs which are, in turn, inputs to the differential multi-level converters. Controller 1450 can independently command the output voltage level $V_{SMA}$ and $V_{SMB}$ of two multilevel converters 1442 and, thus, $V_{SM}$, based on the desired voltage level indicated by the controller input signal. One skilled in the art may appreciate that more than two differential multilevel converters may be combined in similar fashion to implement SPT.

In some embodiments, controller 1450 may be configured to delay the output signal for converter 1442*b* or converter 1442*a* such that a transition observed at $V_{SMA}$ occurs after the same transition occurred at $V_{SMB}$. This delay may be referred to as a "split pulse transition delay" or "SPT delay." In this case, voltages $V_{SMA}$ and $V_{SMB}$ may be unequal for a period of time corresponding to the SPT delay. Controller 1450 can apply the SPT delay to either converter 1442*b* or converter 1442*a* according to a state machine implemented as part of the controller. Which multi-level converter 1442*b*, 1442*a* input receives the delay may change as frequently as every transition of the desired voltage level indicated by the controller input signal.

In some embodiments, when the SPT delay is configured to a value greater than zero, the overall transition of $V_{SM}$ from a first level to a second level will be comprised of three voltage levels spanning three portions. During the first portion of the overall transition at $V_{SM}$, both $V_{SMA}$ and $V_{SMB}$ have the same output voltage such that $V_{SM}$ is equal to $V_{SMA}$ and $V_{SMB}$. During the second period the controller commands the desired transition for multilevel converter 1442*a*, such that $V_{SMA}$ transitions to the second voltage level, but 1442*b* output $V_{SMB}$ remains at the original level. During this portion current flows between the outputs of 1442*a* and 1442*b* through combiner 1444. $V_{SM}$ takes on a value between $V_{SMA}$ and $V_{SMB}$ proportional to the ratio of the number of turns on winding 1452*a* to the number of turns on winding 1452*b*. Assuming an equal number of turns, the voltage $V_{SM}$ will be $(V_{SMA}-V_{SMB})/2+V_{SMA}$ during this second period. The controller may delay the command for 1442*a* or 1442*b* according to an internal state machine. During the final period the controller commands the desired transition for multilevel converter 1442*b*, such that the output of 1442*a* and 1442*b* are again equal, and $V_{SM}$ will be equal to $V_{SMA}$ and $V_{SMB}$.

SPT has the effect of changing transition shape while retaining high efficiency of the hybrid supply modulator/generator. Without SPT, the voltage $V_{SM}$ changes quickly from a first voltage level to a second voltage level. The sample SPT implementation above reduces dv/dt (voltage slew rate) of $V_{SM}$ during the transition: $V_{SM}$ starts at the first voltage level, moves to a voltage level between the first and second voltage levels during the SPT delay time, and then moves to the second voltage level after the SPT delay time. The SPT delay duration between 1442*a* and 1442*b* changes frequency content of the output $V_{SM}$, and may be configured to optimize the time domain shape and frequency domain content of $V_{SM}$. A transceiver may command the controller 1450 to adjust SPT delay time to optimize RF performance for challenging operating conditions (e.g. high- or low-bandwidth transmission, stringent linearity or emissions requirements).

While FIG. 14A shows an example of two differential multilevel converters 1442*b*, 442*a* and the preceding discussion explains how one of the converters can be delayed relative to the other, the general concepts and techniques described may be applicable to other numbers of converters. For example, a hybrid supply generator/modulator can have at least three differential multilevel converters, and the controller can be applied two or more different delays to the at least three differential multilevel converters.

In some embodiments, a system disclosed herein (e.g., system of FIG. 14A) can utilize one or more control techniques described in U.S. Pat. No. 11,909,358, issued on Feb. 20, 2024, and entitled "Multilevel Amplifier Systems and Related Techniques," which patent is incorporate by reference in its entirety.

Figure 15:
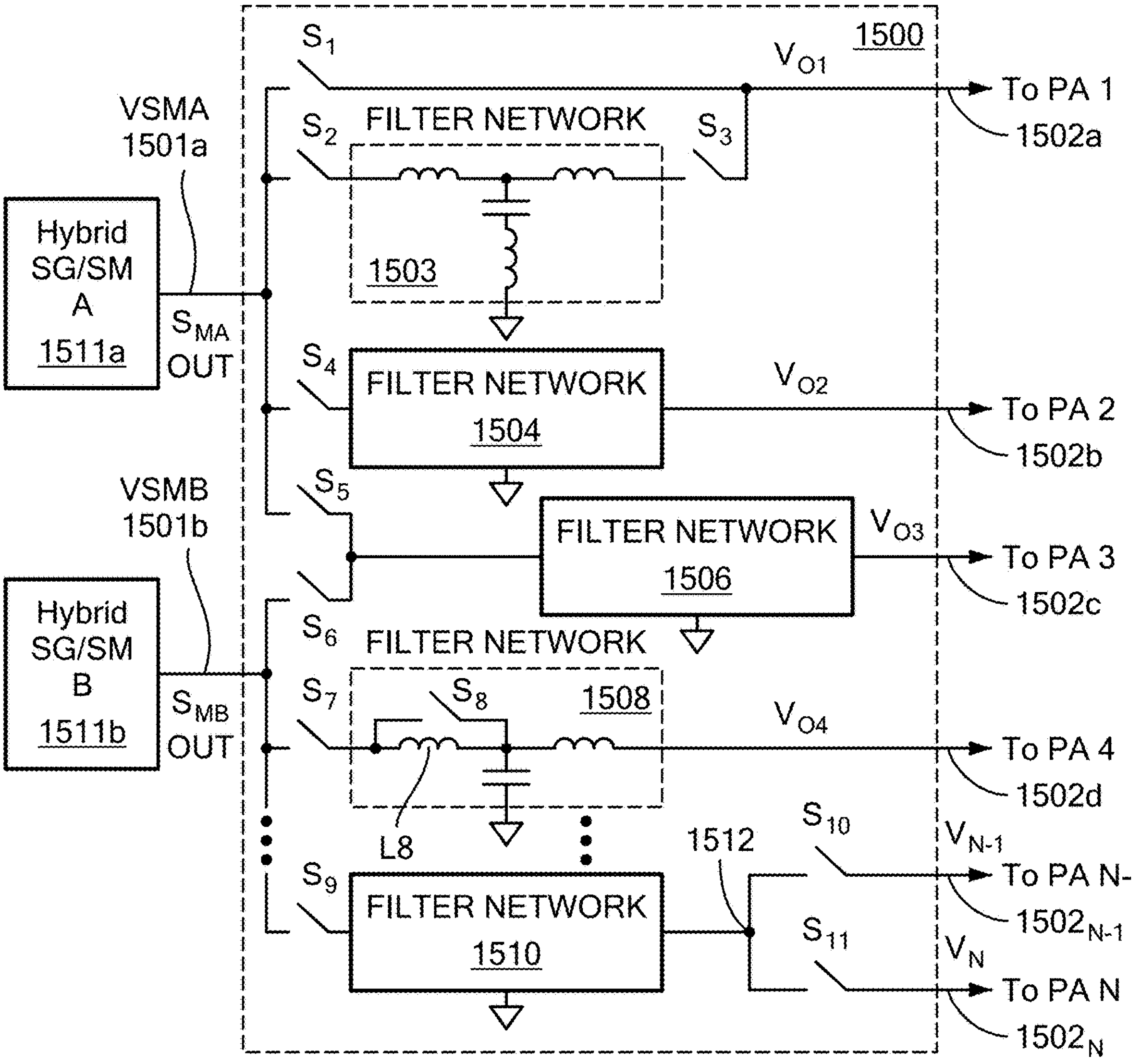
FIG. 15 is a schematic diagram of a switching network having one or more pulse-shaping networks (PSNs) and being coupled to one or more hybrid supply generator/supply modulators.

Turning to FIG. 15, as previously discussed, an RF power amplifier system may include a controller (e.g., one of controllers 550 of FIG. 5) configured to provide one or more control signals to one or more hybrid supply generators/modulators. In some embodiments, the variable supply voltages (or "supply bias voltages") may be provided in the form of pulses with each pulse having one of a discrete number of voltage levels. That is, the hybrid supply generators/modulators can each provide one of a plurality of discrete supply voltages to the supply/bias terminal of a corresponding rf amplifier (or in some cases, to multiple rf amplifiers). Such discrete voltage supply levels may be predetermined or may be adapted over time based upon required average transmit power levels or other factors.

Transitions between pulses of different voltage levels (i.e., transitions from one voltage level to another) can give rise to undesired frequency components in the varying supply voltage signals. In some embodiments, such variable supply voltages can be provided to the supply/bias terminal of the amplifier through one or more pulse shaping networks (PSNs). A PSN functions to filter out or otherwise remove undesirable frequency components in a supply voltage signal (i.e., the PSN filters or shapes the trajectory of the supply voltage signal). Thus, a filtered supply voltage signal is provided to the supply terminal of the rf amplifier. In the context of FIG. 5, PSNs may correspond to, or form a part of, the additional circuitry 506, for example. In some cases, the supply generator, supply modulator, and PSN may be provided as a power management integrated circuit (PMIC).

FIG. 15 shows an example of a switching network having one or more PSNs and being coupled to one or more hybrid supply generator/modulators. Illustrative switching network 1500 has one or more inputs each of which may be coupled to one or more hybrid supply generator/modulators with two hybrid supply generator/modulators 1511*a*, 1511*b* show in this example. Alternatively or additionally, rather than outputs separate hybrid supply generators/modulators 1511*a* and 1511 *b*, signals 1501*a* and 1501*b* (and so forth) may represent multiple outputs of a single hybrid supply generator/supply modulator (e.g., the differential multilevel converter outputs 1404*a* and 1404*b* of hybrid supply generator/modulator 1400 in FIG. 14), or as combinations of outputs of a single multi-output hybrid supply generator/supply modulator and one or more other hybrid supply generator/supply modulator(s).

In some implementations, the switching network 1500 may be coupled in a cascaded configuration with the hybrid supply generator/modulators 1511*a*, 1511 *b*. In this example embodiment, switching network 1500 comprises two inputs 1501*a*, 1501 *b* coupled to outputs of respective ones of hybrid supply generator/modulators 1511*a*, 1511*b*. Hybrid supply generator/modulators (A and B) respectively supply modulated voltage signals $V_{SMA}$ and $V_{SMB}$ as inputs to the switching network 1500.

Switching network 1500 comprises a first plurality of outputs 1502*a*-1502N each of which may be coupled to one or more of a second plurality of rf amplifiers (not shown in FIG. 15). In embodiments, the plurality of switching network outputs may be the same as the number of rf amplifiers such that there exists a one-to-one correspondence between the number of switching network outputs and RF amplifiers. In this case, each rf amplifier may be coupled to a respective one of the switching network outputs 1502*a*-1502N.

In the example embodiment of FIG. 15, switching network 1500 is illustrated as providing N outputs 1502*a*-1502N (where N is any integer greater than 1) at which respective ones of voltages $V_{O1}$-$V_{ON}$ may be provided. The switching network outputs may be coupled to one or more bias terminals (e.g., a supply terminal) of one or more rf power amplifiers and thus output voltages $V_{O1}$-$V_{ON}$ may be coupled to a bias terminal of one or more rf power amplifiers. In some embodiments, N may be equal to 2 (thus providing output voltages $V_{O1}$, $V_{O2}$). In some embodiments, N may be equal to 4 (thus providing output voltages $V_{O1}$-$V_{O4}$). In some embodiments, N may be equal to 6 (thus providing output voltages $V_{O1}$-$V_{O6}$). In some embodiments, N may be equal to 8 (thus providing voltages $V_{O1}$-$V_{O8}$). In some embodiments, N may be equal to 10 (thus providing voltages $V_{O1}$-$V_{O10}$).

For example, in one embodiment, two or more output ports may be coupled to provide output signals in some cases all N output signals $V_{O1}$-$V_{ON}$ may be coupled to a bias terminal (e.g., a supply terminal) of a single rf power amplifier. In other embodiments, one or more or each output signal $V_{O1}$-$V_{ON}$ may be coupled to its own, respective, rf power amplifier (i.e., a bias terminal of respective rf amplifiers). And in still other embodiments, one or more output amplifiers may be coupled to a single output terminal of switching network 1500, while other rf output amplifiers may be coupled to two or more output signals of switching network 1500.

The switches $S_1$-$S_{11}$ of switching network 1500 may be coupled to a controller (not shown) that can open and close the switches $S_1$-$S_{11}$ to control the output signals $V_{O1}$-$V_{ON}$. In this way, the switching network 1500 can be coupled across one or more PSN (and in some cases, configured to provide a signal path which bypasses one or more of the PSN). For example, when switch $S_1$ is closed, modulated voltage signal VSMA is coupled to output 1502*a* at which voltage VO1 is provided. When switch $S_1$ is open and switches $S_2$ and $S_3$ are closed, modulated voltage signal $V_{SMA}$ is coupled through PSN 1503 (also referred to as filter network 1503) to output 1502*a*. And when switches $S_1$ and $S_3$ are open, the output signal $V_{O1}$ at output 1502*a* is not connected to voltage signal VSMA, and may be floating or may be tied to some other potential such as ground by circuitry not shown. Thus, switches $S_1$, $S_2$, and $S_3$ can be used to adaptively (or dynamically) in real time enable or disable filtering (performed by a filter network 1503) for output signal $V_{O1}$. It should be appreciated that filtering circuitry may be provided in a variety of different circuit configurations to provide filter characteristics selected to meet the needs of a particular application. Taking filter network (PSN) 1503 illustrative of filter networks 1504-1510, filter network 1503 comprises one or more electronic elements. In the example of FIG. 15 filter network 1503 comprises four electronic elements which are passive circuit elements (also sometimes referred to herein as a "passive component"). Filter networks 1503-1510 may have various passive or active circuit elements selected to suit the needs of a particular application. After reading the disclosure provided herein, one of ordinary skill in the art will understand how to design one or more filter networks to suit the needs of a particular application.

In some embodiments, a PSN can include one or more passive elements realized as discrete elements. In some embodiments, a PSN can include one or more passive elements realized on an IC or module. In some embodiments, a PSN can include one or more passive elements resulting from parasitic resistance, inductance, or capacitance.

In some embodiments, a PSN can include a resistor having a first terminal connected to the output of the hybrid supply generator/modulator, and a capacitor having a first terminal to the second terminal of the resistor and a second terminal connected to ground. In some embodiments, a PSN can include a capacitor having a first terminal connected to the output of the hybrid supply generator/modulator and a second terminal connected to ground, and a resistor having a first terminal connected to the first terminal of the capacitor.

Whether to connect or not a given PSN (e.g., one or more of filter networks 1503, 1508, 1510, etc.) between a hybrid supply generator/modulator (e.g., one or more of hybrid supply generator/modulators 1511*a*, 1511 *b*) and an output (e.g., one of outputs 1502*a*-1502N) may depend upon a variety of factors including but not limited to: the rf frequency band in which the RF signal provided to the RF input of the power amplifier resides; the bandwidth of the RF signal provided to the RF input of the power amplifier; peak-to-average ratio of the RF signal provided to the RF input of the power amplifier; power level of the RF signal provided to the RF input of the power amplifier; other aspects or characteristics of the RF signal to be provided to the RF input of the PA; the mode of the supply modulation (e.g., digital envelope tracking vs. average power tracking vs. fixed supply) being used; and/or by the characteristics of an operating or application scenario (e.g., observed noise or amplifier behavior) among other factors.

Similarly, when switch $S_4$ is closed, modulated voltage signal VSMA is coupled through filter network 1504 to output 1502*b* at which voltage $V_{O2}$ is provided. When switch $S_5$ is closed, modulated voltage signal VSMA is coupled through filter network 1506 to output 1502*c*. And when switch $S_6$ is closed, modulated voltage signal VSMB is coupled through filter network 1506 to output 1502*c*. Thus, switches $S_5$ and $S_6$ may be used to select which modulated voltage signal VSMA or VSMB (or both in parallel) is coupled to provide an output signal at output 1502*c*.

When switch S7 is closed, modulated voltage signal VSMB is coupled through filter network 1508 to terminal 1502*d* is provided. It should be appreciated that one, some or all of filters 1503-1510 may be provided as reconfigurable filters. For example, filter 1508 comprises switch $S_8$. Switch S is configured to change the filtering parameters (or characteristics) of filter network 1508. In this case, closing switch S creates a short circuit signal path across inductor L8 thereby effectively removing inductor L8 from filter 1508, which will affect the transfer function of filter network 1508. In this way filter characteristics of filter 1508 may be changed (e.g., adaptively changed or "on-the-fly" or in real time) to suit the needs of a particular application or operating scenario. For example, it might be desirable to dynamically adjust the characteristics of the filter depending upon the rf band in which the signal will be transmitted by the power amplifier, by the bandwidth, peak-to-average ratio, power level, or other aspects of the signal to be transmitted, and by the mode of the supply modulation (e.g., digital envelope tracking vs. adaptive power tracking vs. fixed supply) being used, or by the characteristics of an operating or application scenario (e.g., observed noise or amplifier behavior) among other factors.

Switches $S_9$, may be switched between open and closed states to selectively couple modulated voltage signal VSMB through filter 1510 to node 1512. Switches $S_{10}$, $S_{11}$ may be switched between open and closed states to couple node 1512 to either or both of outputs 1502N-1, 1502N at which respective ones of voltages VN−1, VN are provided. When switches $S_9$ and $S_{10}$ are closed, modulated voltage signal VSMB is coupled through filter network 1510 to output 1502N-1 at which voltage $V_{N-1}$ is provided. Similarly, when switches Se and $S_{11}$ are closed modulated voltage signal VSMB is coupled through filter network 1510 to node 1512 at which voltage $V_N$ may be provided. When all three switches $S_9$, $S_{10}$, and $S_{11}$ are closed, modulated voltage signal VSMB is coupled through filter network 1510 to both output terminals 1502N-1 and 1502N.

The signal paths created by switches $S_1$-$S_{11}$ in FIG. 15 are provided as examples. One skilled in the art will recognize that other configurations of signal paths and filtering parameters and characteristics are possible by changing the number, arrangement, and control of the switches in switching network 1500. For example, the switches $S_1$-$S_{11}$ may be operated or controlled (i.e., placed in an open or closed states) such either of modulated voltage signals VSMA, VSMB may be coupled to any of terminals 1502*a*-1502N. In general, switches within switching network 1500 may be configured to enable one or more on-die supply modulator output(s) to be routed to one or more power amplifier supply terminals; adjusting filtering of a provided modulator output (e.g., to provide a reconfigurable pulse shaping network); reconfigure how different (possibly spatially separated) filter stages are utilized in connecting one or more modulator outputs via one or more filter stages to one or more RF amplifiers; and turn-off switch(es) to enable a supply modulator output to be disconnected from a power amplifier and/or filter, or perform other tasks that modify and/or control the output signals that provide power to RF power amplifiers.

The particular manner in which the switching network 1500 is realized may depend upon the power level, voltage level and application space of the system in which the switching network is being used (e.g., an RF amplifier system). For some mobile device applications (e.g., a cellular phone, smart phone, tablet PC with cellular communication capabilities) it may be desirable to monolithically integrate electronic elements (e.g., circuit components) of both the supply generator and supply modulator and switching elements as well as portions of the ancillary circuits on a single semiconductor die (e.g., in a CMOS or BCD process) or IC. In some cases it may be desirable to integrate electronics such as the modulator(s) and switching network 1500 together with power amplifiers on a single die. Moreover, in some cases it may be advantageous to package the modulator, switches and some of the filter components within a single module and locate other filter components and the RF amplifier in a physically separated location. In still other applications it may be advantageous to package the modulator and some switches on a first die, and further switches on at least one additional die that is placed a relative distance from the first die. This second die may also contain one or more power amplifiers or be located physically close to power amplifier(s), e.g., in a module or co-located on a circuit board. In these latter cases, the switches on the first die can be used for some of the functions described above and may be placed close to one or more first filter stages, while the second die can also implement some of the functions described above and may be placed closer to one or more second filter stages. Communication lines may also be provided between the first die and the second die (or between a controller and the second die) to allow the configuration to be changed.

Although reference is sometimes made herein to particular materials, devices and/or components, it is appreciated that other materials, devices and/or components having similar functional and/or structural properties may be substituted where appropriate, and after reading the description provided herein, a person having ordinary skill in the art would understand how to select such materials, devices and/or components and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to an "embodiment" or "embodiments" indicate that the embodiment(s) described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a digital signal processor (DSP), and/or in a discrete electronic circuit, which can be analog or digital. A processor or controller can include internal processors or modules that perform portions of the function, operation, or sequence of operations. Similarly, a module can include internal processors or internal modules that perform portions of the function, operation, or sequence of operations of the module. A single processor or other unit may fulfill the functions of several means recited in the claims.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

Other variations to the disclosed embodiments can be understood and effected by those skilled in the art in practicing the claimed invention, from a study of the drawings, the disclosure, and the appended claims.

The mere fact that certain measures are recited in mutually different dependent claims does not indicate that a combination of these measures cannot be used to obtain an advantage.

Any reference signs in the claims should not be construed as limiting the scope.

All publications and references cited herein are expressly incorporated herein by reference in their entirety.

The invention claimed is:

1. A system comprising:

a differential multilevel converter comprising:

a differential input including a first input terminal configured to be coupled to a first voltage $V_A$ and a second input terminal configured to be coupled to a second, different voltage $V_B$;

a plurality of switches $S_A$, $S_{A'}$, $S_B$, $S_{B'}$ coupled between the first and second input terminals;

a capacitor $C_f$ having a first terminal coupled to a first terminal of a first one of the plurality of switches and a second terminal coupled to a first terminal of a second, different one of the plurality of switches; and an output terminal coupled to a first terminal of a third, different one of the plurality of switches; and a controller coupled to the plurality of switches and configured to control selected ones of the plurality of switches $S_A$, $S_{A'}$, $S_B$, $S_{B'}$ to switch, at points in time, between at least four switch states with each switch state producing an output voltage $V_{sm}$ corresponding to one of three discrete voltage levels L1, L2, L3 at the output terminal of the differential multilevel converter, wherein at least two of the at least four switch states produce an output voltage which is substantially the same and at those points in time when ones of the plurality of switches switch among at least two switch states producing the substantially same output voltage, the controller maintains a voltage $V_{cf}$ across the capacitor $C_f$ within a voltage deviation $\Delta V$ of a target voltage and wherein the voltage deviation $\Delta V$ determines a maximum deviation of the substantially same output voltage from an ideal output voltage.

2. The system of claim 1 wherein the voltage deviation $\Delta V$ from a voltage corresponding to a voltage of $(V_B-V_A)/2$ determines a maximum deviation of one of the three discrete voltage levels corresponding to a voltage of $(V_A+V_B)/2$.

3. The system of claim 1 wherein:

a first one of the three discrete voltage levels corresponds to the first voltage $V_A$;

a second one of the three discrete voltage levels corresponds to one of: a voltage of $V_B-V_{cf}$; or a voltage of $V_A+V_{cf}$; and a third one of the three discrete voltage levels corresponds to the second voltage $V_B$.

4. The system of claim 1 wherein at least some of the differential multilevel converter switches have a unidirectional blocking characteristic to block less than or equal to a maximum difference between the first and second voltages $V_A$, $V_B$ but more than one-half of the maximum difference between the first and second voltages $V_A$, $V_B$.

5. The system of claim 1 wherein the at least four switch states include four switch states (1,2,3,4), and wherein the plurality of switches is provided as four switches ($S_A$, $S_B$, $S_{A'}$, $S_{B'}$) coupled to provide the four switch states with each switch state generating a specified output voltage $V_{sm}$ at the output terminal of the differential multilevel converter such that:

| State | Switches On | $v_{SM}$ | Level |
|---|---|---|---|
| 1 | $S_A$, $S_B$ | $v_B$ | L3 |
| 2 | $S_A$, $S_{B'}$ | $v_B - v_{cf}$ | L2 |
| 3 | $S_B$, $S_{A'}$ | $v_A + v_{cf}$ | L2 |
| 4 | $S_{B'}$, $S_{A'}$ | $v_A$ | L1 |

and wherein, at discrete points in time, the differential multilevel converter provides one of the three discrete voltage levels L1, L2, L3 at the differential multilevel converter output terminal with a voltage at level L1 substantially corresponding to the first voltage $V_A$; a voltage at level L3 substantially corresponding to the second voltage $V_B$; and a voltage at level L2 substantially corresponding to a voltage of $(V_A+V_B)/2$.

6. The system of claim 5 wherein the controller provides control signals to control ones of the four switches to switch between switch states 2 and 3 on an unclocked basis.

7. The system of claim 5 wherein switching between switch states 2 and 3 occurs when the voltage $V_{cf}$ across the capacitor $C_f$ exceeds the voltage deviation ΔV above or below $(V_B-V_A)/2$.

8. The system of claim 1 further comprising:

a multi-output regulation stage having a single input coupled to receive an input voltage $V_{IN}$, a first output A coupled to the first input terminal of the differential multilevel converter and a second output B coupled to the second input terminal of the differential multilevel converter, the multi-output regulation stage operable to synthesize a first intermediate voltage $V_A$ at the first output A and a second intermediate voltage $V_B$ at the second output B.

9. The system of claim 8 wherein the two intermediate voltages $V_A$ and $V_B$ are independently controllable.

10. The system of claim 1 further comprising a multi-output regulation stage having a single input coupled to receive an input voltage $V_{IN}$ and a first output A coupled to the first input terminal of the differential multilevel converter, the multi-output regulation stage comprising a buck converter having an input coupled to receive the input voltage $V_{IN}$ and having a first output at which is provided the first voltage $V_A$ with the first output of the buck converter coupled to the first output A of the multi-output regulation stage.

11. The system of claim 1 wherein the plurality of switches corresponds to four switches coupled between the first and second input terminals of the differential multilevel converter and are arranged such that with all switches in their on state, a short circuit signal path exists between the first and second input terminals of the differential multilevel converter.

12. The system of claim 11 wherein:

a first one of the four switches has first and second terminals with the first terminal coupled to the first input terminal of the differential multilevel converter;

a second one of the four switches has first and second terminals with the first terminal coupled to the second terminal of the first one of the four switches;

a third one of the four switches has first and second terminals with the first terminal coupled to the second terminal of the second one of the four switches;

a fourth one of the four switches has first and second terminals with the first terminal coupled to the second terminal of the third one of the four switches and the second terminal coupled to the second input terminal of the differential multilevel converter; and the capacitor $C_f$ is a first capacitor $C_{f1}$ having first and second terminals with the first terminal of the first capacitor $C_{f1}$ coupled between the second terminal of the first switch and the first terminal of the second switch and the second terminal of the first capacitor $C_{f1}$ coupled between the second terminal of the third switch and the first terminal of the fourth switch.

13. The system of claim 1 wherein the capacitor $C_f$ is a first capacitor $C_{f1}$ and the differential multilevel converter further comprises a second capacitor $C_{f2}$ and the plurality of switches corresponds to six switches and wherein:

a first one of the six switches has first and second terminals with the first terminal coupled to the first input terminal of the differential multilevel converter;

a second one of the six switches has first and second terminals with the first terminal coupled to the second terminal of the first one of the six switches;

a third one of the six switches has first and second terminals with the first terminal coupled to the second terminal of the second one of the six switches;

a fourth one of the six switches has first and second terminals with the first terminal coupled to the second terminal of the third one of the six switches;

a fifth one of the four switches has first and second terminals with the first terminal coupled to the second terminal of the fourth one of the six switches;

a sixth one of the six switches has first and second terminals with the first terminal coupled to the second terminal of the fifth one of the six switches and the second terminal coupled to the second input terminal of the differential multilevel converter;

the first capacitor $C_{f1}$ has first and second terminals with the first terminal of the first capacitor $C_{f1}$ coupled to the second terminal of the second switch and the first terminal of the third switch and the second terminal of the first capacitor $C_{f1}$ coupled to the second terminal of the fourth switch and the first terminal of the fifth switch; and the second capacitor $C_{f2}$ has first and second terminals with the first terminal of the second capacitor $C_{f2}$ coupled to the second terminal of the first switch and the first terminal of the second switch and the second terminal of the second capacitor $C_{f2}$ coupled to the second terminal of the fifth switch and the first terminal of the sixth switch.

14. The system of claim 1 wherein the differential multilevel converter further comprises a regulator coupled to the capacitor $C_f$ to maintain voltages across the capacitor $C_f$ within a desired range during time periods during which a switch state of the at least four switch states does not provide charging/discharging control of the voltage $V_{cf}$ across the capacitor $C_f$.

15. The system of claim 1, wherein the controller measures the voltage $V_{cf}$ across the capacitor $C_f$ and uses the measurement to transition between the at least four switch states.

16. The system of claim 15, wherein the controller measures the voltage $V_{cf}$ across the capacitor $C_f$ using a differential sensor with two inputs connected to different terminals of the capacitor $C_f$ and an output connected to the controller.

17. A system comprising:

a hybrid supply generator and modulator comprising:

a differential multilevel converter comprising:

a differential input including a first input terminal configured to be coupled to a first voltage $V_A$ and a second input terminal configured to be coupled to a second, different voltage $V_B$;

a plurality of switches coupled between the first and second input terminals with the plurality of switches;

at least one capacitor $C_f$ having a first terminal coupled to a first terminal of a first one of the plurality of switches and a second terminal coupled to a first terminal of a second, different one of the plurality of switches; and an output terminal coupled to a first terminal of a third, different one of the plurality of switches; and a multi-output regulation stage having a single input configured to receive an input voltage $V_{IN}$, a first output A coupled to the first input terminal of the differential multilevel converter and a second output B coupled to the second input terminal of the differential multilevel converter, the multi-output regulation stage operable to synthesize a first intermediate voltage $V_A$ at the first output A and a second intermediate voltage $V_B$ at the second output B wherein, in response to control signals provided thereto, the plurality of switches of the differential multilevel converter are operable to switch between at least four switch states with each switch state producing an output voltage $V_{sm}$ corresponding to at least one of three discrete voltage levels L1, L2, L3 at the output terminal of the differential multilevel converter, wherein at least two of the at least four switch states produce an output voltage which is substantially the same and at those points in time when ones of the plurality of switches switch among at least two switch states producing the substantially same output voltage, the switches are operable to maintain a voltage across at least one of the at least one capacitors $C_f$ within a voltage deviation ΔV of a target voltage and wherein the voltage deviation ΔV determines a maximum deviation of the substantially same output voltage from an ideal output voltage.

18. The system of claim 17 further comprising a controller coupled to the plurality of switches of the differential multilevel converter, the controller operable to provide control signals to the plurality of switches to control the plurality of switches between on and off states such that the plurality of switches switch between the at least four switch states and wherein when ones of the plurality of switches switch between states producing the substantially same output voltage, the controller provides control signals to maintain the voltage across at least one of the at least one capacitors $C_f$ within the voltage deviation ΔV of the target voltage and wherein the voltage deviation ΔV determines a maximum desired deviation of a discrete voltage level from an ideal voltage level.

19. The system of claim 17 wherein the hybrid supply generator and modulator is provided as an integrated circuit comprising at least the differential multilevel converter.

20. The system of claim 17 further comprising a radio frequency (rf) amplifier having a supply terminal coupled to the output terminal of the differential multilevel converter.

21. A system comprising:

a differential multilevel converter comprising:

a differential input including a first input terminal configured to be coupled to a first voltage $V_A$ and a second input terminal configured to be coupled to a second, different voltage $V_B$;

a plurality of switches coupled between the first and second input terminals with the plurality of switches;

at least one capacitor $C_f$ having a first terminal coupled to a first terminal of a first one of the plurality of switches and a second terminal coupled to a first terminal of a second, different one of the plurality of switches; and an output terminal coupled to a first terminal of a third, different one of the plurality of switches, wherein, in response to control signals provided thereto, the plurality of switches of the differential multilevel converter are operable to switch between at least four switch states with each switch state producing an output voltage $V_{sm}$ corresponding to at least one of three discrete voltage levels L1, L2, L3 at the output terminal of the differential multilevel converter and wherein at least two of the at least four switch states produce an output voltage which is substantially the same and at those points in time when ones of the plurality of switches switch among at least two switch states producing the substantially same output voltage, the switches are operable to maintain a voltage across at least one of the at least one capacitors $C_f$ within a voltage deviation ΔV of a target voltage and wherein the voltage deviation ΔV determines a maximum target deviation of the substantially same output voltage from an ideal output voltage.

22. The system of claim 21 further comprising a controller coupled to the plurality of switches to provide control signals to control the plurality of switches which act to maintain a voltage $V_{cf}$ across the at least one capacitor $C_f$ within a voltage deviation ΔV of a first target voltage.

* * * * *